US010827133B2

(12) United States Patent
Mitsui et al.

(10) Patent No.: US 10,827,133 B2
(45) Date of Patent: Nov. 3, 2020

(54) COMMUNICATION TERMINAL, IMAGE MANAGEMENT APPARATUS, IMAGE PROCESSING SYSTEM, METHOD FOR CONTROLLING DISPLAY, AND COMPUTER PROGRAM PRODUCT

(71) Applicants: Satoshi Mitsui, Kanagawa (JP); Yoshito Nishihara, Tokyo (JP); Tatsuya Nagafuchi, Kanagawa (JP)

(72) Inventors: Satoshi Mitsui, Kanagawa (JP); Yoshito Nishihara, Tokyo (JP); Tatsuya Nagafuchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/283,456

(22) Filed: Feb. 22, 2019

(65) Prior Publication Data
US 2019/0199941 A1 Jun. 27, 2019

Related U.S. Application Data

(63) Continuation of application No. 15/449,528, filed on Mar. 3, 2017, now Pat. No. 10,277,836.

(30) Foreign Application Priority Data

Mar. 7, 2016 (JP) .................................. 2016-043742
Mar. 30, 2016 (JP) .................................. 2016-068644
(Continued)

(51) Int. Cl.
G06K 9/00 (2006.01)
G06K 9/32 (2006.01)
(Continued)

(52) U.S. Cl.
CPC ......... H04N 5/272 (2013.01); G06K 9/00664 (2013.01); G06K 9/00771 (2013.01);
(Continued)

(58) Field of Classification Search
None
See application file for complete search history.

(56) References Cited

U.S. PATENT DOCUMENTS 6,181,343 B1 *  1/2001  Lyons ..................... A63F 13/10
                                                    715/850
2006/0280333 A1 * 12/2006  Ikeda ................. G06K 9/00375
                                                    382/103
(Continued)

FOREIGN PATENT DOCUMENTS

JP    2003-256843 A    9/2003
JP    2004-94518 A     3/2004
(Continued)

OTHER PUBLICATIONS

Office Action dated Dec. 17, 2019 in corresponding Japanese Patent Application No. 2016-043742, 3 pages.
(Continued)

*Primary Examiner* — Soo Shin
(74) *Attorney, Agent, or Firm* — Oblon, McClelland, Maier & Neustadt, L.L.P.

(57) ABSTRACT

A communication terminal includes circuitry. The circuitry is configured to calculate, for each of a plurality of captured-image data items that are obtained by continuous image capturing, a center point of an object detection area of the captured-image data item. The circuitry is further configured to render a heat map image having a gradation of color, the gradation of color of the heat map image being determined based on weighting of colors of the heat map image with the calculated center points of the captured-image data items. The circuitry is further configured to map the heat map image on a captured-image represented by one of the plurality of captured-image data items. The circuitry is
(Continued)

further configured to display the captured-image on which the heat map image is mapped.

10 Claims, 61 Drawing Sheets

(30) Foreign Application Priority Data

Mar. 31, 2016 (JP) .................................. 2016-072662
Feb. 24, 2017 (JP) .................................. 2017-033507

(51) Int. Cl.
  *G06K 9/52* (2006.01)
  *H04N 5/225* (2006.01)
  *H04N 5/232* (2006.01)
  *H04N 5/272* (2006.01)

(52) U.S. Cl.
  CPC ............ *G06K 9/3233* (2013.01); *G06K 9/52* (2013.01); *H04N 5/2258* (2013.01); *H04N 5/23219* (2013.01); *H04N 5/23238* (2013.01); *H04N 5/23293* (2013.01)

(56) References Cited

U.S. PATENT DOCUMENTS

| | | | | |
|---|---|---|---|---|
| 2007/0086621 A1* | 4/2007 | Aggarwal | .......... | G06K 9/00369 382/103 |
| 2012/0114255 A1* | 5/2012 | Kimura | .............. | G06K 9/00389 382/203 |
| 2013/0022246 A1 | 1/2013 | Tayama et al. | | |
| 2014/0176542 A1 | 6/2014 | Shohara et al. | | |
| 2014/0286532 A1* | 9/2014 | Mizuno | .............. | G06K 9/00369 382/103 |
| 2016/0063712 A1 | 3/2016 | Matsumoto et al. | | |
| 2016/0117839 A1* | 4/2016 | Kawahara | ................ | H04N 7/18 |
| 2016/0335861 A1* | 11/2016 | Shimura | .......... | G08B 13/19613 |
| 2017/0011519 A1* | 1/2017 | Ohba | .................... | G06F 3/0346 |
| 2018/0184062 A1 | 6/2018 | Hariri | | |

FOREIGN PATENT DOCUMENTS

| | | |
|---|---|---|
| JP | 2009-134688 | 6/2009 |
| JP | 2010-49346 A | 3/2010 |
| JP | 2010-244089 A | 10/2010 |
| JP | 2011-061511 | 3/2011 |
| JP | 2011-243155 A | 12/2011 |
| JP | 2012-517652 | 8/2012 |
| JP | 2014-224411 | 12/2014 |
| JP | 2015-46171 A | 3/2015 |
| JP | 5866564 B1 | 2/2016 |
| WO | WO 2010/093682 A1 | 8/2010 |

OTHER PUBLICATIONS

Office Action dated Dec. 17, 2019 in corresponding Japanese Patent Application No. 2016-072662, 3 pages.
Takashi Matsumoto et al. "Simultaneous Visualization of Analysis Items for Human Mobility Analysis", DPS Workshop, Oct. 2011, pp. 63-69.
Office Action dated Nov. 19, 2019 in Japanese Patent Application No. 2016-068644.
Japanese Office Action dated Feb. 4, 2020 Japanese Patent Application No. 2016-068644, 3 pages.

* cited by examiner

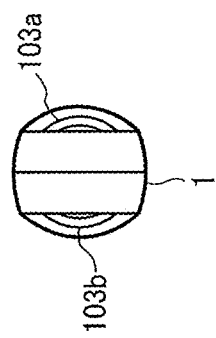
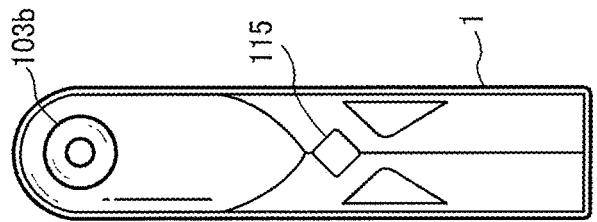
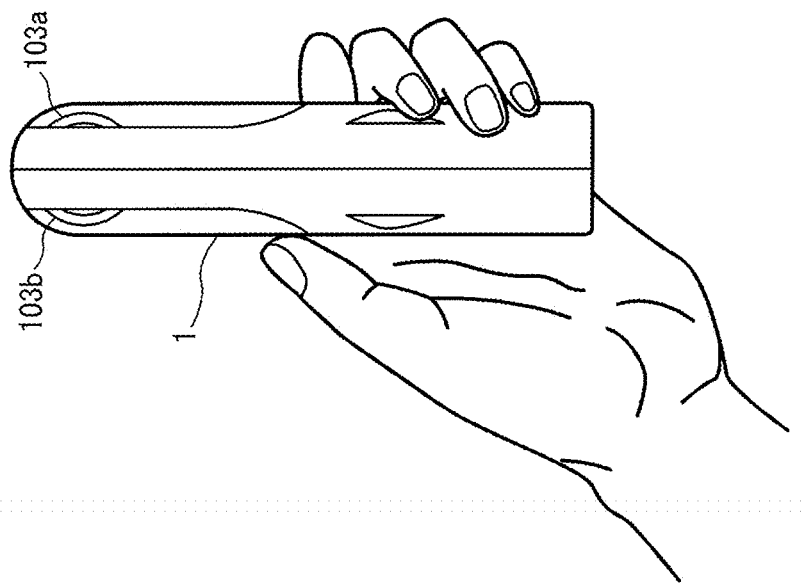

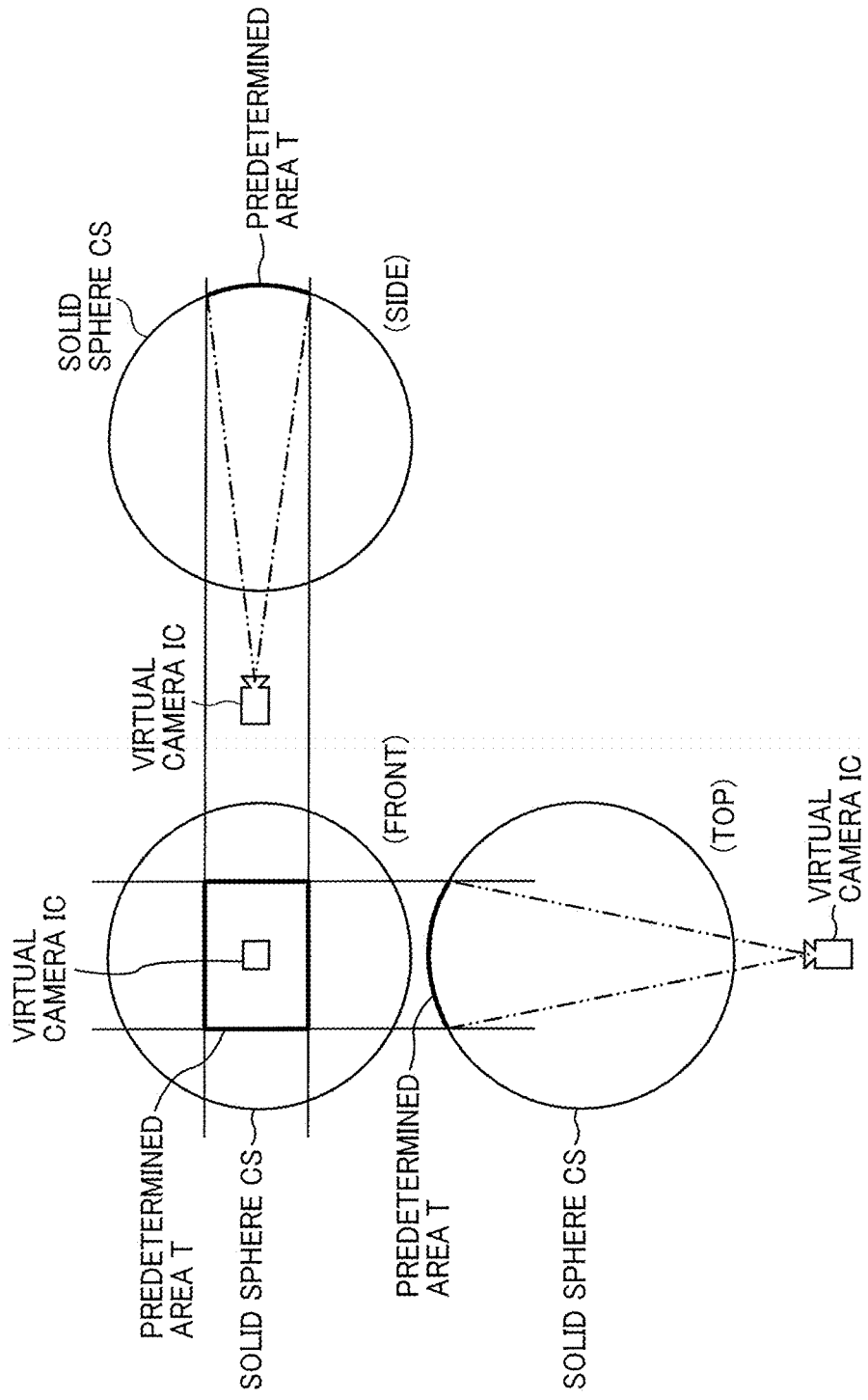

FIG. 14

| CAPTURED IMAGE ID | FILE NAME OF CAPTURED-IMAGE DATA | CAPTURING DATE AND TIME | PERSON DETECTION AREA ID | POSITION AND AREA OF PERSON |
|---|---|---|---|---|
| p001 | au123456ifauy.jpg | 2016.3.1.10:00.00 | a0011 | (x11, y11, w11, h11) |
| p001 | au123456ifauy.jpg | 2016.3.1.10:00.00 | a0012 | (x12, y12, w12, h12) |
| p001 | au123456ifauy.jpg | 2016.3.1.10:00.00 | a0013 | (x13, y13, w13, h13) |
| p001 | au123456ifauy.jpg | 2016.3.1.10:00.00 | a0014 | (x14, y14, w14, h14) |
| p002 | au123467ifauy.jpg | 2016.3.1.10:05.05 | a0021 | (x21, y21, w21, h21) |
| p002 | au123467ifauy.jpg | 2016.3.1.10:05.05 | a0022 | (x22, y22, w22, h22) |
| ... | ... | ... | ... | ... |

FIG. 15

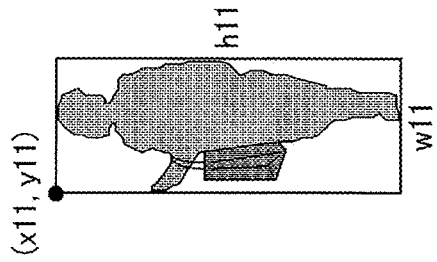

FIG. 16A

| TYPE OF CENTER POINT | SCORE |
|---|---|
| CENTER POINT | 1 |
| AVERAGE CENTER POINT OF CENTER POINTS (FIRST AVERAGE CENTER POINT) | 2 |
| AVERAGE CENTER POINT OF AVERAGE CENTER POINTS (SECOND AVERAGE CENTER POINT) | 3 |
| ... | ... |

FIG. 16B

| POSITION OF DRAWING POINT | | SCORE |
|---|---|---|
| X | Y | |
| X1 | Y1 | 1 |
| X2 | Y2 | 1 |
| X3 | Y3 | 2 |
| X4 | Y4 | 3 |
| ... | ... | ... |

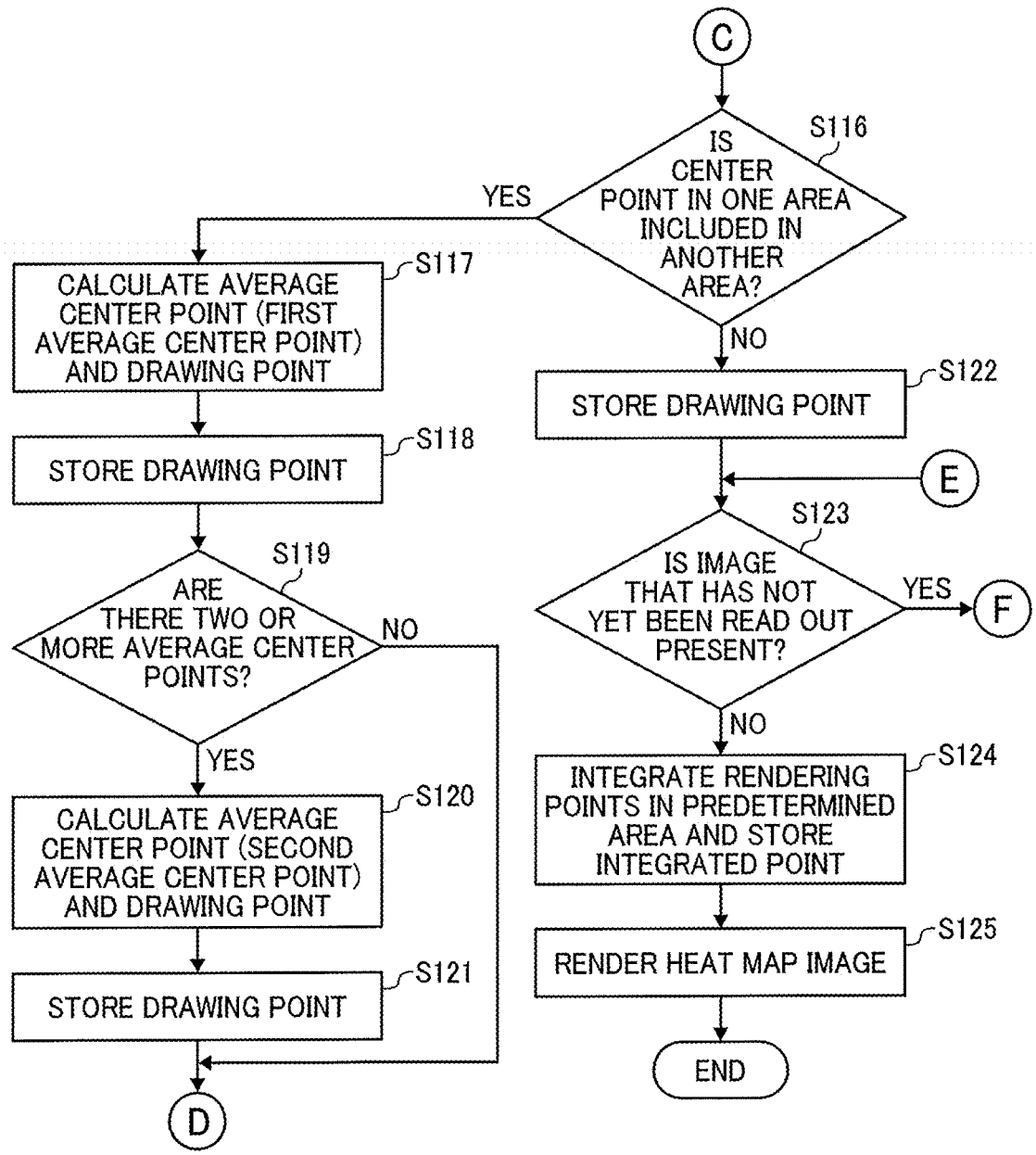

| CAPTURED IMAGE ID | FILE NAME OF CAPTURED-IMAGE DATA | CAPTURING DATE AND TIME | FACE ID | POSITION OF FOOT |
|---|---|---|---|---|
| p001 | au123456ifauy.jpg | 2016.3.1.10:00 | f0011 | (x21, y21) |
| p001 | au123456ifauy.jpg | 2016.3.1.10:00 | f0012 | (x22, y22) |
| p001 | au123456ifauy.jpg | 2016.3.1.10:00 | f0013 | (x23, y23) |
| p001 | au123456ifauy.jpg | 2016.3.1.10:00 | f0014 | (x24, y24) |
| p002 | au123467ifauy.jpg | 2016.3.1.10:05 | f0021 | (x24, y25) |
| ... | ... | ... | ... | ... |

FLOOR 2000

CAPTURED-IMAGE

PERSON SPECIFICATION INFORMATION

| IDENTIFIER | CENTER POINT POSITION | SIZE | SIMILARITY DETERMINATION RESULT |
|---|---|---|---|
| a01 | x1, y1 | α1 | — |
| a02 | x2, y2 | α2 | — |
| a03 | x3, y3 | α3 | — |
| a04 | x4, y4 | α4 | — |

INTERMEDIATE TABLE

| IDENTIFIER | STAY POINT |
|---|---|
| a01 | 0 |
| a02 | 0 |
| a03 | 0 |
| a04 | 0 |

FINAL TABLE

| IDENTIFIER | CENTER POINT POSITION | SIZE | STAY POINT |
|---|---|---|---|
|  |  |  |  |

CAPTURED-IMAGE

PERSON SPECIFICATION INFORMATION

| IDENTIFIER | CENTER POINT POSITION | SIZE | SIMILARITY DETERMINATION RESULT |
|---|---|---|---|
| c01 | x1, y1 | α1 | a01 |
| c02 | x6, y6 | α2 | NO |
| c03 | x3, y3 | γ3 | NO |
| c04 | x5, y5 | α4 | b04 |

INTERMEDIATE TABLE

| IDENTIFIER | STAY POINT |
|---|---|
| a01 | 11 |
| c02 | 0 |
| c03 | 0 |
| b04 | 6 |

FINAL TABLE

| IDENTIFIER | CENTER POINT POSITION | SIZE | STAY POINT |
|---|---|---|---|
| a03 | x3, y3 | α3 | 0 |
| a04 | x4, y4 | α4 | 0 |
| a02 | x2, y2 | α2 | 5 |
| b03 | x3, y3 | β3 | 0 |

FIG. 55

FINAL TABLE

| IDENTIFIER | CENTER POINT POSITION | SIZE | STAY POINT |
|---|---|---|---|
| a03 | x3, y3 | $\alpha 3$ | 0 |
| a04 | x4, y4 | $\alpha 4$ | 0 |
| a02 | x2, y2 | $\alpha 2$ | 5 |
| b03 | x3, y3 | $\beta 3$ | 0 |
| a01 | x1, y1 | $\alpha 2$ | 11 |
| c02 | x6, y6 | $\alpha 2$ | 0 |
| c03 | x3, y3 | $\gamma 3$ | 0 |
| b04 | x5, y5 | $\alpha 4$ | 6 |

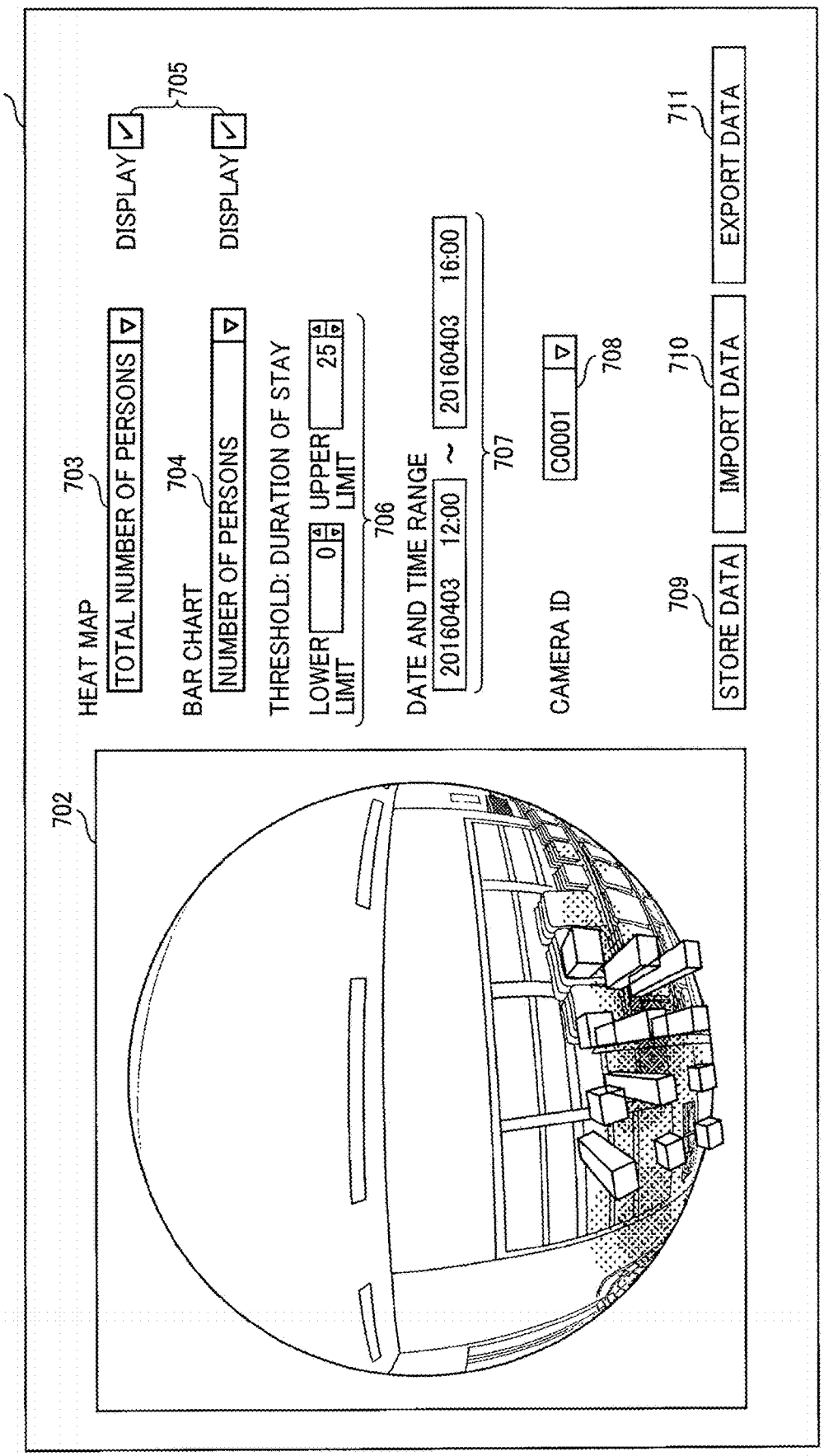

FIG. 64D
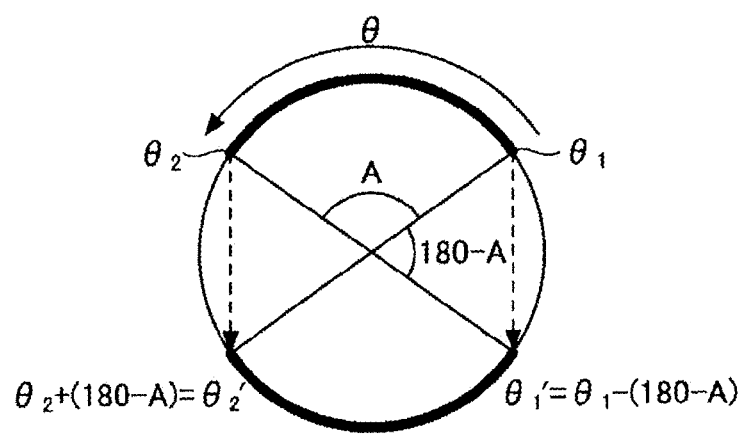
FIG. 64E
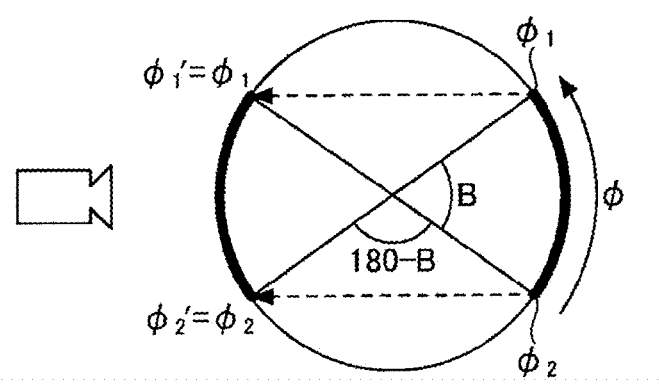

COMMUNICATION TERMINAL, IMAGE MANAGEMENT APPARATUS, IMAGE PROCESSING SYSTEM, METHOD FOR CONTROLLING DISPLAY, AND COMPUTER PROGRAM PRODUCT

CROSS-REFERENCE TO RELATED APPLICATIONS

This application is a continuation Application of U.S. application Ser. No. 15/449,528, filed Mar. 3, 2017, which is based on and claims priority pursuant to 35 U.S.C. § 119(a) to Japanese Patent Application Nos. 2016-043742, filed on Mar. 7, 2016, 2016-068644, filed on Mar. 30, 2016, 2016-072662, filed on Mar. 31, 2016, and 2017-033507, filed on Feb. 24, 2017 in the Japan Patent Office. The entire contents of the above-identified applications are incorporated herein by reference.

BACKGROUND

Technical Field

The present disclosure relates to a communication terminal, an image management apparatus, an image processing system, a method for controlling display of captured images, and a computer program product.

Description of the Related Art

Monitoring systems that include a monitoring camera and an image processing function are known. Persons' stay or a track of persons is analyzed using the monitoring system. The analysis results are used for a store management, a merchandise planning, the construction and improvement of roads, the prevention of crime, etc.

Further, a system is known that indicates a person's stay or a person's track using a heat map image separately from a captured image containing persons. Further, analysis information that is obtained by analyzing image data is edited using a computer to make it easier for a user to understand the analysis information. For example, bar charts or circle graphs are used when comparing plural types of analysis information. Furthermore, the analysis information is sometimes indicated in different to enable a user to visually recognize the analysis information or to emphasis the analysis information.

SUMMARY

A communication terminal includes circuitry. The circuitry is configured to calculate, for each of a plurality of captured-image data items that are obtained by continuous image capturing, a center point of an object detection area of the captured-image data item. The circuitry is further configured to render a heat map image having a gradation of color, the gradation of color of the heat map image being determined based on weighting of colors of the heat map image with the calculated center points of the captured-image data items. The circuitry is further configured to map the heat map image on a captured-image represented by one of the plurality of captured-image data items. The circuitry is further configured to display the captured-image on which the heat map image is mapped.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 1A is a left side view of an image capturing device according to an embodiment of the present invention;

FIG. 1B is a front view of the image capturing device of FIG. 1A;

FIG. 1C is a plan view of the image capturing device of FIG. 1A;

FIG. 5 is a view illustrating positions of a virtual camera and a predetermined area in a case in which the full spherical panoramic image is represented as a three-dimensional solid sphere according to an embodiment of the present invention;

FIG. 14 is an example of a person image management table according to an embodiment of the present invention;

FIG. 15 is an illustration for explaining a position and area of a person image according to an embodiment of the present invention;

FIG. 16A is an illustration for explaining a score table according to an embodiment of the present invention;

FIG. 16B is an illustration for explaining a drawing point table according to an embodiment of the present invention;

FIG. 32 is a flowchart illustrating an operation of generating the heat map image according to a second embodiment of the present invention;

FIG. 55 is an illustration for explaining calculation of a stay point according to a fourth embodiment of the present invention;

FIG. 62 is a view illustrating an example of a setting screen displayed on a display of the communication terminal according to a fifth embodiment of the present invention;

FIGS. 64A to 64E are illustrations for explaining switching performed when the image data is attached to an inner surface or an outer surface of a full sphere according to a fifth embodiment of the present invention;

Figure 2:
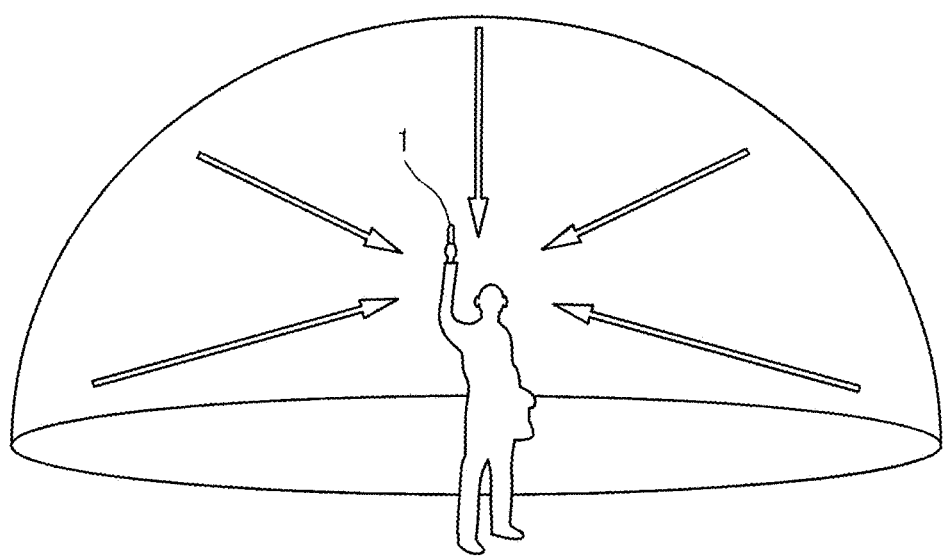
FIG. 2 is an illustration for explaining how a user uses the image capturing device of FIG. 1A to 1C according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

First Embodiment

A first embodiment of the present invention will be described hereinafter with reference to drawings.

First, a description is given of an operation of generating a full spherical panoramic image, with reference to FIGS. 1 to 7.

First, a description is given of an external view of an image capturing device 1 with reference to FIGS. 1A to 1C. The image capturing device 1 is a digital camera for acquiring captured images from which a 360-degree full spherical panoramic image is generated. FIGS. 1A to 1C are respectively a left side view, a front view, and a plan view of the image capturing device 1.

As illustrated in FIG. 1A, the image capturing device 1 has a shape such that one can hold it with one hand. Further, as illustrated in FIGS. 1A to 1C, an imaging element 103a is provided on a front side (anterior side) of an upper section of the image capturing device 1, and an imaging element 103b is provided on a back side (rear side) thereof. Furthermore, as illustrated in FIG. 1B, an operation unit 115 such as a shutter button is provided on the back side (rear side) of the image capturing device 1.

Hereinafter, a description is given of a situation where the image capturing device 1 is used with reference to FIG. 2. FIG. 2 is an example illustration for explaining how a user uses the image capturing device 1. As illustrated in FIG. 2, for example, the image capturing device 1 is used for capturing objects surrounding the user who is holding the image capturing device 1 in his/her hand. The imaging elements 103a and 103b illustrated in FIGS. 1A to 1C capture the objects surrounding the user to obtain two hemispherical images.

Figure 3A:
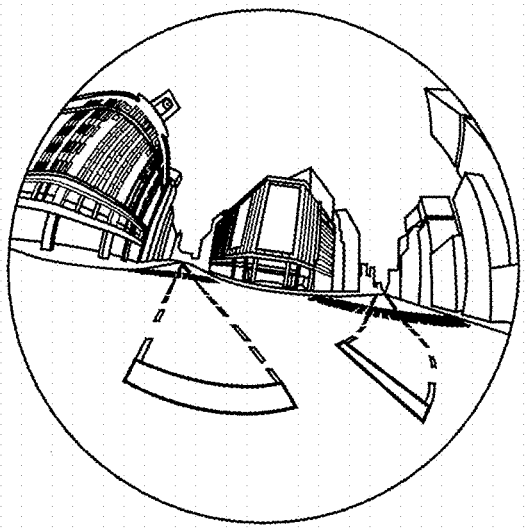
FIG. 3A is a view illustrating a front side of a hemispherical image captured by the image capturing device of FIG. 1 according to an embodiment of the present invention.
Figure 3B:
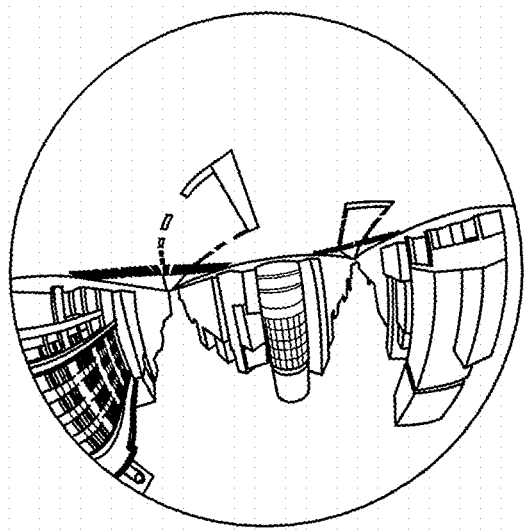
FIG. 3B is a view illustrating a back side of the hemispherical image captured by the image capturing device of FIG. 1 according to an embodiment of the present invention.
Figure 3C:
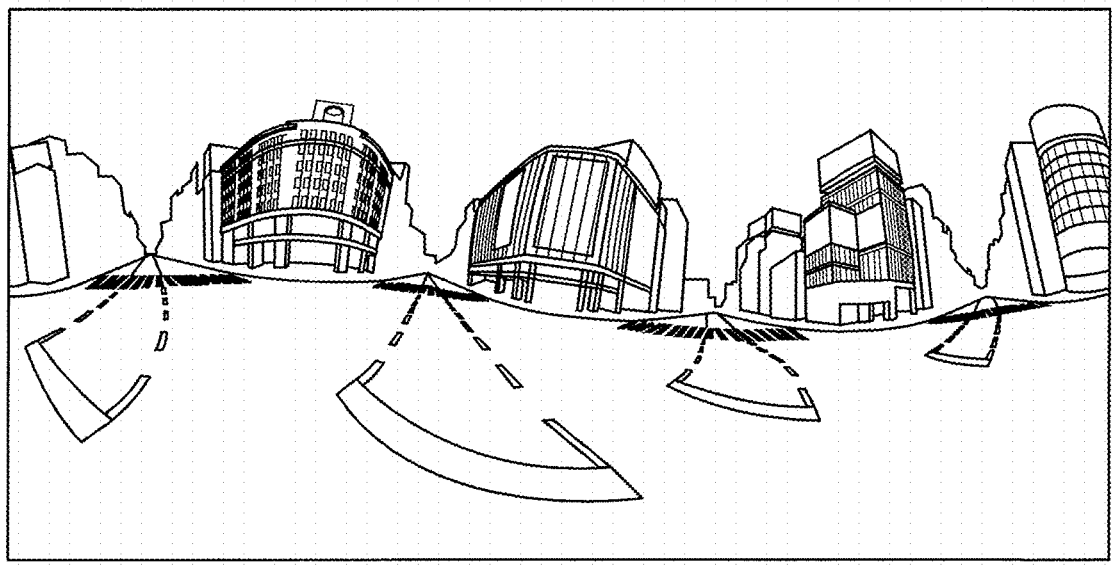
FIG. 3C is a view illustrating an image captured by the image capturing device of FIG. 1, represented by Mercator projection according to an embodiment of the present invention.
Figure 4B:
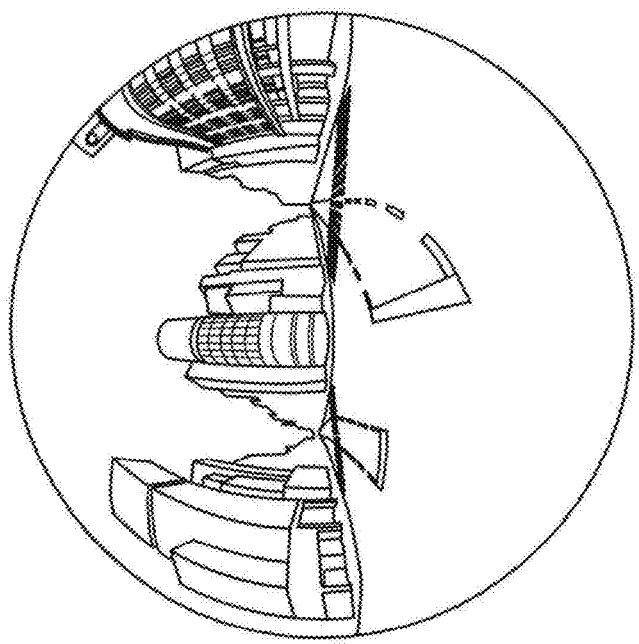
FIG. 4B is a view illustrating a full spherical panoramic image according to an embodiment of the present invention.
Figure 4A:
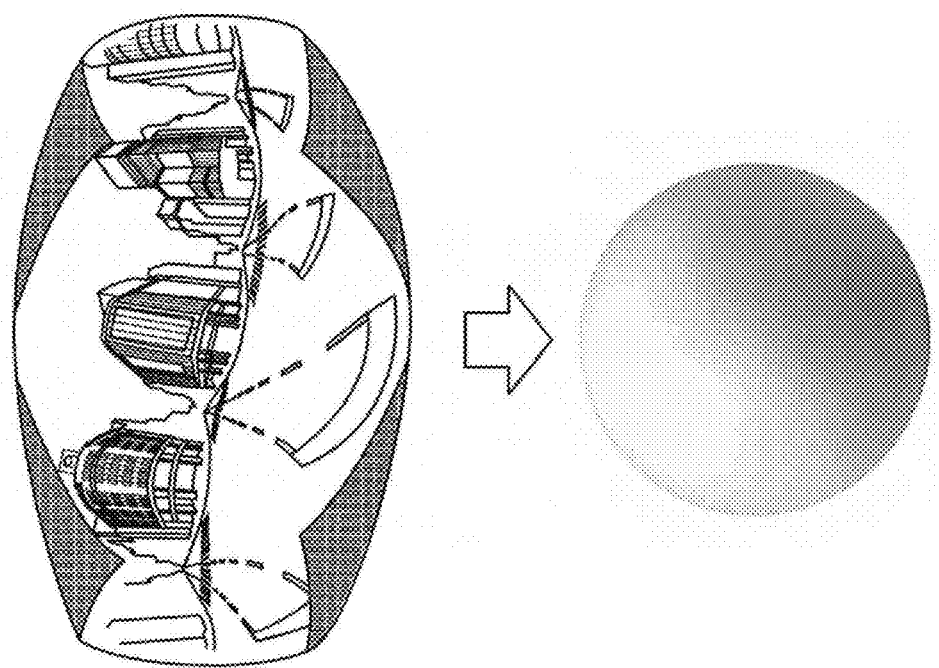
FIG. 4A is an illustration for explaining how the image represented by Mercator projection covers a surface of a sphere according to an embodiment of the present invention.

Hereinafter, a description is given of an overview of an operation of generating the full spherical panoramic image from the image captured by the image capturing device 1 with reference to FIGS. 3A to 3C and FIGS. 4A and 4B. FIG. 3A is a view illustrating a front side of a hemispherical image captured by the image capturing device 1. FIG. 3B is a view illustrating a back side of the hemispherical image captured by the image capturing device 1. FIG. 3C is a view illustrating an image represented by Mercator projection. The image represented by Mercator projection as illustrated in FIG. 3C is referred to as a "Mercator image" hereinafter. FIG. 4A is an illustration for explaining how the Mercator image covers a surface of a sphere. FIG. 4B is a view illustrating the full spherical panoramic image.

Figure 9:
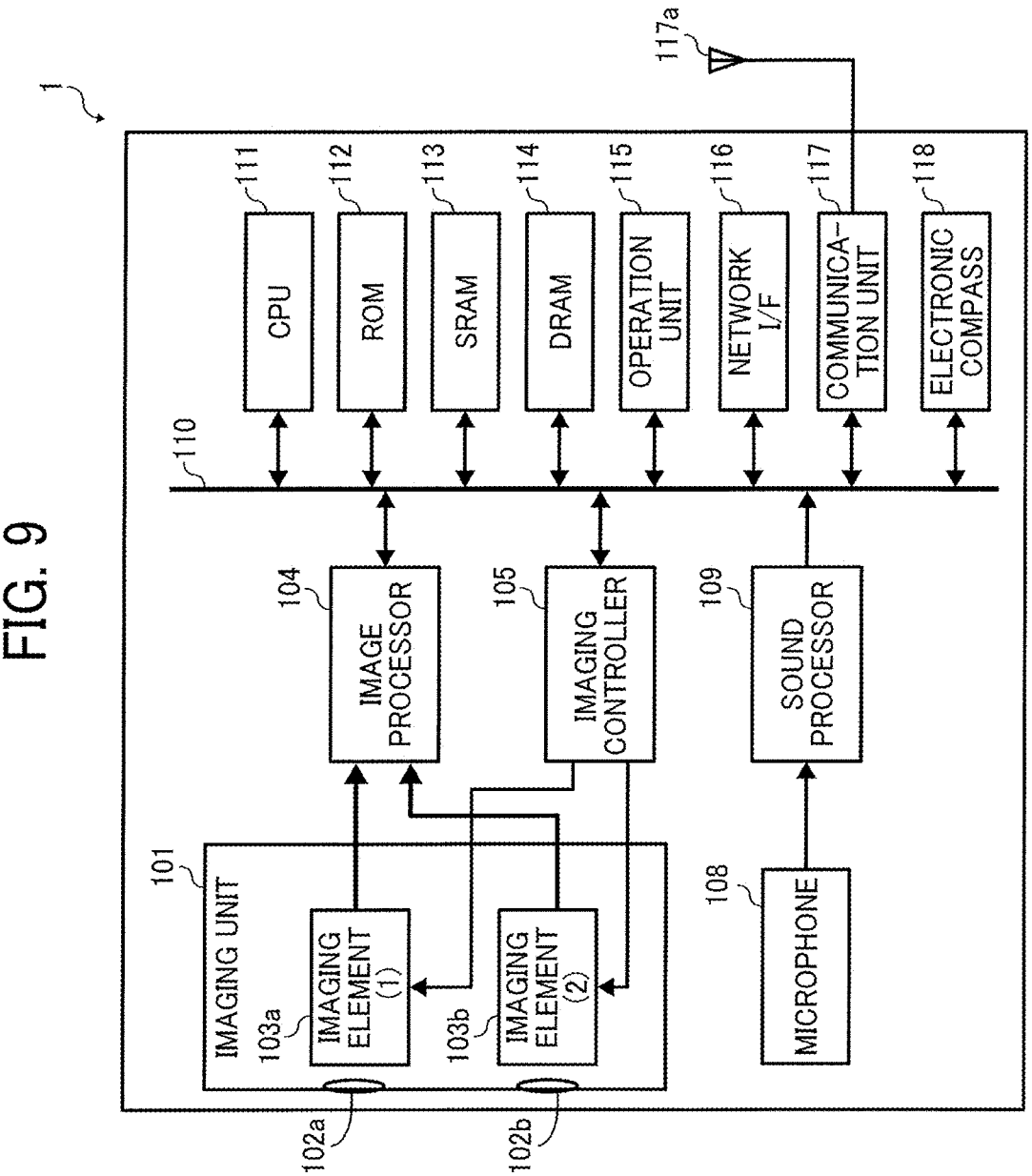
FIG. 9 is a block diagram illustrating a hardware configuration of the image capturing device of FIG. 1 according to an embodiment of the present invention.

As illustrated in FIG. 3A, the image captured by the imaging element 103a is a curved hemispherical image (front side) taken through a fisheye lens 102a (FIG. 9). Also, as illustrated in FIG. 3B, an image captured by the imaging element 103b is a curved hemispherical image (back side) taken through a fisheye lens 102b (FIG. 9). The image capturing device 1 combines the hemispherical image (front side) and the hemispherical image (back side), which is reversed by 180-degree from each other, to generate the Mercator image as illustrated in FIG. 3C.

The Mercator image is pasted on the sphere surface using Open Graphics Library for Embedded Systems (OpenGL ES) as illustrated in FIG. 4A. Thus, the full spherical panoramic image as illustrated in FIG. 4B is generated. In other words, the full spherical panoramic image is represented as the Mercator image facing toward a center of the sphere. It should be noted that OpenGL ES is a graphic library used for visualizing two-dimensional (2D) and three-dimensional (3D) data. The full spherical panoramic image is either a still image or a movie.

One may feel strange as viewing the full spherical panoramic image, because the full spherical panoramic image is an image attached to the sphere surface. To resolve this strange feeling, an image of a predetermined area, which is a part of the full spherical panoramic image, is displayed as a planar image having less curves. The image of the predetermined area is referred to as a "predetermined-area image" hereinafter. Hereinafter, a description is given of displaying the predetermined-area image with reference to FIG. 5 and FIGS. 6A and 6B.

Figure 6A:
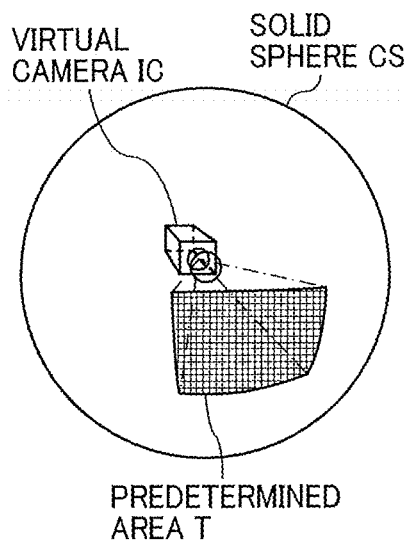
FIG. 6A is a perspective view of FIG. 5.
Figure 6B:
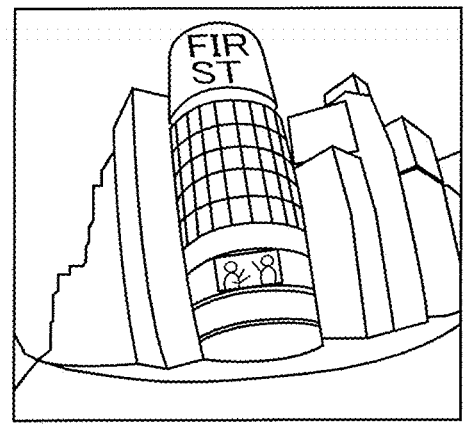
FIG. 6B is a view illustrating an image of the predetermined area on a display of a communication terminal according to an embodiment of the present invention.

FIG. 5 is a view illustrating positions of a virtual camera IC and a predetermined area T in a case in which the full spherical panoramic image is represented as a three-dimensional solid sphere. The virtual camera IC corresponds to a position of a point of view of a user who is viewing the full spherical panoramic image represented as the three-dimensional solid sphere. FIG. 6A is a perspective view of FIG. 5. FIG. 6B is a view illustrating the predetermined-area image displayed on a display. In FIG. 6A, the full spherical panoramic image illustrated in FIG. 4B is represented as a three-dimensional solid sphere CS. Assuming that the generated full spherical panoramic image is the solid sphere CS, the virtual camera IC is outside of the full spherical panoramic image as illustrated in FIG. 5. The predetermined area T in the full spherical panoramic image is specified by predetermined-area information of the position of the virtual camera IC in the full spherical panoramic image. This predetermined-area information is represented by a coordinate x (rH), a coordinate y (rV), and an angle of view α (angle), for example. Zooming of the predetermined area T is implemented by enlarging or reducing a range of the angle of view α. In other words, zooming of the predetermined area T is implemented by enlarging or reducing an arc. Further, zooming of the predetermined area T is implemented by moving the virtual camera IC toward or away from the full spherical panoramic image.

An image of the predetermined area T in the full spherical panoramic image illustrated in FIG. 6A is displayed on a display as the predetermined-area image, as illustrated in FIG. 6B. FIG. 6B illustrates an image represented by the predetermined-area information (x, y, α), which is set by default.

Figure 7:
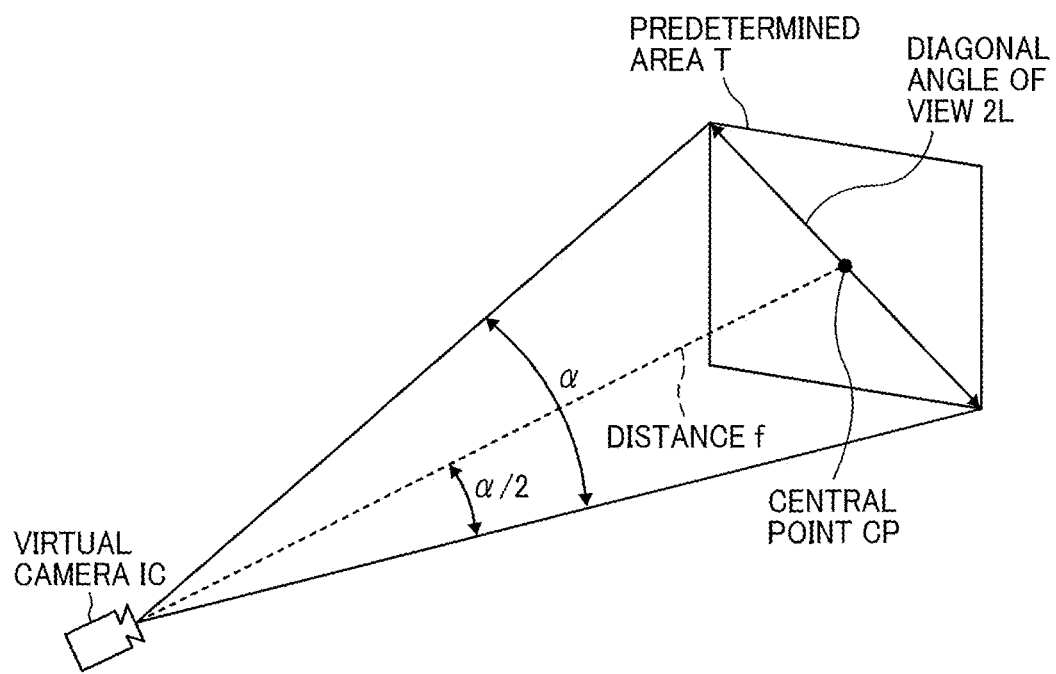
FIG. 7 is a view illustrating a relation between predetermined-area information and a predetermined-area image according to an embodiment of the present invention.

Hereinafter, a description is given of a relation between the predetermined-area information and the predetermined-area image with reference to FIG. 7. FIG. 7 is a view illustrating a relation between the predetermined-area information and the predetermined-area image. As illustrated in FIG. 7, a center point CP of 2L provides the parameters (x, y) of the predetermined-area information, where 2L denotes a diagonal angle of view of the predetermined area T represented by an angle of view α of the virtual camera IC. Distance f denotes a distance from the virtual camera IC to the central point CP. In FIG. 7, a trigonometric function equation generally expressed by the following equation (1) is satisfied.

$$Lf = \tan(\alpha/2) \qquad \text{(Equation 1)}$$

Hereinafter, a description is given of an overview of a configuration of an image communication system 10 according to this embodiment with reference to FIG. 8.

Figure 8:
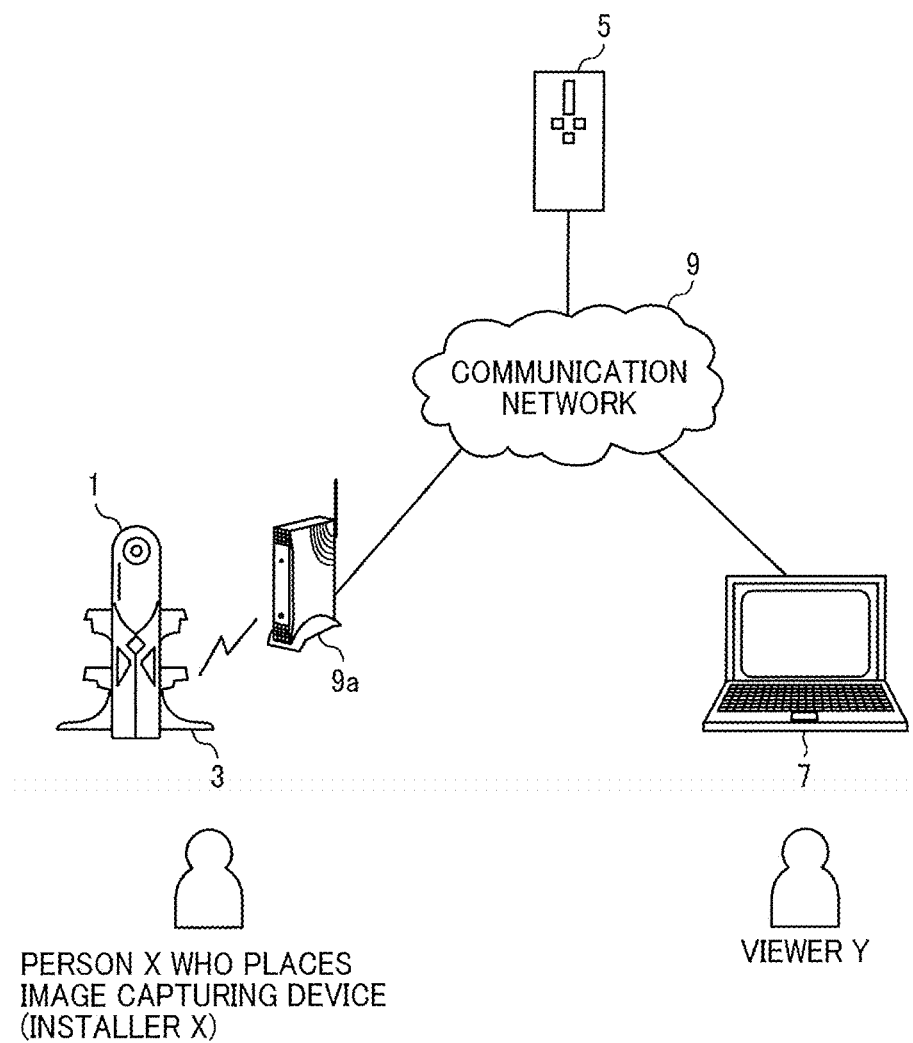
FIG. 8 is a schematic view illustrating an image communication system according to an embodiment of the present invention.

FIG. 8 is a schematic diagram illustrating a configuration of the image communication system 10 according to this embodiment.

As illustrated in FIG. 8, the image communication system 10 according to the present embodiment includes the image capturing device 1, a communication terminal 3, a wireless router 9a, an image management system 5, and a communication terminal 7.

As described above, the image capturing device 1 is a digital camera capable of obtaining the full spherical panoramic image. Alternatively, the image capturing device 1 may be a typical digital camera. In a case in which the communication terminal 3 includes a camera, the communication terminal 3 may also operate as the digital camera. In this embodiment, a description is given of a case in which the image capturing device 1 is a digital camera that is capable of obtaining the full spherical panoramic image, in order to make the description simple. In this example, the communication terminal 3 operates at least as a docking station that charges the image capturing device 1 or exchanges data with the image capturing device 1. The communication terminal 3 communicates data with the image capturing device 1 via a contact. In addition, the communication terminal 3 communicates data with the image management system 5 via the wireless router 9a and a communication network 9. The communication network 9 is implemented by, for example, the Internet.

The image management system 5 communicates data with the communication terminal 3 and the communication terminal 7 via the communication network 9. The image management system 5 is implemented by, for example, a server computer. The image management system 5 is installed with OpenGL ES to generate the full spherical panoramic image.

The communication terminal 7 communicates data with the image management system 5 via the communication network 9.

The communication terminal 7 is implemented by, for example, a laptop computer. It should be noted that the image management system 5 may be implemented by either a single server computer or a plurality of server computers.

Hereinafter, a description is given of hardware configurations of the image capturing device 1, the communication terminal 3, the communication terminal 7, and the image management system 5 according to this embodiment with reference to FIGS. 9 to 11.

First, a description is given of a hardware configuration of the image capturing device 1 with reference to FIG. 9. FIG. 9 is a block diagram illustrating a hardware configuration of the image capturing device 1. Although a description is given of a case in which the image capturing device 1 is an omnidirectional image capturing device having two imaging elements, the image capturing device 1 may include three or more imaging elements. In addition, the image capturing device 1 is not necessarily an image capturing device dedicated to omnidirectional image capturing. Alternatively, an external omnidirectional image capturing unit may be attached to a general digital camera or smartphone to implement an image capturing device having a substantially same function as that of the image capturing device 1.

As illustrated in FIG. 9, the image capturing device 1 includes an imaging unit 101, an image processor 104, an imaging controller 105, a microphone 108, a sound processor 109, a central processing unit (CPU) 111, a read only memory (ROM) 112, a static random access memory (SRAM) 113, a dynamic random access memory (DRAM)

114, an operation unit 115, a network interface (I/F) 116, a communication unit 117, and an antenna 117a.

The imaging unit 101 includes two wide-angle lenses (so-called fish-eye lenses) 102a and 102b, each having an angle of view of equal to or greater than 180 degrees so as to form a hemispheric image. The imaging unit 101 further includes the two imaging elements 103a and 103b corresponding to the wide-angle lenses 102a and 102b respectively. The imaging elements 103a and 103b each includes an image sensor such as a complementary metal oxide semiconductor (CMOS) sensor and a charge-coupled device (CCD) sensor, a timing generation circuit, and a group of registers. The image sensor converts an optical image formed by the wide-angle lenses 102a and 102b into electric signals to output image data. The timing generation circuit generates horizontal or vertical synchronization signals, pixel clocks and the like for the image sensor. Various commands, parameters and the like for operations of the imaging elements 103a and 103b are set in the group of registers.

Each of the imaging elements 103a and 103b of the imaging unit 101 is connected to the image processor 104 via a parallel I/F bus. In addition, each of the imaging elements 103a and 103b of the imaging unit 101 is connected to the imaging controller 105 via a serial I/F bus such as an I2C bus. The image processor 104 and the imaging controller 105 are each connected to the CPU 111 via a bus 110. Furthermore, the ROM 112, the SRAM 113, the DRAM 114, the operation unit 115, the network I/F 116, the communication unit 117, and the electronic compass 118 are also connected to the bus 110.

The image processor 104 acquires the image data from each of the imaging elements 103a and 103b via the parallel I/F bus and performs predetermined processing on each image data. Thereafter, the image processor 104 combines these image data to generate data of the Mercator image as illustrated in FIG. 3C.

The imaging controller 105 usually functions as a master device while the imaging elements 103a and 103b each usually functions as a slave device. The imaging controller 105 sets commands and the like in the group of registers of the imaging elements 103a and 103b via the I2C bus. The imaging controller 105 receives necessary commands and the like from the CPU 111. Further, the imaging controller 105 acquires status data and the like of the group of registers of the imaging elements 103a and 103b via the I2C bus. The imaging controller 105 sends the acquired status data and the like to the CPU 111.

The imaging controller 105 instructs the imaging elements 103a and 103b to output the image data at a time when the shutter button of the operation unit 115 is pressed. The image capturing device 1 may have a preview function or support displaying movie. In this case, the image data are continuously output from the imaging elements 103a and 103b at a predetermined frame rate (frames per minute).

Furthermore, the imaging controller 105 operates in cooperation with the CPU 111 to synchronize times when the imaging elements 103a and 103b output the image data. It should be noted that although the image capturing device 1 does not include a display in this embodiment, alternatively the image capturing device 1 may include the display.

The microphone 108 converts sounds to audio data (signal). The sound processor 109 acquires the audio data from the microphone 108 via an I/F bus and performs predetermined processing on the audio data.

The CPU 111 controls an entire operation of the image capturing device 1 and performs necessary processing. The ROM 112 stores various programs for the CPU 111. The SRAM 113 and the DRAM 114 each operates as a work memory to store the program loaded from the ROM 112 for execution by the CPU 111 or data in current processing. More specifically, the DRAM 114 stores the image data currently processed by the image processor 104 and the data of the Mercator image on which processing has been performed.

The operation unit 115 collectively refers to various operation keys, a power switch, the shutter button, and a touch panel having functions of both displaying information and receiving input from a user, which may be used in combination. The user operates the operation keys to input various photographing modes or photographing conditions.

The network I/F 116 collectively refers to an interface circuit such as an universal serial bus (USB) I/F that allows the image capturing device 1 to communicate data with an external media such as a SD card or an external personal computer. The network I/F 116 supports at least one of wired and wireless communications. The data of the Mercator image, which is stored in the DRAM 114, is stored in the external media via the network I/F 116 or transmitted to the external device such as the communication terminal 3 via the network I/F 116.

The communication unit 117 is implemented by, for example, an interface circuit. The communication unit 117 communicates data with an external device such as the communication terminal 3 via the antenna 117a by a near distance wireless communication such as Wi-Fi and Near Field Communication (NFC). The communication unit 117 is also capable of transmitting the data of Mercator image to the external device such as the communication terminal 3.

The electronic compass 118 calculates an orientation and a tilt (roll angle) of the image capturing device 1 from the Earth's magnetism to output orientation and tilt information. This orientation and tilt information is an example of related information, which is meta data described in compliance with Exif. This information is used for image processing such as image correction of the captured image. Further, the related information also includes a date and time when the image is captured by the image capturing device 1, and a size of the image data.

Hereinafter, a description is given of a hardware configuration of the communication terminal 3 with reference to FIG. 10. FIG. 10 is a block diagram illustrating a hardware configuration of the communication terminal 3, which in this embodiment is implemented by a docking station having a wireless communication capability.

Figure 10:
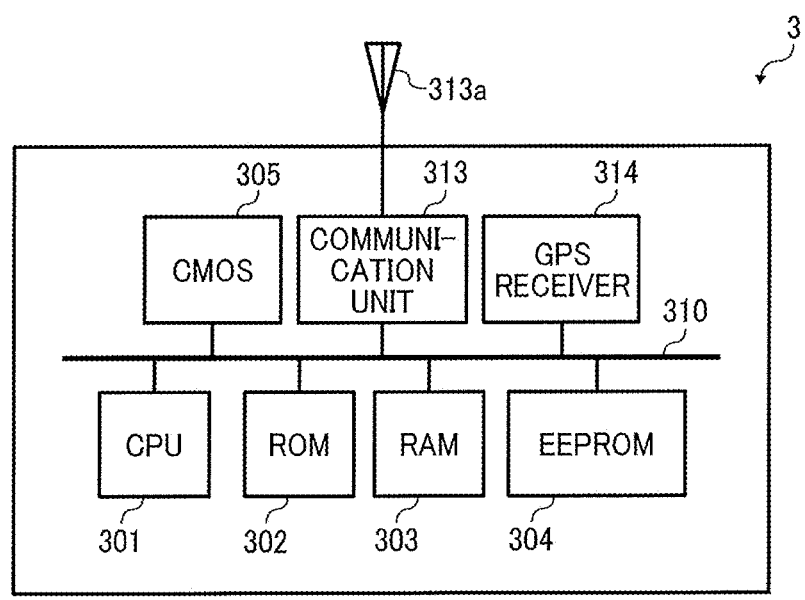
FIG. 10 is a block diagram illustrating a hardware configuration of a communication terminal 3 of FIG. 8 according to an embodiment of the present invention.

As illustrated in FIG. 10, the communication terminal 3 includes a CPU 301, a ROM 302, a RAM 303, an electrically erasable programmable ROM (EEPROM) 304, and a CMOS sensor 305. The CPU 301 controls entire operation of the communication terminal 3. The ROM 302 stores basic input/output programs. The CPU 301 uses the RAM 303 as a work area when executing programs or processing data. The EEPROM 304 performs data reading and writing under control of the CPU 301. The CMOS sensor 305 is an imaging element that captures an image of an object to obtain image data under control of the CPU 301.

The EEPROM 304 stores an operating system (OS) for execution by the CPU 301, other programs, and various data. Instead of the CMOS sensor 305, a CCD sensor may be used.

Further, the communication terminal 3 includes an antenna 313a, a communication unit 313, a global positioning systems (GPS) receiver 314, and a bus line 310. The communication unit 313, which is implemented by, for example, an interface circuit, communicates data with other apparatuses or terminals by wireless communication signals using the antenna 313a. The GPS receiver 314 receives GPS signals containing position information of the communication terminal 3 with GPS satellites or an indoor Messaging system as indoor GPS. This position information of communication terminal 3 is represented by, for example, a latitude, longitude, and altitude. The bus line 310 electrically connects those parts or devices of the communication terminal 3 to each other. Examples of the bus line 310 include an address bus and a data bus.

Hereinafter, a description is given of hardware configurations of the image management system 5 and the communication terminal 7, which in this embodiment is implemented by a laptop computer, with reference to FIG. 11. FIG. 11 is a block diagram illustrating a hardware configuration of any one of the image management system 5 and the communication terminal 7. In this embodiment, both the image management system 5 and the communication terminal 7 are implemented by a computer. Therefore, a description is given of a configuration of the image management system 5, and the description of a configuration of the communication terminal 7 is omitted, having the same or substantially same configuration as that of the image management system 5.

The image management system 5 includes a CPU 501, a ROM 502, a RAM 503, an HD 504, a hard disc drive (HDD) 505, a media drive 507, a display 508, a network I/F 509, a keyboard 511, a mouse 512, a compact-disc read only memory (CD-ROM) drive 514, and a bus line 510. The CPU 501 controls entire operation of the image management system 5. The ROM 502 stores programs such as an initial program loader to boot the CPU 501. The CPU 501 uses the RAM 503 as a work area when executing programs or processing data. The HD 504 stores various data such as programs for the image management system 5. The HDD 505 controls reading and writing of data from and to the HD 504 under control of the CPU 501. The media drive 507 controls reading and writing (storing) of data from and to a recording medium 506 such as a flash memory. The display 508 displays various information such as a cursor, menus, windows, characters, or images. The network I/F 509 communicates data with another apparatus such as the communication terminal 3 and the communication terminal 7 via the communication network 9. The keyboard 511 includes a plurality of keys to allow a user to input characters, numbers, and various instructions. The mouse 512 allows a user to input an instruction for selecting and executing various functions, selecting an item to be processed, or moving the cursor. The CD-ROM drive 514 controls reading and writing of data from and to a CD-ROM 513 as an example of a removable recording medium. The bus line 510 electrically connects those parts or devices of the image management system 5 to each other as illustrated in FIG. 14. Examples of the bus line 510 include an address bus and a data bus.

Figure 12:
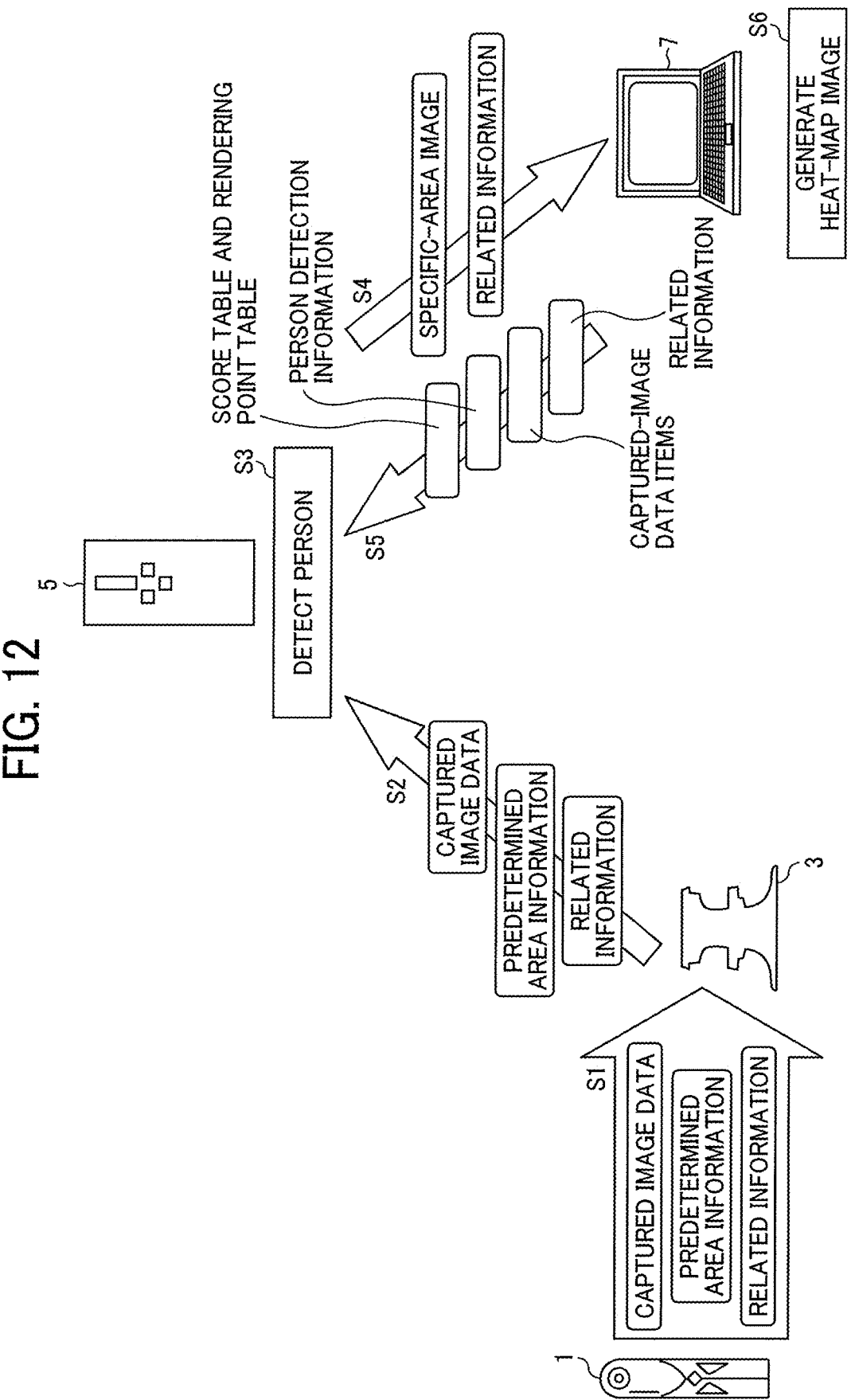
FIG. 12 is a schematic diagram illustrating operation performed by the image communication system according to an embodiment of the present invention.

Hereinafter, a description is given of an overview of processing performed by the image communication system 10 according to the present embodiment with reference to FIG. 12. FIG. 12 is a schematic diagram illustrating operation performed by the image communication system 10 according to the present embodiment.

First, the communication terminal 3 acquires the captured-image data, the predetermined-area information, and the related information from the image capturing device 1 (S1). The communication terminal 3 transmits the captured-image data, the predetermined-area image, and the related information to the image management system 5 (S2). For example, the communication terminal 3 performs this data transmission at one-minute intervals. Next, the image management system 5 detects a person image, which is an image of a person, from the captured-image data (S3). The image management system 5 transmits the predetermined-area image and the related information (S4). Next, in response to a request from the communication terminal 7, the image management system 5 transmits a score table and a drawing point table, person detection information, and a group of captured-image data items (S5). The drawing point table transmitted at S5 contains blank data in cells for positions of drawing points and scores. Thus, the communication terminal 7 stores, in a memory 7000 (described later), the score table, the drawing point table (containing blank data in the cells for a point of drawing point and a score), the person detection information, and the group of captured-image data items. A captured-image ID for identifying the captured-image data is attached to each of the captured-image data items.

Figure 28:
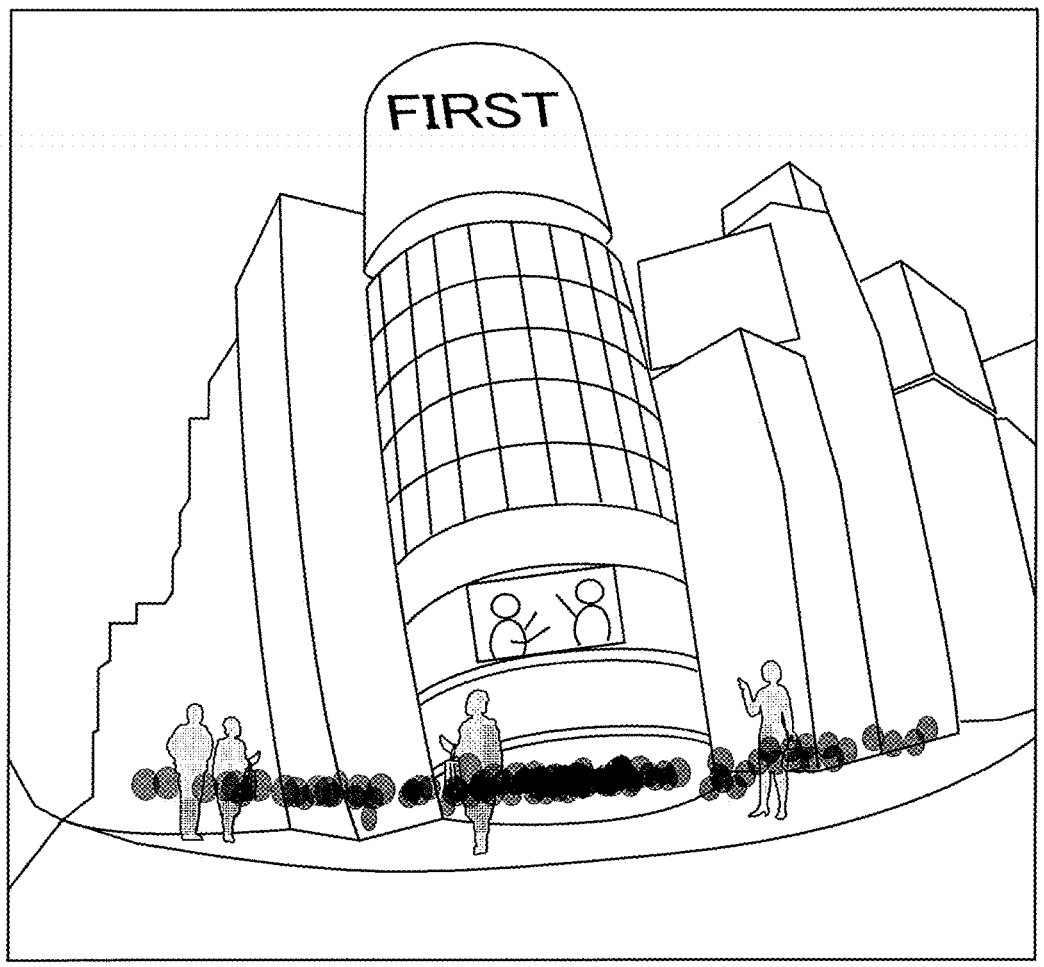
FIG. 28 is a view illustrating the predetermined-area image to which the heat map image generated based on the drawing points is attached according to an embodiment of the present invention.
Figure 29:
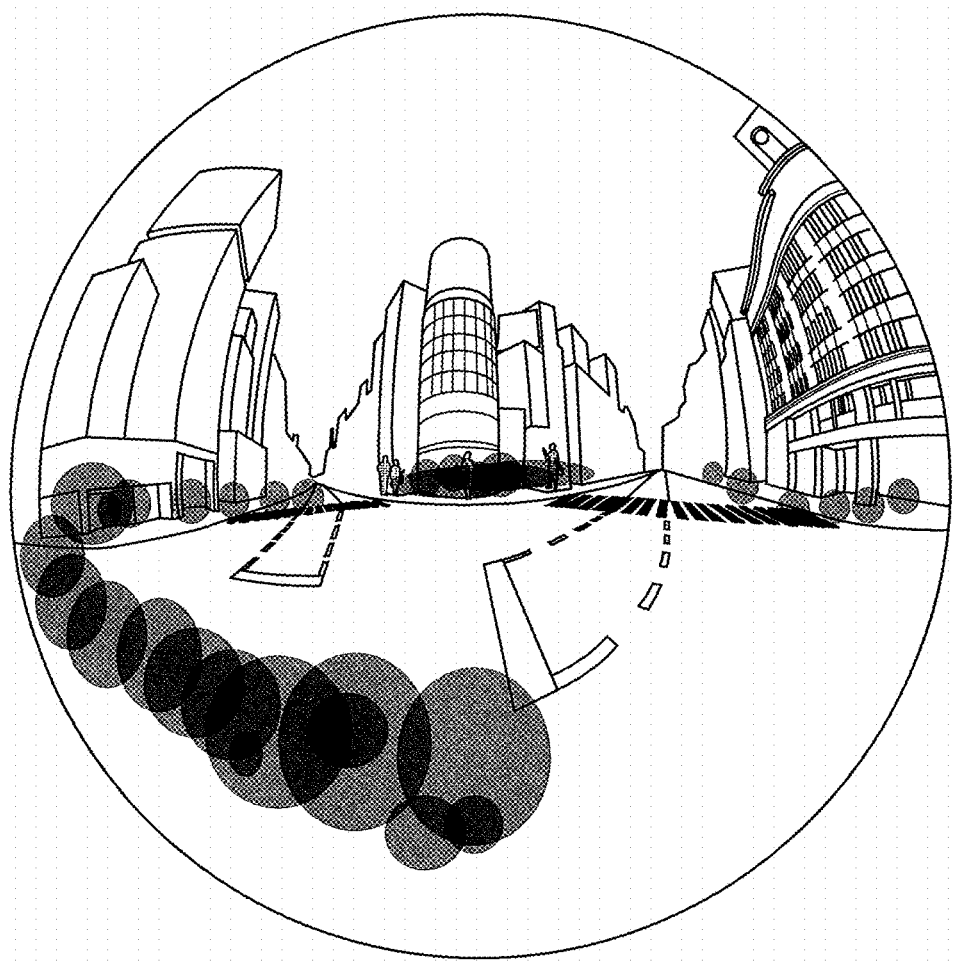
FIG. 29 is a view illustrating the full spherical panoramic image to which the heat map image generated based on the drawing points is attached according to an embodiment of the present invention.

Next, the communication terminal 7 generates a heat map image as illustrated in FIGS. 28 and 29 (S6). This enables a viewer Y to recognize the movement of persons even when the viewer Y does not view a plurality of full spherical panoramic images (or predetermined-area images) for a specific period of time.

Figure 13:
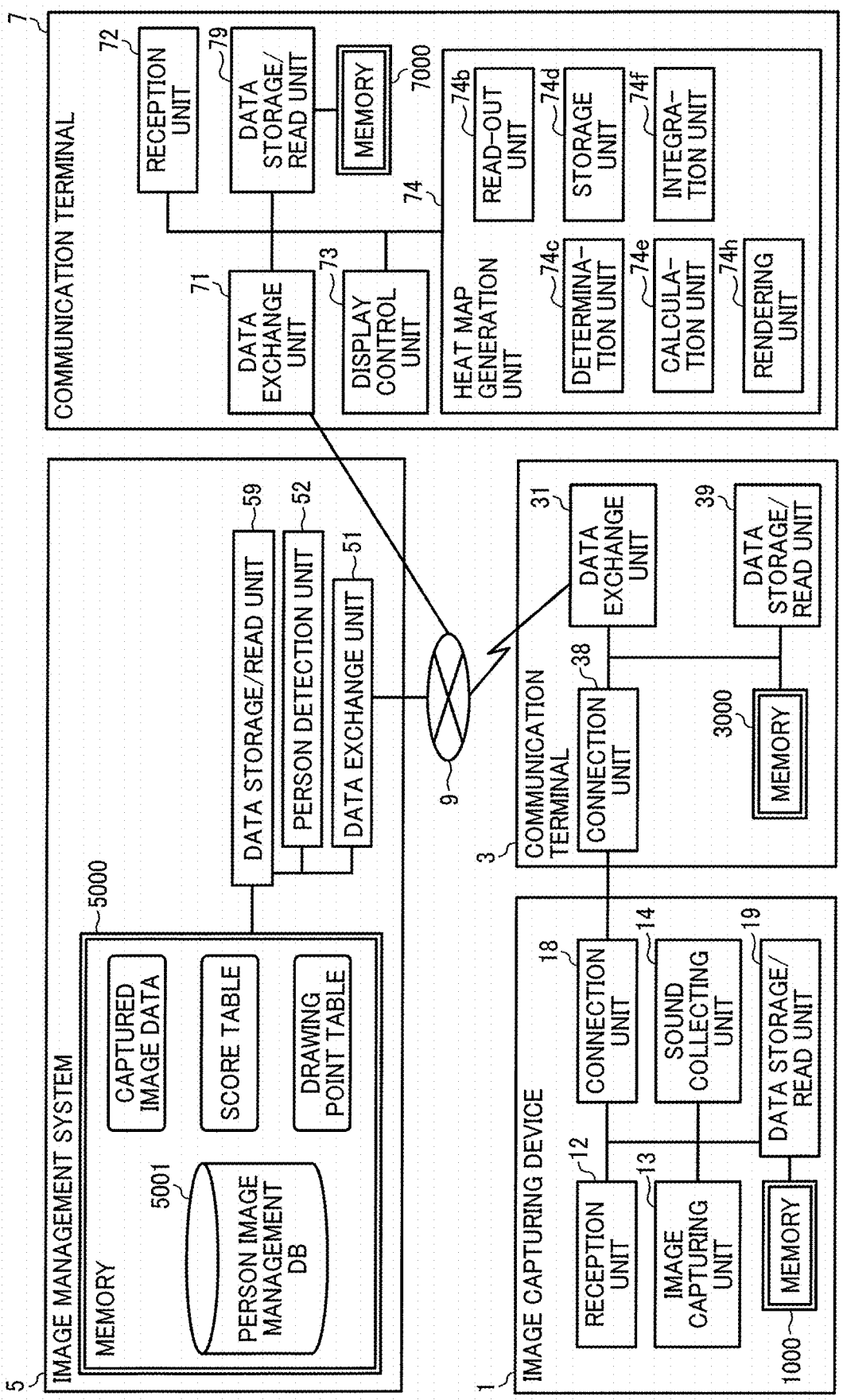
FIG. 13 is a block diagram illustrating a functional configuration of the image communication system according to an embodiment of the present invention.
Figure 17:
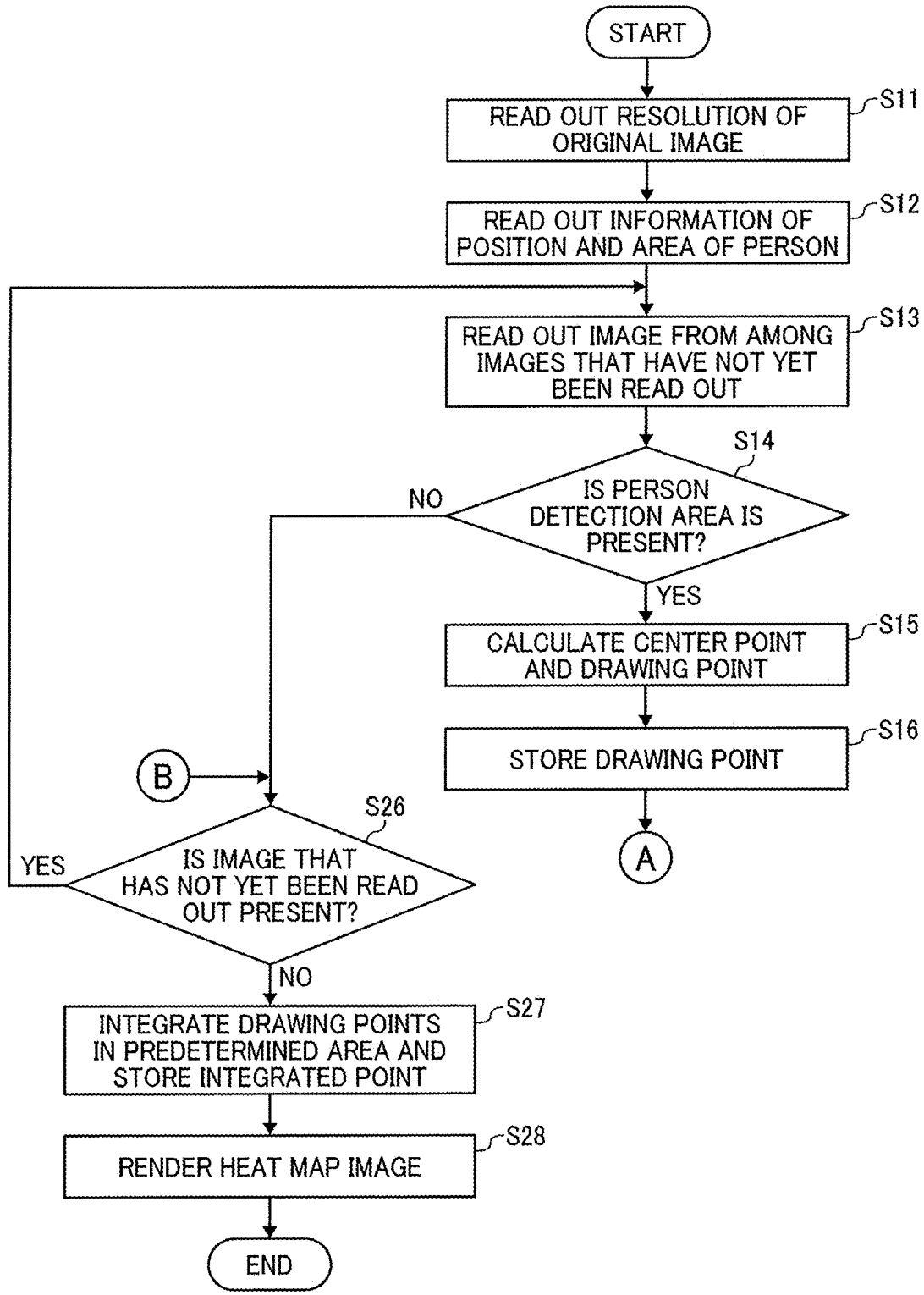
FIG. 17 is a flowchart illustrating an operation of generating a heat map image according to a first embodiment of the present invention.

Hereinafter, a description is given of a functional configuration of the image communication system 10 according to this embodiment with reference to FIGS. 9 to 11 and 13. FIG. 13 is a block diagram illustrating functional configurations of the image capturing device 1, the communication terminal 3, the image management system 5, and the communication terminal 7, which constitute a part of the image communication system 10 according the present embodiment. In the image communication system 10 illustrated in FIG. 13, the image management system 5 performs data communication with the communication terminal 3 and communication terminal 7 via the communication network 9.

As illustrated in FIG. 13, the image capturing device 1 includes a reception unit 12, an image capturing unit 13, a sound collecting unit 14, a connection unit 18, and a data storage/read unit 19. These functional blocks 12 to 19 are implemented by one or more hardware components illustrated in FIG. 9, when operating in accordance with instructions from the CPU 111 executing according to the program for the image capturing device 1, loaded to the DRAM 114 from the SRAM 113.

The image capturing device 1 further includes a memory 1000, which is implemented by the ROM 112, the SRAM 113, or the DRAM 114 illustrated in FIG. 9.

Hereinafter, a detailed description is given of these functional blocks 12 to 19 of the image capturing device 1 with reference to FIGS. 9 and 13.

The reception unit 12 of the image capturing device 1 is implemented by the operation unit 115 and the CPU 111 illustrated in FIG. 9, which operate in cooperation with each other, to receive an instruction input from the operation unit 115 according to a user (an installer X in FIG. 8) operation.

The image capturing unit 13 is implemented by the imaging unit 101, the image processor 104, the imaging controller 105, and the CPU 111 illustrated in FIG. 9, which operate in cooperation with each other, to capture an image of the surroundings and thereby acquire the captured-image data.

The sound collecting unit 14 is implement by the microphone 108 and the sound processor 109 illustrated in FIG. 9, when operating under control of the CPU 111, to collect sounds around the image capturing device 1.

The connection unit 18 is implement by an electrical contact, when operating under control of the CPU 111. The connection unit 18 is provided with power from the communication terminal 3, and performs data communication.

The data storage/read unit 19 is implement by the CPU 111, when executing according to the program loaded to the DRAM 114, to store data or information in the memory 1000 and read out data or information from the memory 1000.

As illustrated in FIG. 13, the communication terminal 3 includes a data exchange unit 31, a connection unit 38, and a data storage/read unit 39. These functional blocks 31, 38 and 39 are implemented by one or more hardware components illustrated in FIG. 10, when operating in accordance with instructions from the CPU 301 executing according to the programs for the communication terminal 3, loaded to the RAM 303 from the EEPROM 304.

The communication terminal 3 further includes a memory 3000, which is implemented by the ROM 302, the RAM 303, and the EEPROM 304 illustrated in FIG. 10.

Hereinafter, a detailed description is given of these functional blocks 31, 38, and 39 with reference to FIGS. 10 and 13.

The data exchange unit 31 of the communication terminal 3 is implemented by the communication unit 313 illustrated in FIG. 10, when operating under control of the CPU 301, to exchange data with the image management system 5 via the wireless router 9a and the communication network 9.

The connection unit 38 is implement by an electrical contact, when operating under control of the CPU 301, to supply power to the communication terminal 3 and perform data communication.

The data storage/read unit 39 is implement by the CPU 301 illustrated in FIG. 10, when executing according to the program loaded to the RAM 303, to store data or information in the memory 3000 and read out data or information from the memory 3000.

It should be noted that a recording medium such as a CD-ROM storing each of the above-described programs and the HD 504 storing those programs may be distributed domestically or overseas as a program product.

Hereinafter, a description is given of a functional configuration of the image management system 5 with reference to FIGS. 11 and 13. The image management system 5 includes a data exchange unit 51, a detection unit 52, and a data storage/read unit 59. These functional blocks 51, 52 and 59 are implemented by one or more hardware components illustrated in FIG. 11, when operating in accordance with instructions from the CPU 501 executing according to the programs for the image management system 5, loaded to the RAM 503 from the HD 504.

Figure 11:
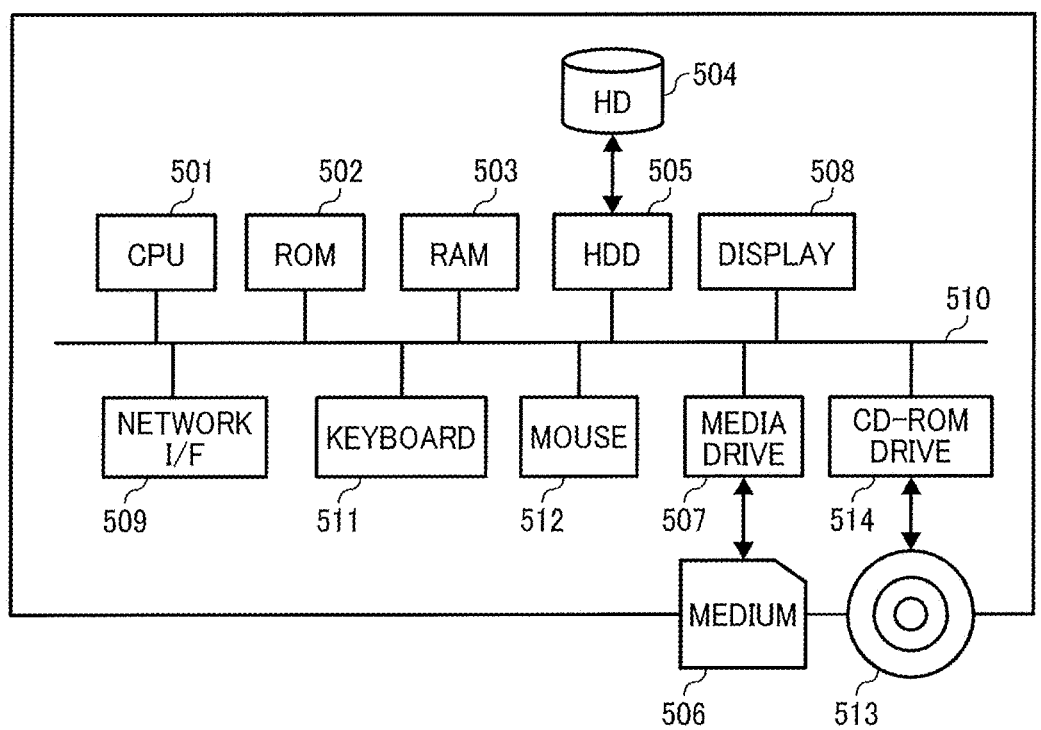
FIG. 11 is a block diagram illustrating a hardware configuration of any one of the image management system and a communication terminal 7 of FIG. 8 according to an embodiment of the present invention.

The image management system 5 further includes a memory 5000, which is implemented by the RAM 503 and the HD 504 illustrated in FIG. 11. The memory 5000 stores the captured-image data transmitted from the communication terminal 3. The memory 5000 further stores the score table illustrated in FIG. 16A and the drawing point table illustrated in FIG. 16B. A description is given later of the drawing point table and the drawing point table.

Further, the memory 5000 includes a person image management DB 5001. A person image management table, which is described below, constitutes the person image management DB 5001. Hereinafter, a detailed description is given of the person image management table, the score table, and the drawing point table.

FIG. 14 is an example of the person image management table. The person image management table stores a file name of captured image data, a capturing date and time, a person detection area ID, and the position and area of a person in association with each captured-image ID.

The captured image ID is an example of captured-image identification information for identifying captured image data. The file name of captured image data indicates a file name of the captured image data identified by the associated captured-image ID. The capturing date and time of captured image indicates a date and time at which the associated captured image data is captured by the image capturing device 1 identified by a device ID. The captured-image data are stored in the memory 5000.

The person detection area ID is an example of person detection area identification information for identifying a person detection area (an area where a person is detected) detected from the captured-image data by the detection unit 52. The person detection area is represented by the position and area of a person, as illustrated in FIG. 15. More specifically, the person detection area is constituted by a person position indicating a reference position (x, y) of a person image (a rectangular image) and an area indicating a width (w) and a height (h) with reference to this person position. In addition to detecting that a certain person image is included in the captured-image data, the detection unit 52 distinguishes different persons based on a feature amount such as a height and width size of a person and color. The position and area of person indicates a specific point of the person image in the captured image data (full spherical panoramic image data), and an area specified by a width and a height. For example, as illustrated in FIG. 15, the person image is detected in the form of a rectangle. An upper-left corner (x11, y11) of the rectangle indicates the reference position of person. The area of person is indicated by the width (w11) of the rectangle and the height (h11) of the rectangle.

The captured image ID, the person detection area ID, and the position and area of person, from among items (field) of the person image management table, constitute the person detection information transmitted at S5 of FIG. 12.

FIG. 16A is an illustration for explaining the score table. The image management system 5 transmits the score table that is stored in advance to the communication terminal 7. The communication terminal 7 uses the score table received from the image management system 5 to generate the heat map image.

As illustrated in FIG. 16A, the score table associates types of center points with scores that are determined in advance. The drawing point is calculated based on the type of the center point from among these various types of center points and the associated score. The image management system 5 transmits the drawing point table that is stored in advance to the communication terminal 7. The communication terminal 7 uses the score table received from the image management system 5 to generate the heat map image.

The types of center point includes a center point (basic center point), an average center point (first average center point), and another type of an average center point (second average center point). The first average center point is an average center point of a plurality of the basic center points. The second average center point is an average center point of a plurality of the first average center points. The highest score is assigned to the second average center point. The second highest score is assigned to the first average center point. The center point (basic center point) is assigned with the lowest score.

FIG. 16B is an illustration for explaining the drawing point table. The drawing point table stores information of each drawing point associating a position of each drawing point with a score. The image management system 5 stores in advance the drawing point table containing blank data in the cells for the position of drawing point and the score. The image management system 5 transmits this drawing point table stored in advance to the communication terminal 7. The communication terminal 7 stores the position of the drawing point and the score in the drawing point table, and uses the drawing point table to generate the heat map image.

Hereinafter, a detailed description is given of the functional blocks 51, 52 and 59 of the image management system 5 with reference to FIG. 13.

The data exchange unit 51 of the image management system 5 is implemented by the network I/F 509 illustrated in FIG. 11, when operating under control of the CPU 501. The data exchange unit 51 exchanges data or information with the communication terminal 3 or the communication terminal 7 via the communication network 9.

The detection unit 52 is implement by the CPU 501 illustrated in FIG. 11, when executing according to the program loaded to the RAM 503. The detection unit 52 detects the person image in the captured-image data. The person image is detected, for example, using a person detection model such as the support vector machine (SVM). More specifically, the detection unit 52 detects each person based on a feature amount of the person image in the captured-image data. Further, the detection unit 52 specifies a position of each detected person image in the captured image data (two-dimensional image data). This feature amount is, for example, a height and width size, color, and a face of a person.

The data storage/read unit 59 is implement by the HDD 505, when operating under control of the CPU 501, to store data or information in the memory 5000 and read out data or information from the memory 5000.

Hereinafter, a description is given of a functional configuration of the communication terminal 7 with reference to FIGS. 11 and 13. The communication terminal 7 includes a data exchange unit 71, a reception unit 72, a display control unit 73, a heat map generation unit 74, and a data storage/read unit 79. These functional blocks 71 to 74, and 79 are implemented by one or more hardware components illustrated in FIG. 11, when operating in accordance with instructions from the CPU 501 executing according to the programs for the communication terminal 7, loaded onto the RAM 503 from the HD 504.

The communication terminal 7 further includes a memory 7000, which is implemented by the RAM 503 and the HD 504 illustrated in FIG. 11.

Hereinafter, a detailed description is given of these functional blocks 71 to 74 and 79 with reference to FIG. 13.

The data exchange unit 71 of the communication terminal 7 is implemented by the network I/F 509 illustrated in FIG. 11, when operating under control of the CPU 501. The data exchange unit 71 exchanges data or information with image management system 5 via the communication network 9.

The reception unit 72 is implement by the keyboard 511 and the mouse 512 illustrated in FIG. 11, when operating under control of the CPU 501, to receive an instruction from a user, e.g., the viewer in FIG. 8.

The display control unit 73 is implemented by the CPU 501 illustrated in FIG. 11, when executing according to the program loaded onto the RAM 503, to control the display 508 of the communication terminal 7 to display images. For example, the display control unit 73 maps the heat map image on an image (the predetermined-area image, a specific-area image, or the captured image) corresponding to the captured-image data. Further, the display control unit 73 controls the display 508 of the communication terminal 7 to display the image on which the heat map image is mapped.

The heat map generation unit 74 is implement by the CPU 501 illustrated in FIG. 11, when executing according to the program loaded onto the RAM 503, to generate the heat map image.

The data storage/read unit 79 is implement by the HDD 505, when operating under control of the CPU 501, to store data or information in the memory 7000 and read out data or information from the memory 7000.

Hereinafter, a detailed description is given of the heat map generation unit 74. The heat map generation unit 74 includes a read-out unit 74b, a determination unit 74c, a storage unit 74d, a calculation unit 74e, an integration unit 74f, and a rendering unit 74h.

The read-out unit 74b reads out various types of data including the score table and the drawing point table from the memory 7000, for example.

The determination unit 74c determines, based on the person detection information transmitted from the image management system 5, whether there is the person detection information in an arbitrary captured-image data item.

The storage unit 74d stores the drawing point, etc., in the memory 7000, for example.

The calculation unit 74e calculates a center point of each person detection area in a plurality of items of the captured-image data, which are obtained by continuously capturing objects surrounding the image capturing device 1 placed at a specific position. Further, the calculation unit 74e calculates a score of the center point based on the score table to calculate the drawing point. Furthermore, the calculation unit 74e specifies the person detection area based on a person position indicating a position of an arbitrary corner of a rectangle area containing a person and an area indicating a width and a height of the rectangle area with reference to the person position.

In a case in which a plurality of center points in the plurality of items of the captured-image data are present in a specific range, the integration unit 74f integrates the plurality of center points in the specific range into a single center point. The integration unit 74f determines a sum of the scores of the plurality of center points as a score of the integrated center point.

The rendering unit 74h renders the heat map image using the drawing point determined based on the center point calculated by the calculation unit 74e for weighting of a gradation of color. Specifically, the rendering unit 74h determines the weighting of gradation of color such that the higher the score of the center point, the darker the center point. Furthermore, the rendering unit 74h performs weighting of the gradation of color using the single center point and the sum of scores, which are determined by the integration unit 74f.

Hereinafter, a description is given of an operation or processing steps according to the present embodiment with reference to FIGS. 17 to 29.

First, the read-out unit 74b reads out a resolution of the original captured-image data from the memory 7000 (S11). Further, the read-out unit 74b reads out the person detection information from the memory 7000 (S12). Then, the read-out unit 74b reads out an arbitrary captured-image data item that has not yet been acquired from among the group of original captured-image data items stored in the memory 7000 (S13).

Figure 19A:
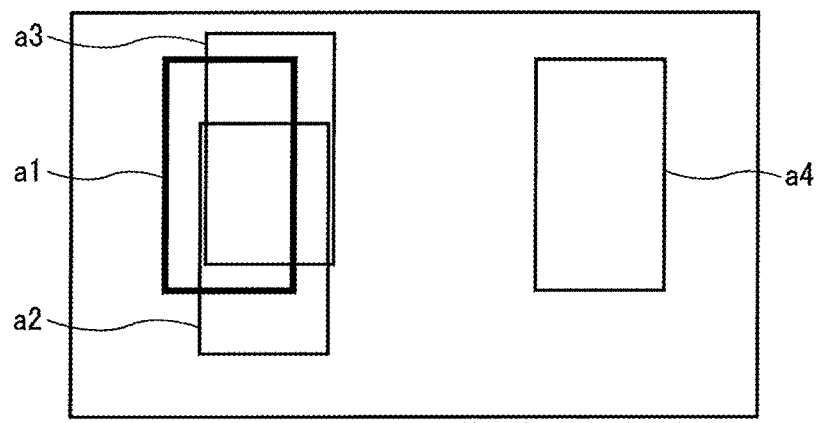
FIGS. 19A to 19C are illustrations for explaining an operation of determining a drawing point (a first center point of a first person detection area and a score of the first center point) according to an embodiment of the present invention.
Figure 19B:
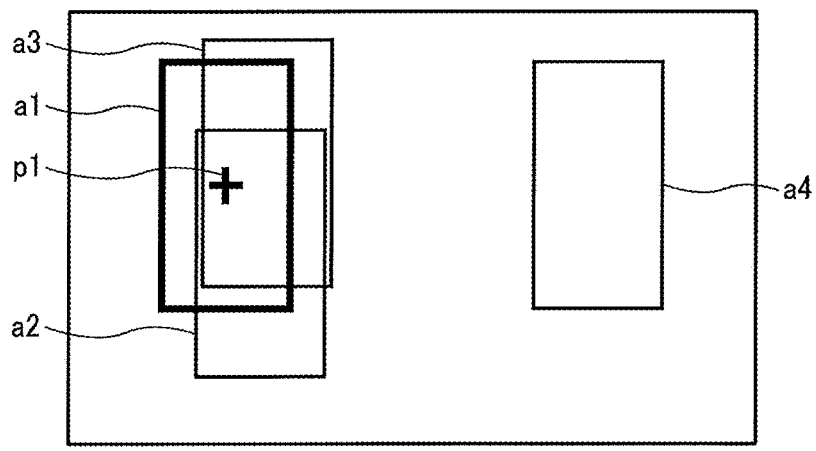
Figure 19C:
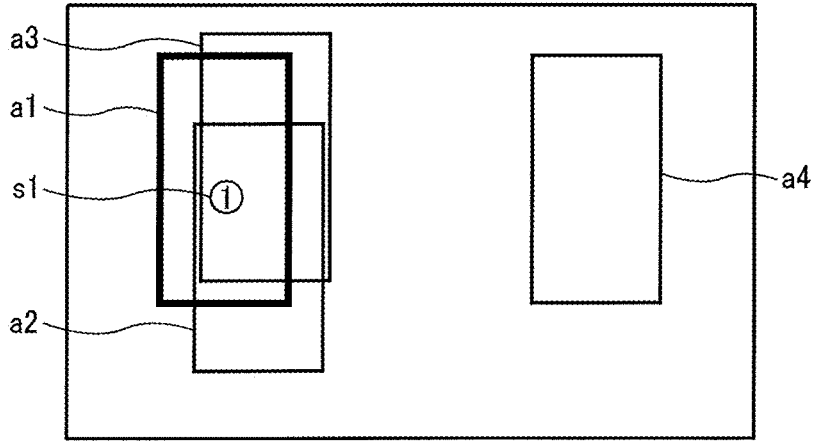

Then, the determination unit 74c determines whether the person detection information that is read out at S12 includes the person detection area ID associated with the same captured image ID as the that of the newly read-out captured-image data to determine whether a person detection area is present in the arbitrary captured-image data item that is read-out at S13 (S14). When the determination unit 74c determines that no person detection area is present in the arbitrary captured-image data item that is read-out at S13 (S14: NO), the operation proceeds to S26. By contrast, the determination unit 74c determines that a person detection area is present (S14: YES), the calculation unit 74e calculates a center point of the person detection area based on the position and area of person from among the person detection information (S15). Further, at S15, the calculation unit 74e calculates a score of a center point p1 using the score table (see FIG. 16A). Specifically, as illustrated in FIG. 19A, when there are four person detection areas in the arbitrary captured image, for example, the calculation unit 74e first selects a person detection area a1, and calculates a center point p1 of the person detection area a1 as illustrated in FIG. 19B. Subsequently, as illustrated in FIG. 19C, the calculation unit 74e calculates a score of the center point p1 using the score table (see FIG. 16A) to calculate a drawing point s1. This drawing point s1 has information indicating both the position of the center point p1 and the score of the center point p1. The drawing point is used for weighting of the gradation of color when generating the heat map image. Referring again to FIG. 17, the storage unit 74d stores the drawing point information indicating the drawing point s1 in the drawing point table stored in the memory 7000 (S16).

Figure 18:
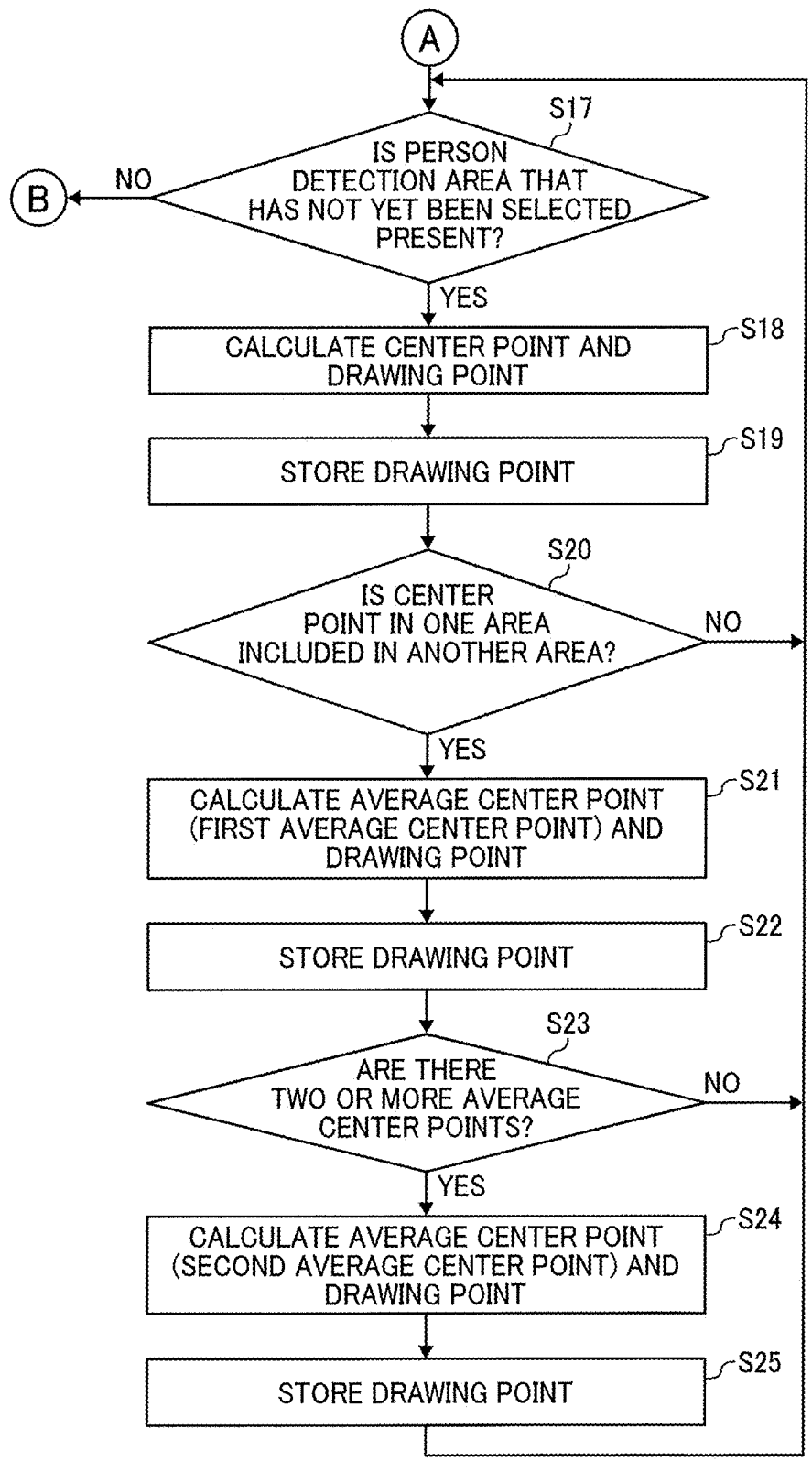
FIG. 18 is a flowchart illustrating an operation of generating the heat map image according to a first embodiment of the present invention.
Figure 20A:
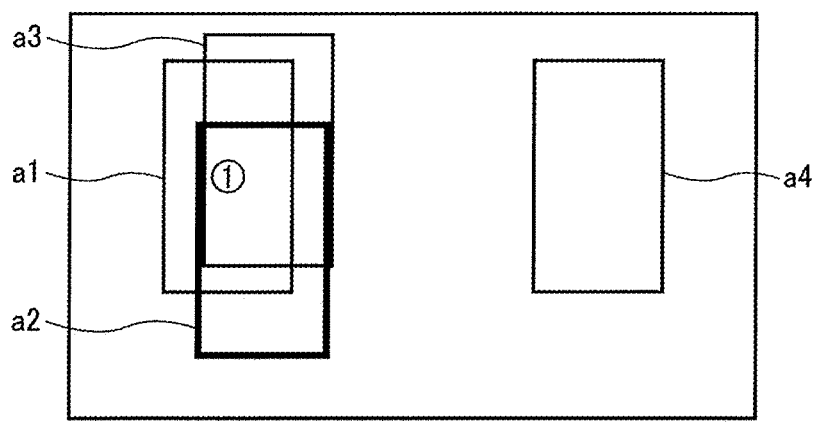
FIGS. 20A to 20C are illustrations for explaining an operation of determining a drawing point (a second center point of a second person detection area and a score of the second center point) according to an embodiment of the present invention.
Figure 20B:
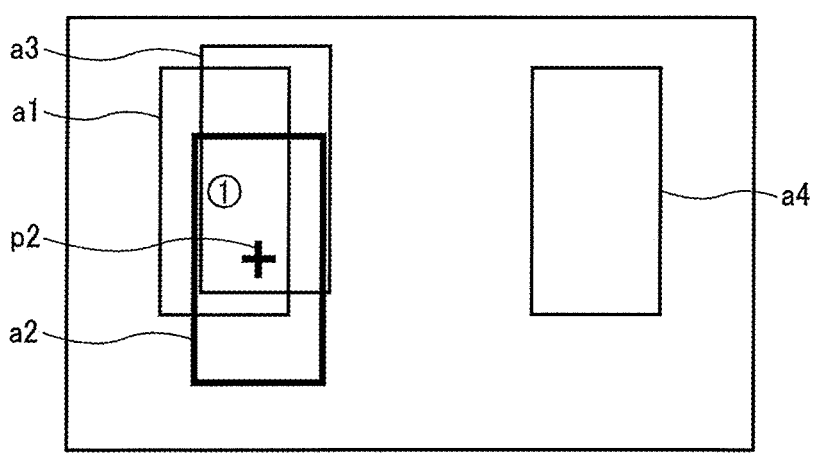
Figure 20C:
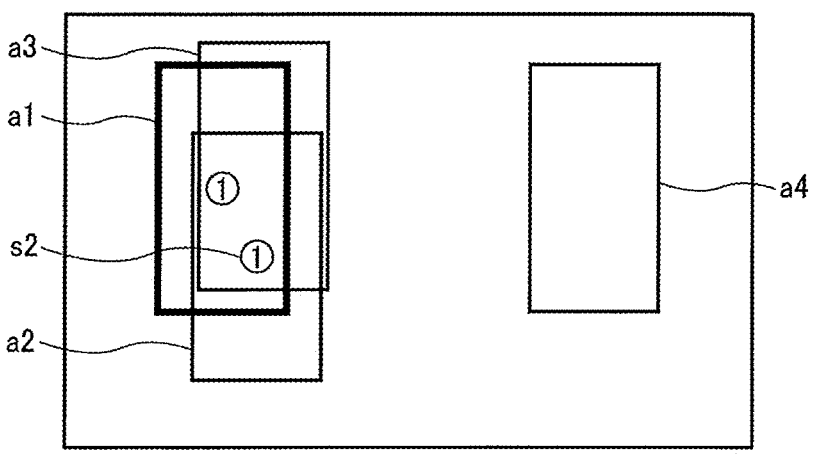

Subsequently, as illustrated in FIG. 18, the determination unit 74c determines whether there is another person detection area that has not yet been selected in the same arbitrary captured-image data item (S17). When the determination unit 74c determines that there is another person detection area that has not yet been selected (S17: YES), the same processes as those of S15 and S16 are performed. In other words, the calculation unit 74e calculates a center point of a next detection area based on the position and area of person from among the person detection information (S18). Further, at S18, the determination unit 74c calculates a score of a center point p2 using the score table (see FIG. 16A). Specifically, as illustrated in FIG. 20A, the calculation unit 74e selects the next person detection area a2 in the same arbitrary captured image, and calculates a center point p2 of the person detection area a2 as illustrated in FIG. 20B. Then, as illustrated in FIG. 20C, the calculation unit 74e calculates a score of the center point p2 using the score table (see FIG. 16A) to calculate a drawing point s2. This drawing point s2 has information indicating both the position of the center point p2 and the score of the center point p2. Referring again to FIG. 18, the storage unit 74d stores drawing point information indicating the drawing point s2 in the drawing point table stored in the memory 7000 (S19).

Figure 21A:
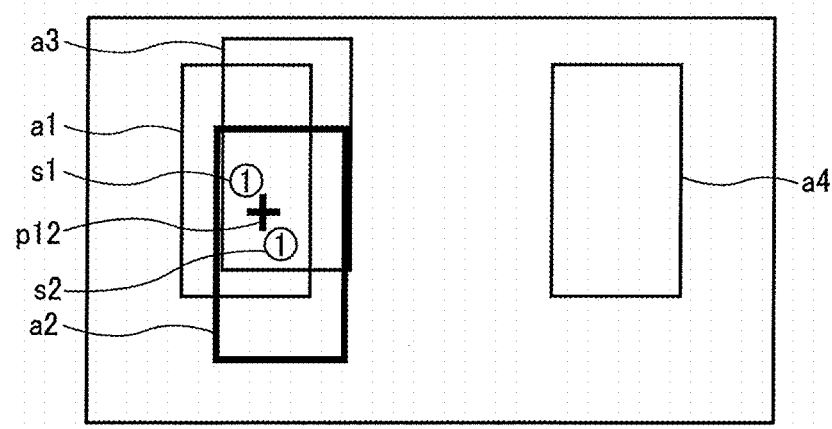
FIGS. 21A and 21B are illustrations for explaining an operation of determining a drawing point (an average center point of the first center point and the second center point, and a score of the average center point) according to an embodiment of the present invention.

Subsequently, the determination unit 74c determines whether one person detection area contains a center point of another person detection area (S20). When the determination unit 74c determines that one person detection area contains no center point of another person detection area (S20: NO), the operation returns to S17. By contrast, when the determination unit 74c determines that one person detection area contains a center point of another person detection area (S20: YES), the calculation unit 74e calculates an average center point using the score table (see FIG. 16A) (S21). Specifically, as illustrated in FIG. 21A, when the person detection area a2 contains the center point of the person detection area a1, the calculation unit 74e calculates a middle position between the drawing point s1 and the drawing point s2 as an average center point p12. Then, the calculation unit 74e calculates a score of the average center point p12 using the score table (see FIG. 16A) to calculate a drawing point s12. This drawing point s12 has information indicating both the position of the average center point p12 and the score of the average center point p12. Referring again to FIG. 18, the storage unit 74d stores drawing point information indicating the drawing point s12 in the drawing point table stored in the memory 7000 (S22).

Figure 22A:
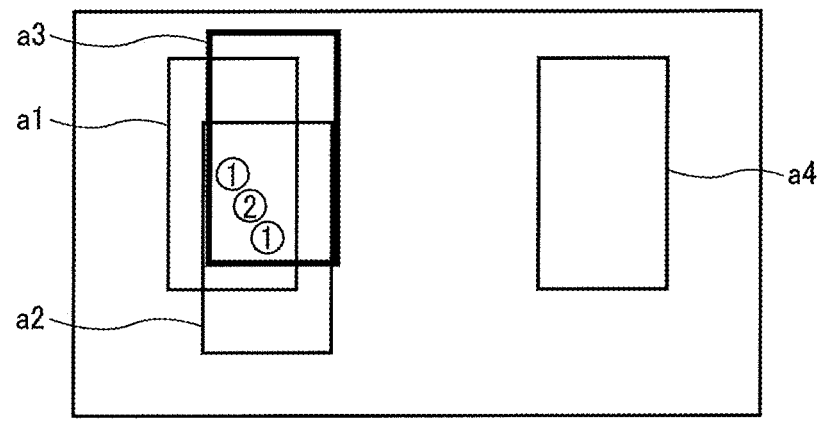
FIGS. 22A to 22C are illustrations for explaining an operation of determining a drawing point (a third center point of a third person detection area and a score of the third center point) according to an embodiment of the present invention.
Figure 22B:
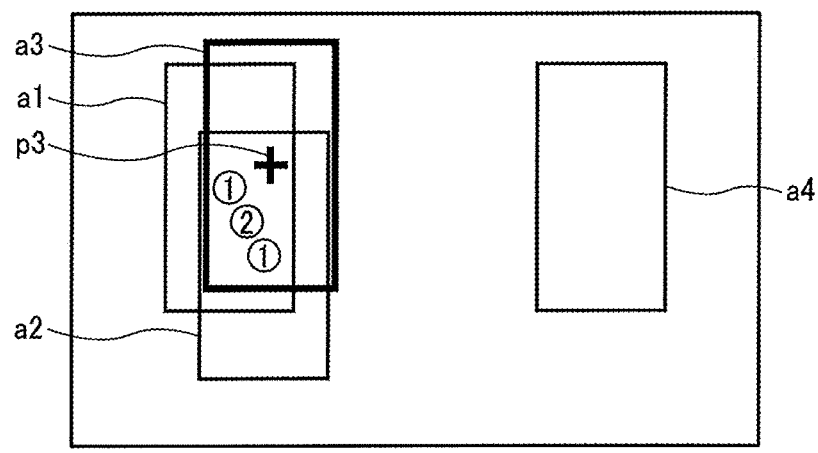
Figure 22C:
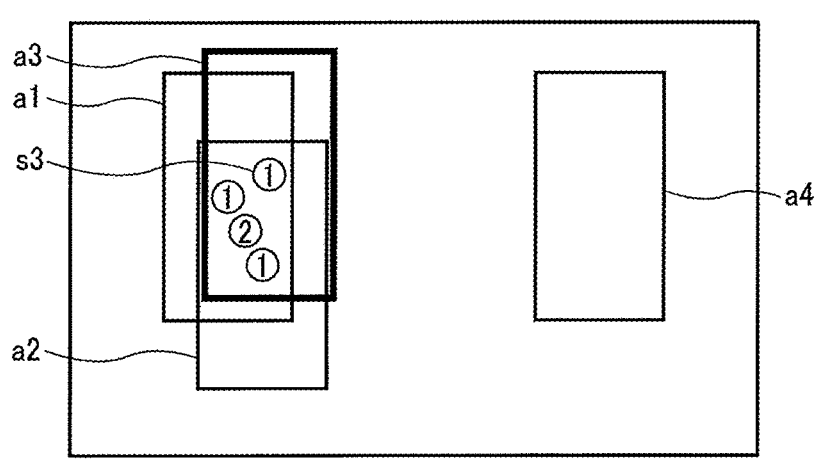

Subsequently, the determination unit 74c determines whether the average center point calculated by the calculation unit 74e includes two or more average center points (S23). Because the calculation unit 74e calculates only one average center point s12 so far (S23: NO), the operation returns to S17. When the determination unit 74c determines that there is a third person detection area a3 as illustrated in FIGS. 22A to 22C (S17: YES), the same processes as those of S18 and S19 are performed on the person detection area a3. Specifically, as illustrated in FIG. 22A, the calculation unit 74e selects the third person detection area a3 in the same arbitrary captured image, and calculates a center point p3 of the person detection area a3 as illustrated in FIG. 22B. Then, as illustrated in FIG. 22C, the calculation unit 74e calculates a score of the center point p3 using the score table (see FIG. 16A) to calculate a drawing point s3. This drawing point s3 has information indicating both the position of the center point p3 and the score of the center point p3.

Figure 23A:
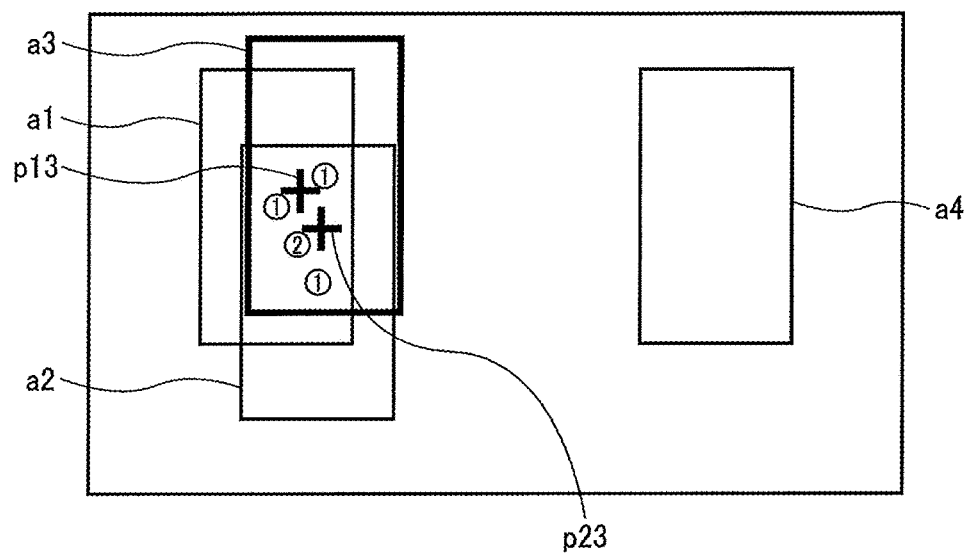
FIGS. 23A and 23B are illustrations for describing an operation of determining a drawing point (the average center point of the first center point and the second center point, and the score thereof), and a drawing point (the average center point of the second center point and the third center point, and a score thereof) according to an embodiment of the present invention.

Further, after S20, the processes of S21 and S22 are performed. Specifically, as illustrated in FIG. 23A, when the person detection area a3 contains the center point of the person detection area a1 and the center point of the person detection area a2, the calculation unit 74e calculates a middle position between the drawing point s1 and the drawing point s3 as an average center point p13 and further calculates a middle position between the drawing point s2 and the drawing point s3 as an average center point p23. Then, the calculation unit 74e calculates a score of the average center point p13 and a score of the average center point p23 using the score table (see FIG. 16A) to calculate a drawing point s13 and a drawing point s23. The drawing point s13 has information indicating both the position of the average center point p13 and the score of the average center point p13. The drawing point s23 has information indicating both the position of the average center point p23 and the score of the average center point p23. Then, the storage unit 74d stores drawing point information items respectively indicating the drawing point s13 and the drawing point s23 in the drawing point table stored in the memory 7000.

Figure 24A:
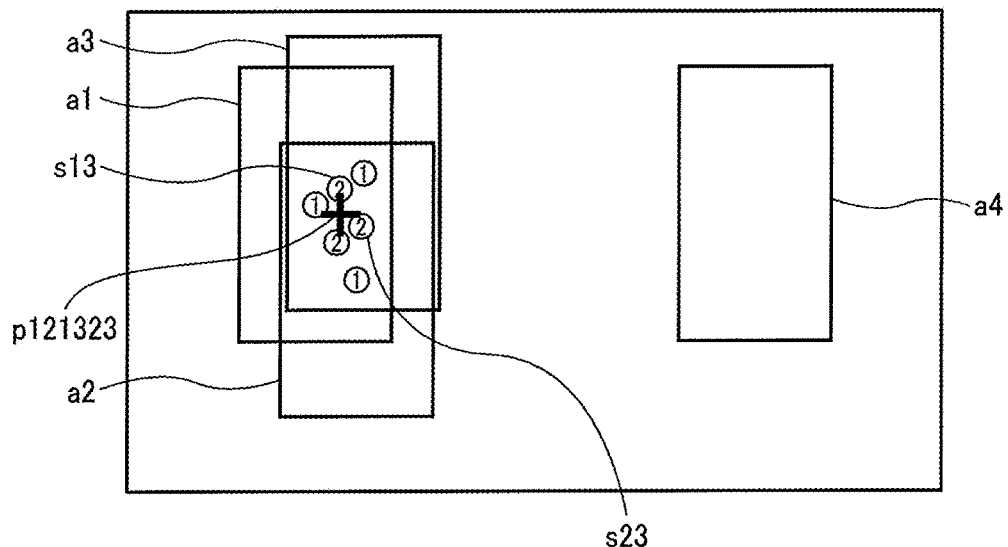
FIGS. 24A and 24B are illustrations for explaining an operation of determining a drawing point (an average center point of a plurality of average center points (a second average center point) and a score thereof) according to an embodiment of the present invention.
Figure 24B:
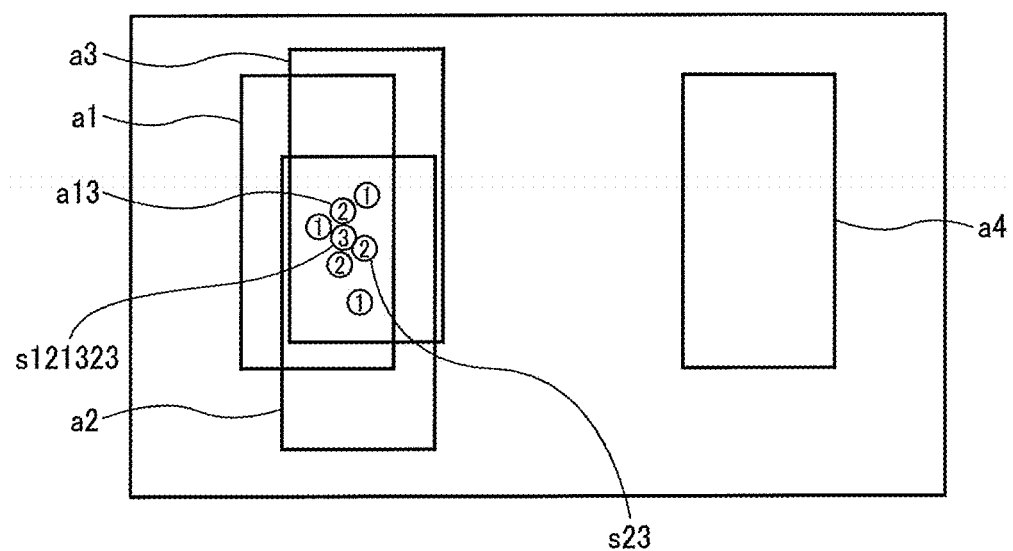

Next, the determination unit 74c determines whether the average center point calculated by the calculation unit 74e includes two or more average center points (S23). When the determination unit 74c determines that the average center point calculated by the calculation unit 74e include two or more average center points (S23: YES), the calculation unit 74e calculates an average center point (the second average center point) of the two or more average center points (S24). Further, at S24, the calculation unit 74e calculates a score of the second average center point using the score table (see FIG. 16A). Specifically, as illustrated in FIG. 24A, the calculation unit 74e calculates a middle position (barycenter) of the three drawing points s12, s13, and s23 as a second average center point p121323. Then, the calculation unit 74e calculates a score of the second average center point p121323 using the score table (see FIG. 16A) to calculate a drawing point s121323. This drawing point s121323 has information indicating both the position of the second average center point p121323 and the score of the second average center point p121323. Then, the storage unit 74d stores drawing point information indicating the drawing point s121323 in the drawing point table stored in the memory 7000 (S25).

Figure 25A:
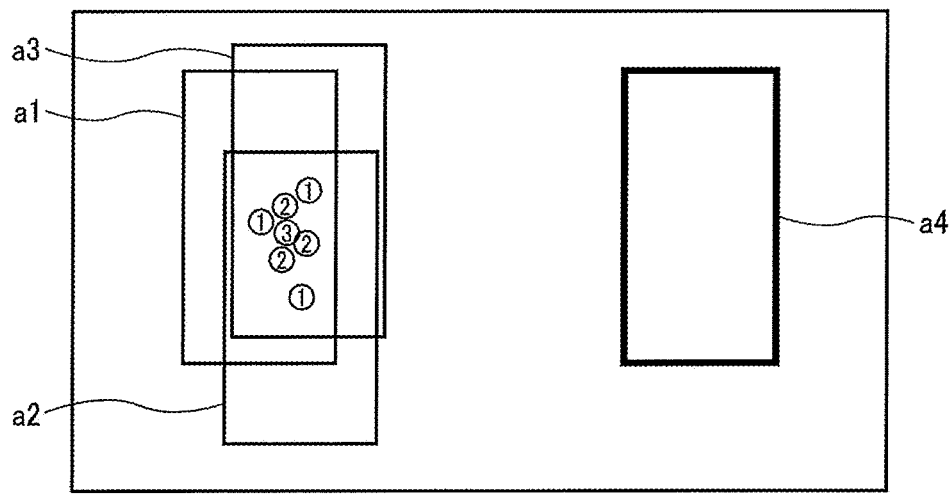
FIGS. 25A to 25C are illustrations for explaining an operation of determining a drawing point (a fourth center point of a fourth person detection area and a score of the fourth center point) according to an embodiment of the present invention.
Figure 25B:
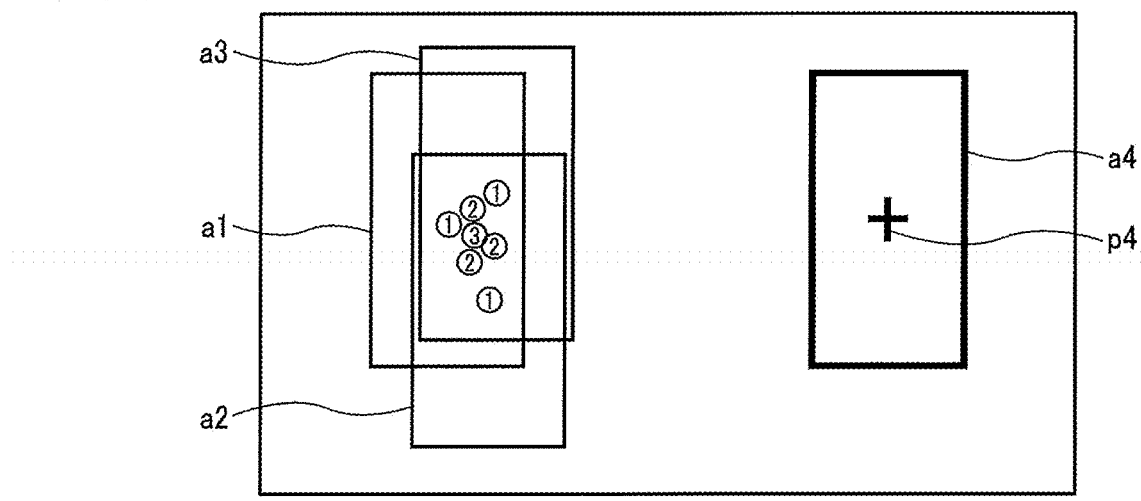
Figure 25C:
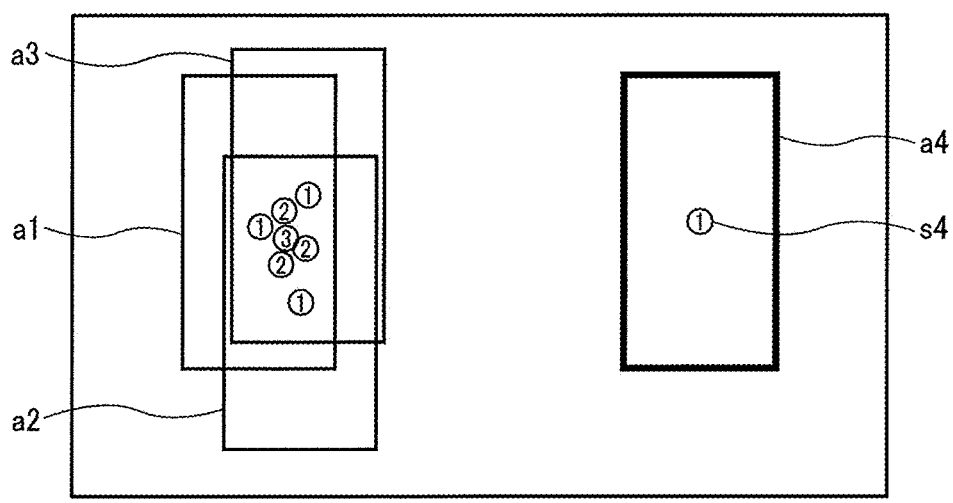

Next, the operation returns to S17 and proceeds to YES, and the processes of S18 and S19 are performed. Specifically, as illustrated in FIG. 25A, the calculation unit 74e selects a fourth person detection area a4 in the same arbitrary captured image, and calculates a center point p4 of the person detection area a4 as illustrated in FIG. 25B. Then, as illustrated in FIG. 25C, the calculation unit 74e calculates a score of the center point p4 using the score table (see FIG. 16A) to calculate a drawing point s4. This drawing point s4 has information indicating both the position of the center point p4 and the score of the center point p4. Then, the storage unit 74d stores drawing point information indicating the drawing point s4 in the drawing point table stored in the memory 7000. With the processing steps as described so far, the calculation of the drawing point is performed on all of the person detection areas in the arbitrary captured-image data item. Accordingly, the operation returns to S17, and the determination unit 74c determines that there is no person detection area that has not yet been selected (S17: NO). Thus, the operation proceeds to S26 illustrated in FIG. 17.

Next, the determination unit 74c determines whether there is a captured-image data item that has not yet been read out by the read-out unit 74b in the group of captured-image data items (S26). When the determination unit 74c determines that there is a captured-image data item that has not yet been read out (S26: YES), the operation returns to S13.

Figure 26A:
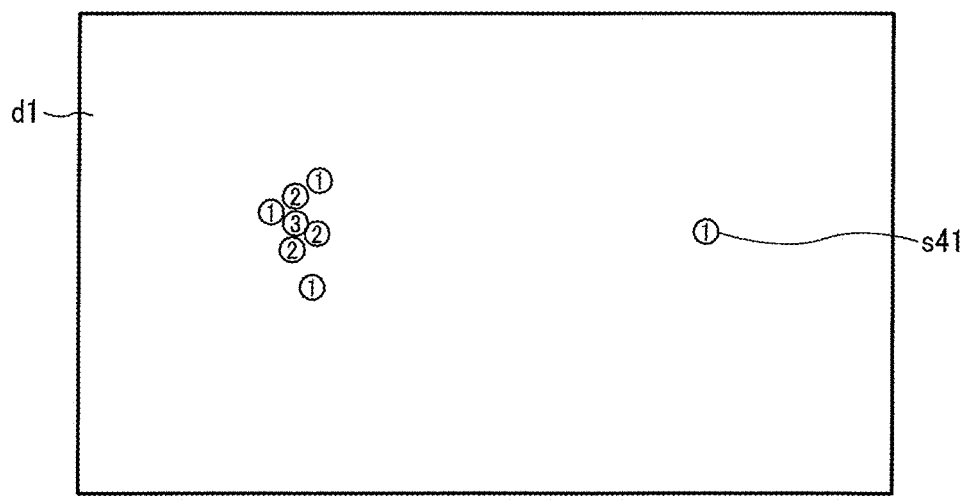
FIGS. 26A to 26C are illustrations for explaining the drawing points (various types of center points in each of a plurality of images and the scores of the center points) according to an embodiment of the present invention.
Figure 26B:
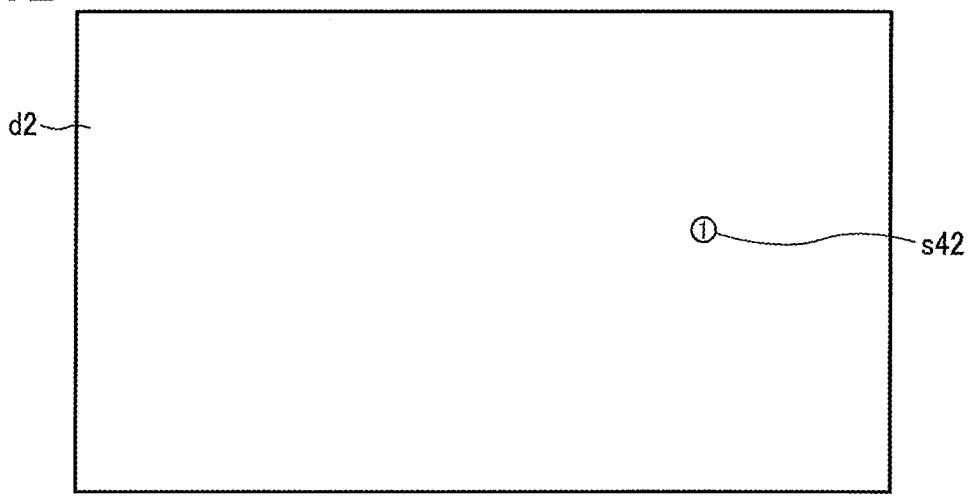
Figure 26C:
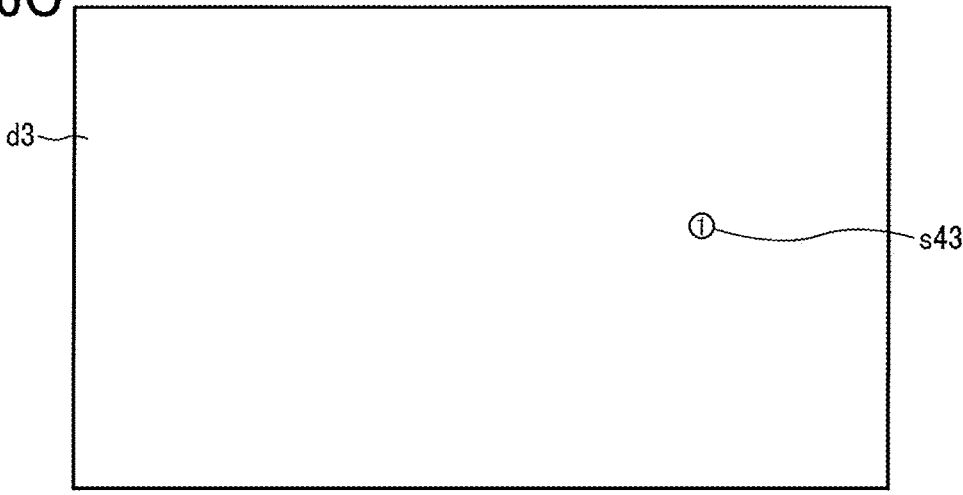
Figure 27A:
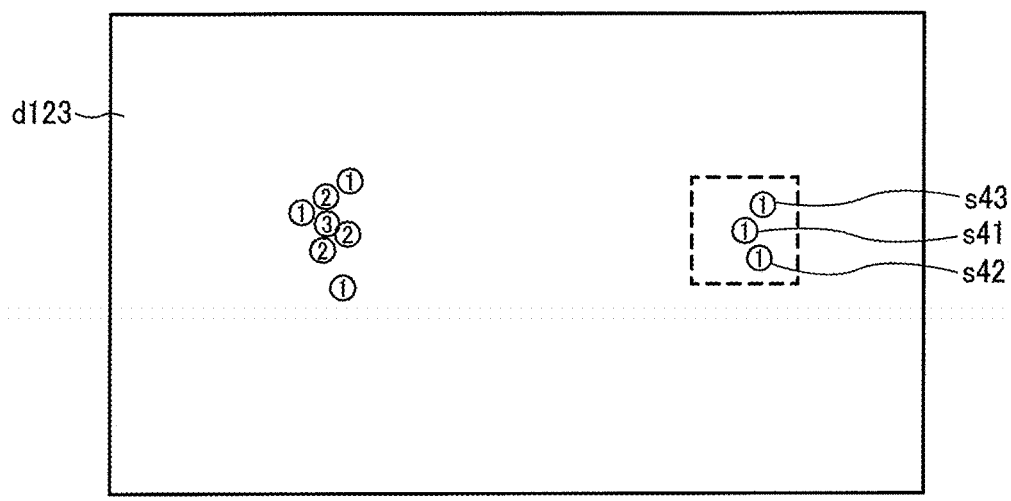
FIGS. 27A and 27B are illustrations for explaining integration of the drawing points in a specific range in a plurality of images according to an embodiment of the present invention.
Figure 27B:
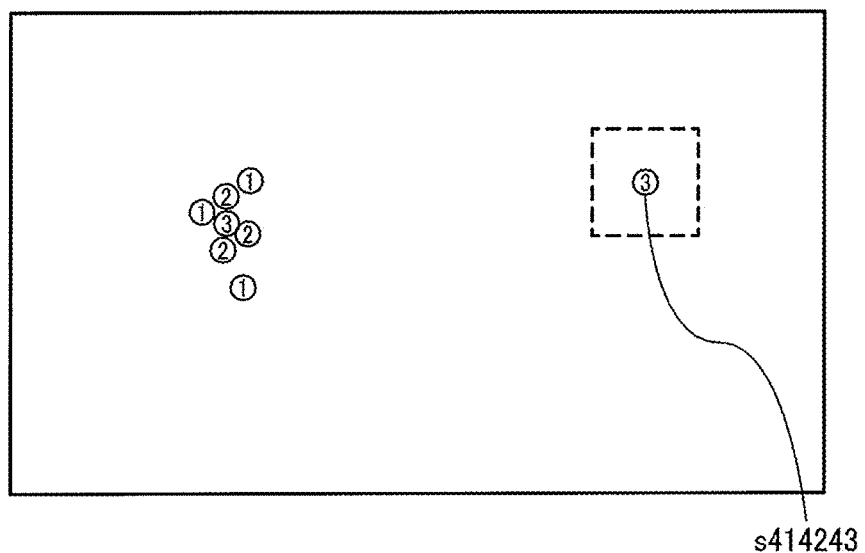

By contrast, when the determination unit 74c determines that there is no captured-image data item that has not yet been read out (S26: NO), the integration unit 74f integrates the drawing points in a specific range (S27). Further, at S27, the storage unit 74d stores drawing point information indicating the integrated drawing point in the drawing point table. Hereinafter, as illustrated in FIGS. 26A to 26C, a description is given of an example in which captured-image data items d1 to d3 that are obtained by capturing an image continuously, respectively contain drawing points s41 to s43 whose positions are different from one another. When the three captured-image data items d1 to d3 are overlaid together, the drawing point s42 and the drawing point s43 exist in a specific range (area indicated by a dotted line) with a center of the specific range at the drawing point s41. In this case, the integration unit 74f integrates the three drawing points s41 to s43 into a single drawing point s414243. The score of the drawing point s414243 is the sum of scores of the three drawing points s41 to s43. It should be noted that, in a case in which the drawing information indicating the integrated drawing point s414243 is stored in the drawing point table, the drawing point information items respectively indicating the drawing points s41 to s43 are kept stored in the drawing point table. However, instead of storing the drawing point information indicating the integrated drawing point s414243, the drawing point information items respectively indicating the drawing points s41 to s43 may be deleted.

With the processing steps as described heretofore, the calculation of the drawing point is performed on all of the captured-image data items, and all of the drawing point information items are stored in the drawing point table. Then, the rendering unit 74h renders the heat map image based on all of the drawing point information items stored in the drawing point table. FIG. 28 is a view illustrating the predetermined-area image (including the specific-area image) to which the heat map image generated based on the drawing points is attached. The display control unit 73 maps the heat map image on the specific-area image and displays the specific-area image on which the heat map image is mapped on the display 508 of the communication terminal 7. In fact, the heat map is expressed depending on the number of the person detection areas existing in the plurality of captured-image data items such that red, orange, yellow, yellow-green, and blue spots are rendered in a descending order of the number of the person detection areas. However, in the example illustrated in FIG. 28, the heat map image is expressed by the gradation of gray color, such that the larger the number of the person detection areas, the darker the color.

FIG. 29 is a view illustrating the full spherical panoramic image to which the heat map image generated based on the drawing points is attached. A illustrated in FIG. 29, in the full spherical panoramic image, when the virtual camera IC illustrated in FIG. 5 is moved away from the solid sphere CS (when the angle of view is widened), the display control unit 73 controls the heat map image to be placed on a front side of the full spherical panoramic image such that the back surface of the heat map image is displayed.

Figure 30:
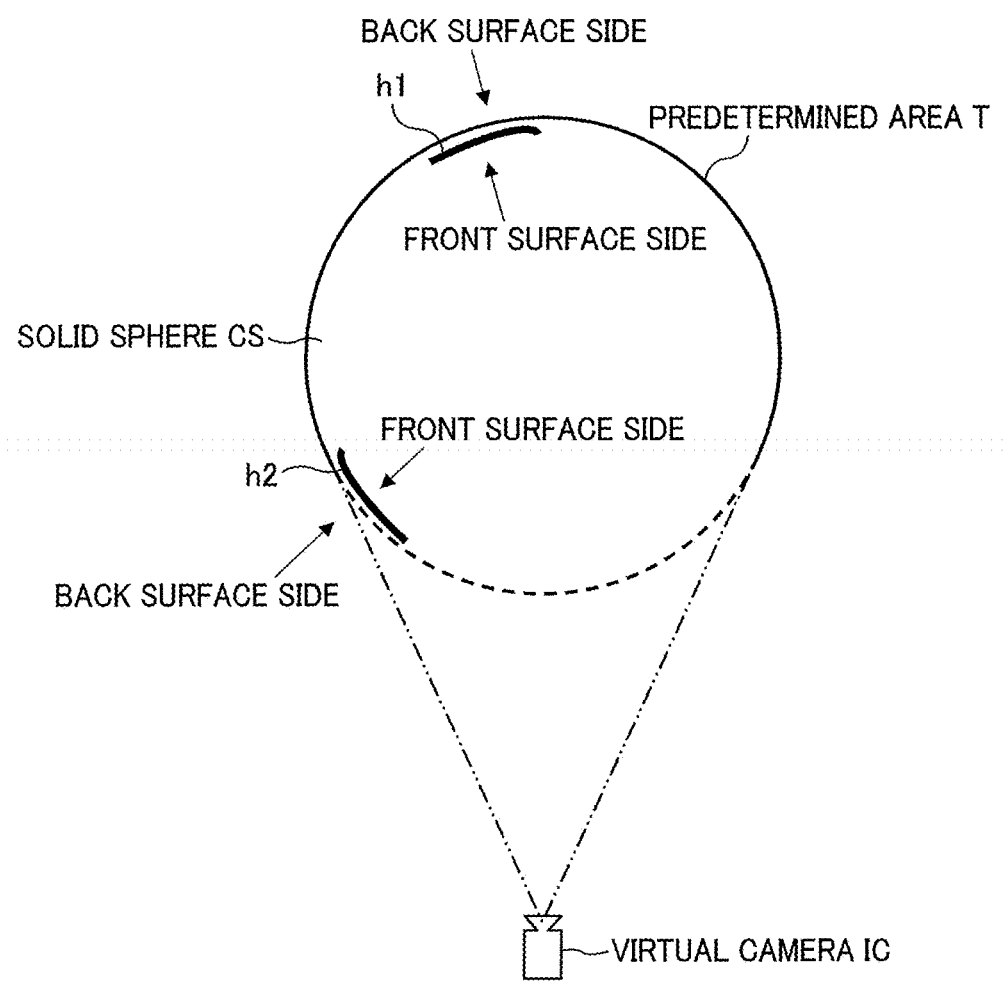
FIG. 30 is an illustration for describing a relation between the full spherical panoramic image and the heat map image according to an embodiment of the present invention.

Hereinafter, a detailed description is given of display of the heat map image illustrated in FIG. 29. FIG. 30 is an illustration for describing a relation between the full spherical panoramic image and the heat map image. FIG. 30 illustrates the same view as a top view illustrated in FIG. 5, in which the full spherical panoramic image indicated by a dotted line is attached to the solid sphere CS, and heat map images h1 and h2 are mapped thereon. When the full spherical panoramic image is viewed from the virtual camera IC, the predetermined-area image of a predetermined area T as a part of the captured-image, a front surface of the heat map image h1, and a back surface of the heat map image h2 are viewed. In this case, the heat map image h2 is placed on a front side (a side that is closer to the virtual camera IC) such that the back side of the heat map image h2 is displayed.

As described heretofore, according to the first embodiment, the rendering unit 74h uses the drawing point s1 obtained based on the center point p1 of the person detection area a1, etc., for the weighting of gradation of color to render the heat map image. The display control unit 73 maps the heat map image on a captured image corresponding the captured-image data, and displays the captured image on which the heat map image is mapped as illustrated in FIGS. 28 and 29. Thus, the faces or feet of persons are displayed even when the display control unit 73 maps the heat map image. Accordingly, a viewer can obtain information from the heat map image and easily recognize a situation represented by the captured image without being disturbed by the heat map image.

In addition, according to the present embodiment, when displaying the full spherical panoramic image, the display control unit 73 controls the heat map image to be placed on the front side of the full spherical panoramic image, such that the back surface of the heat map image is displayed, as illustrated in FIG. 29. Accordingly, the display control unit 73 is able to display the heat map image three-dimensionally. This enables a viewer to recognize easily a situation represented by a captured image with a heat map displaying method specific to the full-spherical panoramic image.

Second Embodiment

A second embodiment of the present invention will be described hereinafter with reference to drawings. It should be noted that a description is given of just an operation or processing steps because the second embodiment is the same or substantially the same as the first embodiment except for the operation or the processing steps.

Figure 31:
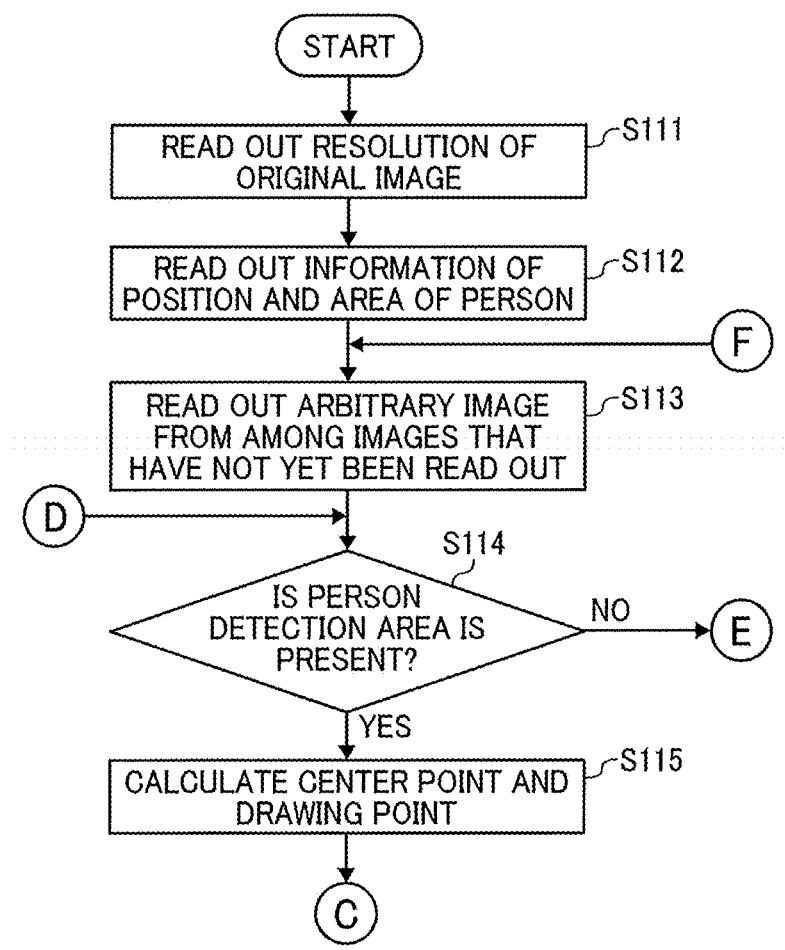
FIG. 31 is a flowchart illustrating an operation of generating the heat map image according to a second embodiment of the present invention.
Figure 33A:
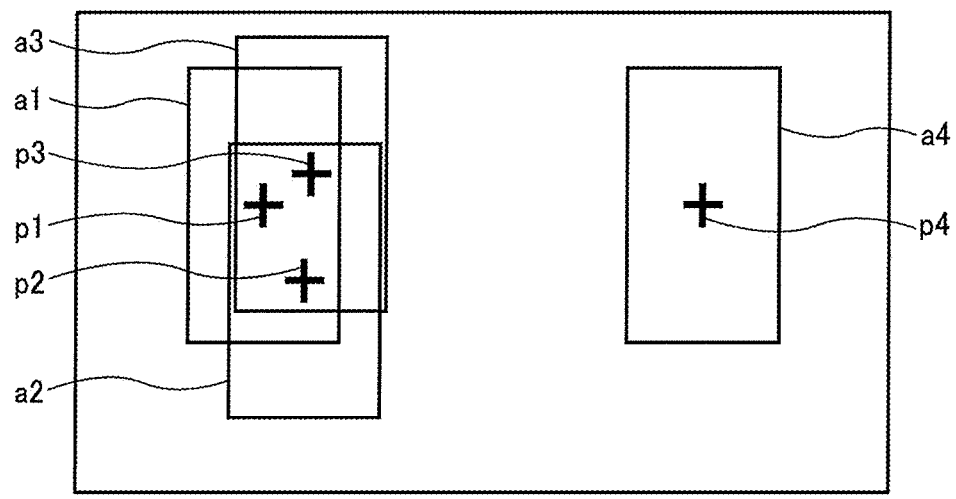
FIGS. 33A and 33B are illustrations for describing an operation of determining each drawing point (the first to fourth center points of the first to fourth person detection areas and the score of each of the first to fourth center points) according to an embodiment of the present invention.
Figure 33B:
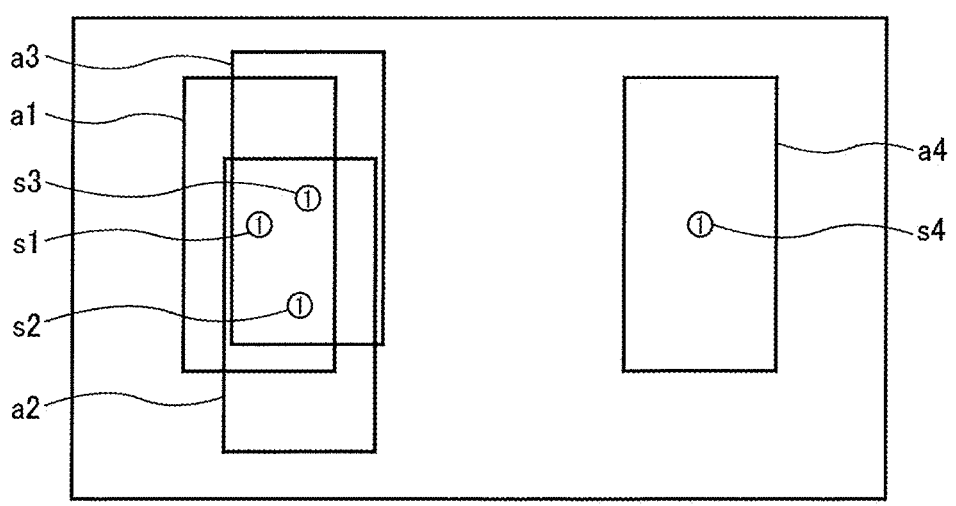
Figure 34A:
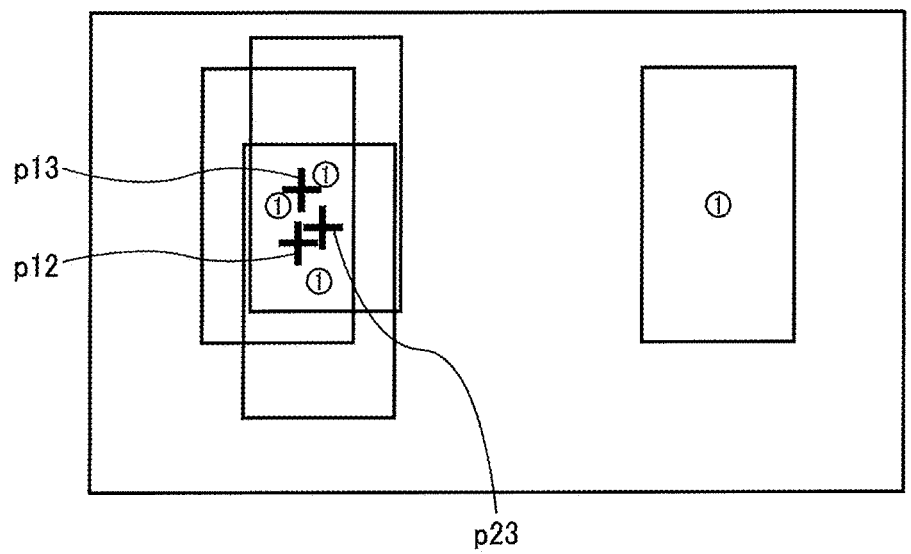
FIGS. 34A and 34B are illustrations for describing an operation of determining a drawing point (an average center point of the first center point and the second center point, and the score thereof), a drawing point (an average center point of the first center point and the third center point, and the score thereof), and an drawing point (an average center point of the second center point and the third center point, and the score thereof) according to an embodiment of the present invention.
Figure 34B:
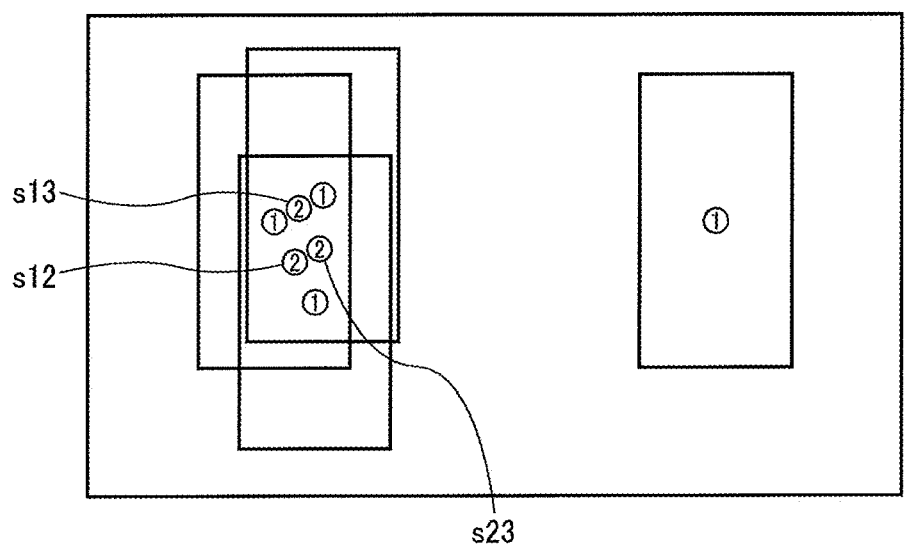

Hereinafter, a description is given of an operation or processing steps according to the second embodiment with reference to FIGS. 31 to 34. FIG. 31 is a flowchart illustrating an operation of generating the heat map image according the second embodiment. FIG. 31 is a flowchart illustrating an operation of generating the heat map image according the second embodiment. FIGS. 33A and 33B are illustrations for describing an operation of determining each of the drawing points (the first to fourth center points of the first to fourth person detection areas and the score of each of the first to fourth center points). FIGS. 34A and 34B are illustrations for describing an operation of determining a drawing point (an average center point between the first center point and the second center point and the score thereof), a drawing point (an average center point between the first center point and the third center point and the score thereof), and an drawing point (an average center point of the second center point and the third center point and the score thereof).

Figure 21B:
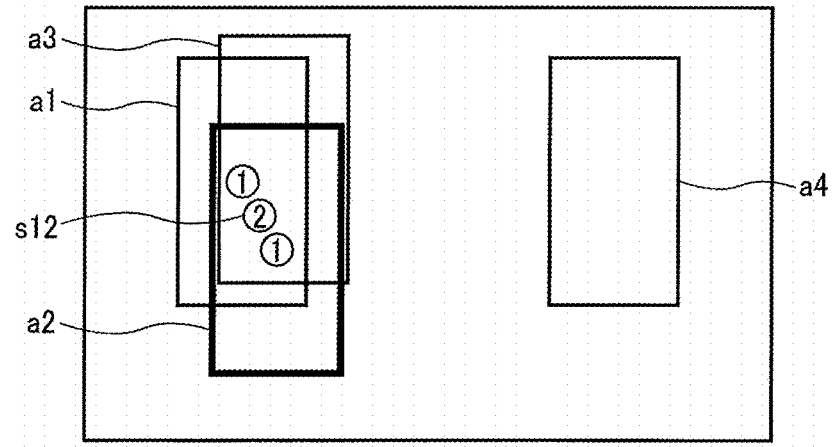
Figure 23B:
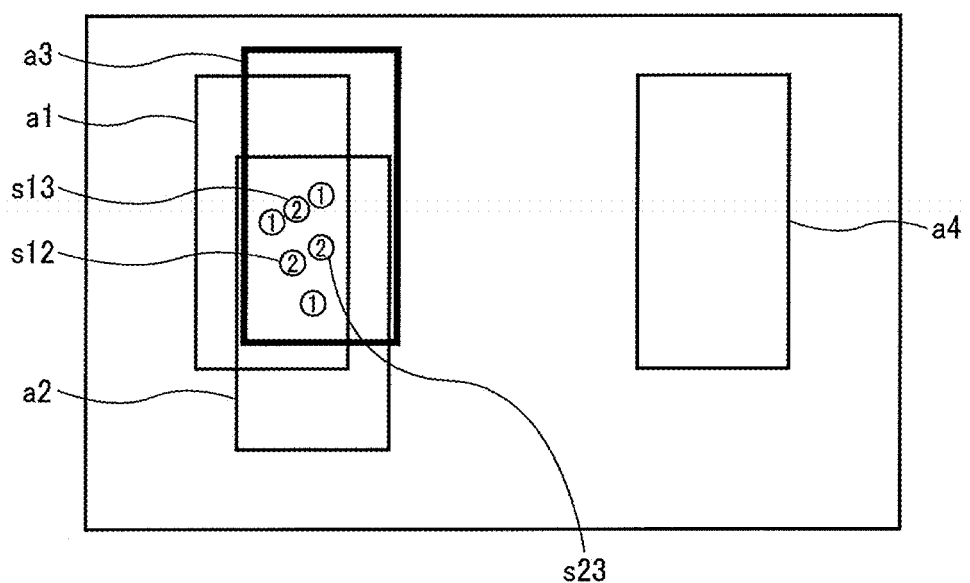

In the first embodiment, the calculation unit 74e calculates the drawing points s1 and s2 in the person detection areas a1 and a2 as illustrated in FIGS. 19A to 19C and 20A to 20C, and thereafter calculates the drawing point s12 based on the average center point p12 as illustrated in FIGS. 21A and 21B. Then, the calculation unit 74e calculates the drawing points s3 in the person detection areas a3 as illustrated in FIGS. 22A to 22C, and thereafter calculates the drawing points s13 and s23 based on the average center points p13 and p23 as illustrated in FIGS. 23A and 23B.

By contrast, in the second embodiment, the calculation unit 74e calculates the center points p1 to p3 of the person detection areas a1 to a3 together at once as illustrated in FIG. 33A to calculate the drawing points s1 to s3 together at once as illustrated in FIG. 33B. Then, the calculation unit 74e calculates the average center points p12, p13, and p23 together at once as illustrated in FIG. 34A. Then, the calculation unit 74e calculates the drawing points s12, s13, and s23 together at once based on the average center points p12, p13, and p23 as illustrated in FIG. 34B. In other words, the processing steps of S111 to S125 in FIGS. 31 and 32 respectively correspond to S11, S12, S13, S14, S15, S16, S21, S22, S23, S24, S25, S16, S26, S27, and S28 in FIGS. 17 and 18.

As described heretofore, according to the second embodiment, the same effect as the first embodiment is produced.

Third Embodiment

Figure 35:
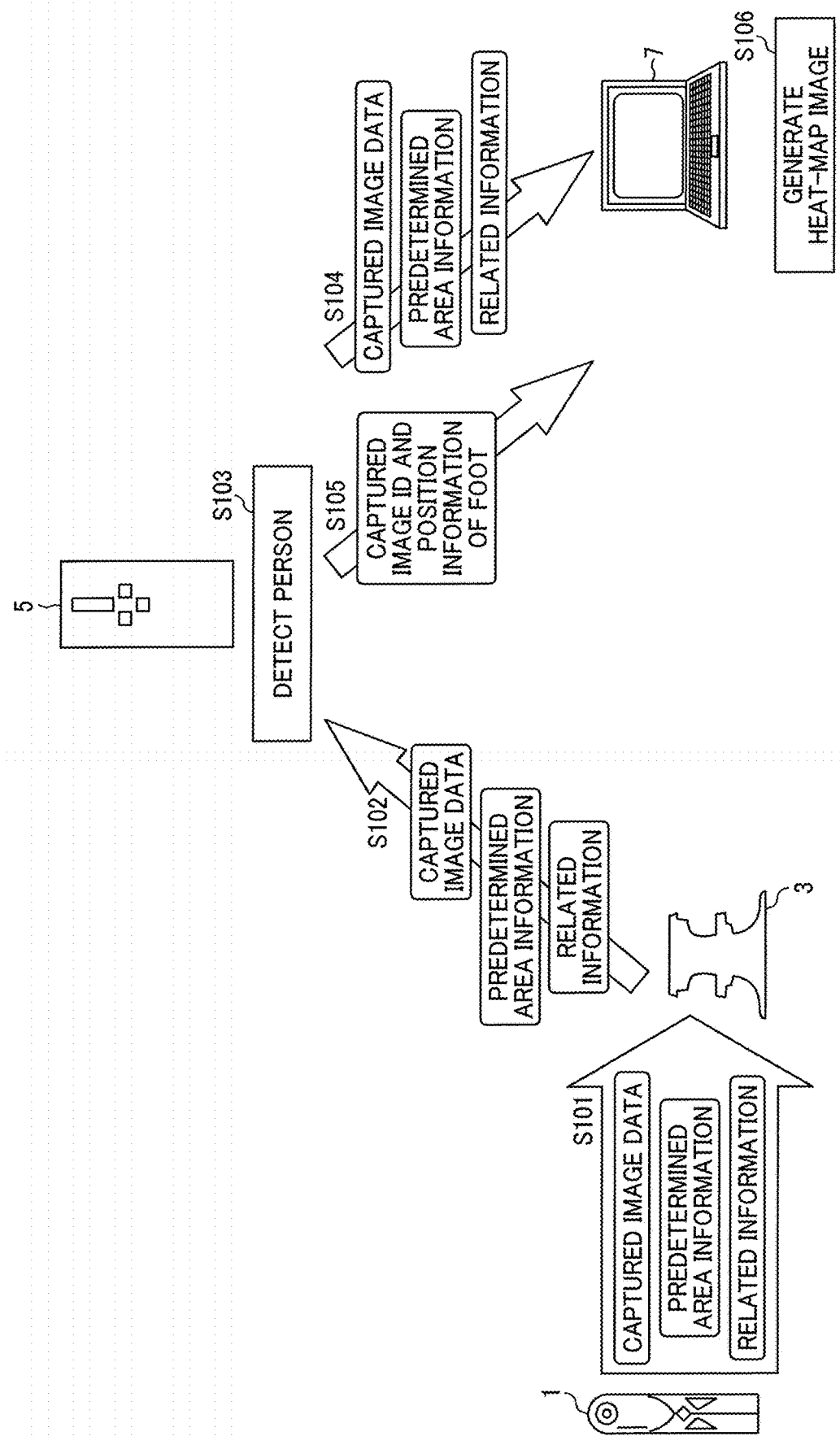
FIG. 35 is a schematic diagram illustrating operation performed by the image communication system according to a third embodiment of the present invention.

Hereinafter, a description is given of a third embodiment of the present invention. An operation of generating a full spherical panoramic image, an overview of a configuration of the image communication system 10, the hardware configurations of the image capturing device 1, the communication terminals 3 and 7, and the image management system 5 according to the third embodiment are the same as those of the first embodiment. Therefore, redundant descriptions thereof are omitted below. Hereinafter, a description is given of an overview of processing performed by the image communication system 10 according to the third embodiment with reference to FIG. 35. FIG. 35 is a schematic diagram illustrating operation performed by the image communication system 10 according to the third embodiment.

Figure 46A:
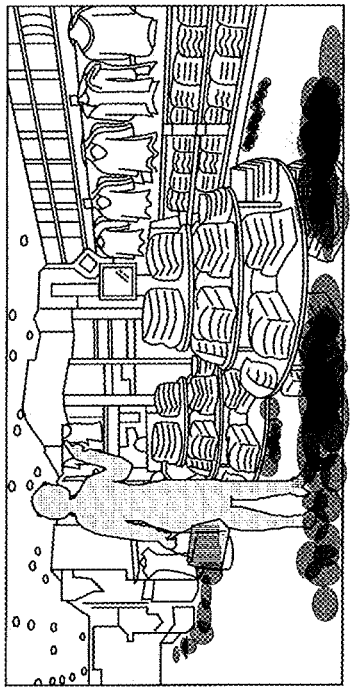
FIG. 46A is a view illustrating the predetermined-area image according to a third embodiment of the present invention.

First, the communication terminal 3 acquires the captured-image data, the predetermined-area information, and the related information from the image capturing device 1 (S101). The communication terminal 3 transmits the captured-image data, the predetermined-area image, and the related information to the image management system 5 (S102). For example, the image capturing by the image capturing device 1 and the data transmission from the communication terminal 3 are each performed at certain time intervals such as every one minute. Then, in response to a request from the communication terminal 7, the image management system 5 transmits the captured-image data, the predetermined-area information, and the related information (S103). Thus, the communication terminal 7 displays a predetermined-area image indicated by the predetermined-area information in a captured-image corresponding to the captured-image data as illustrated in FIG. 46A.

Figure 46B:
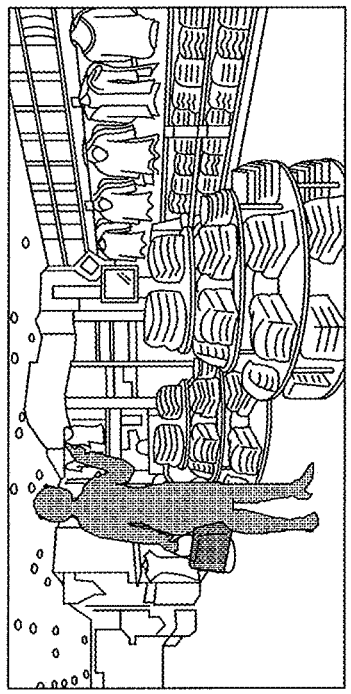
FIG. 46B is a view illustrating the predetermined-area image on which the heat map is superimposed according to a third embodiment of the present invention.

Next, in response to a request from the communication terminal 7, the image management system 5 calculates a position of a person in each of a plurality of captured-image data items that are successively transmitted from the communication terminal 3 in chronological order (S104). Then, the image management system 5 transmits, to the communication terminal 7, a plurality of captured image IDs and the plurality of foot position information items relating to the plurality of captured-image data items obtained by capturing objects at certain time intervals for a certain time period (S105). The communication terminal 7 generates a heat map image based on the plurality of foot position information items. Further, the communication terminal 7 maps the heat map image on a predetermined-area image corresponding to the captured-image data identified by any one of the plurality of captured image IDs to display an image as illustrated in FIG. 46B.

Figure 36:
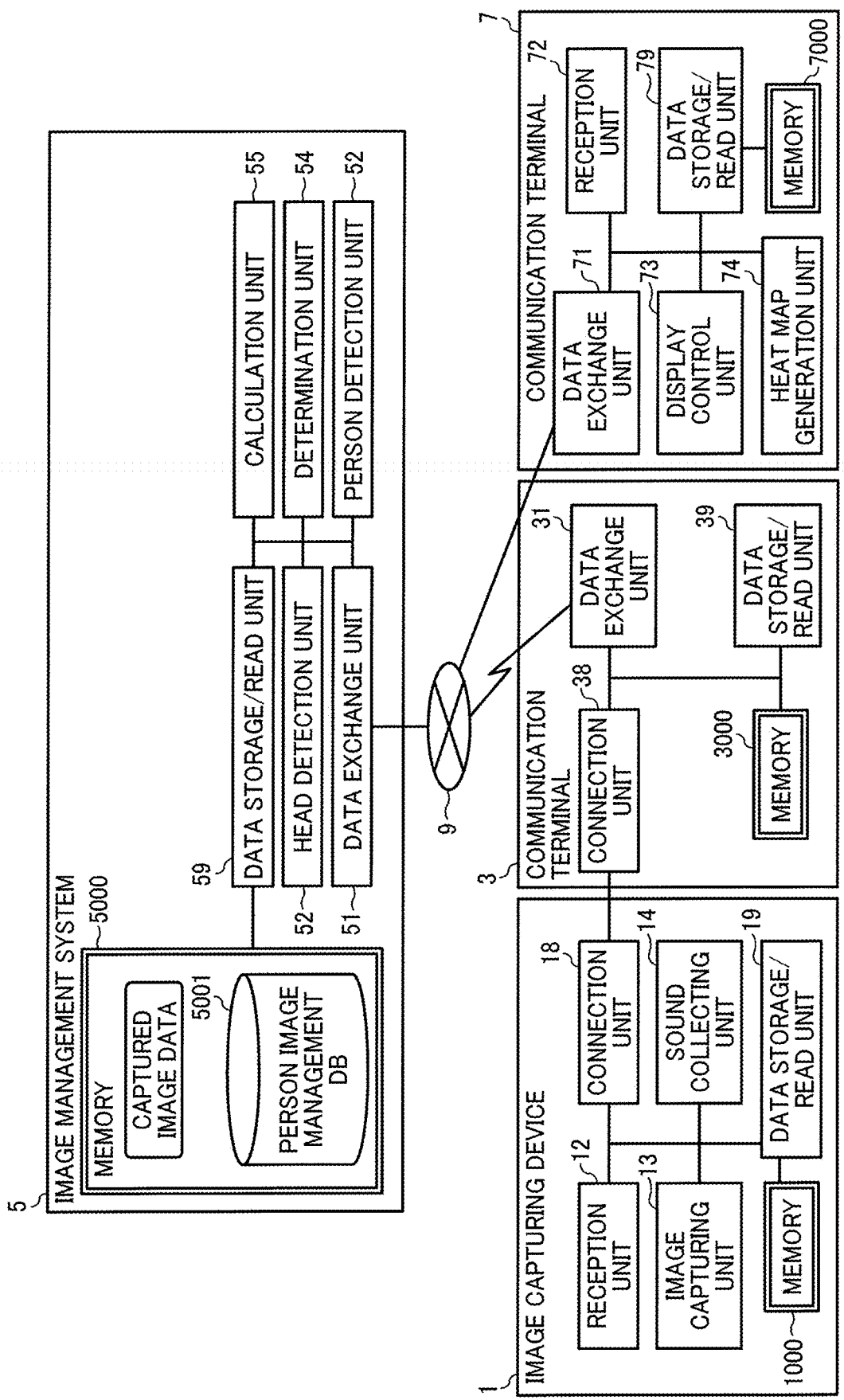
FIG. 36 is a functional block diagram of the image communication system according to a third embodiment of the present invention.

Hereinafter, a description is given of a functional configuration of the image communication system 10 according to the third embodiment with reference to FIGS. 9 to 11 and 36. FIG. 36 is a block diagram illustrating functional configurations of the image capturing device 1, the communication terminal 3, the image management system 5, and the communication terminal 7, which constitute a part of the image communication system 10 according the third embodiment. In the image communication system 10 illustrated in FIG. 36, the image management system 5 performs data communication with the communication terminal 3 and communication terminal 7 via the communication network 9.

The functional configurations of the image capturing device 1 and the communication terminal 3 are the same or substantially the same as those of the first embodiment described with reference to FIG. 13. Therefore, redundant descriptions thereof are omitted below.

Hereinafter, a description is given of a functional configuration of the image management system 5 with reference to FIGS. 11 and 36. The image management system 5 includes the data exchange unit 51, the detection unit 52, a head detection unit 53, a determination unit 54, a calculation unit 55 and the data storage/read unit 59. These functional blocks 51 to 55 and 59 are implemented by one or more hardware components illustrated in FIG. 11, when operating in accordance with instructions from the CPU 501 executing according to the programs for the image management system 5, loaded to the RAM 503 from the HD 504. The image management system 5 further includes the memory 5000, which is implemented by the RAM 503 and the HD 504 illustrated in FIG. 11. The memory 5000 stores the captured-image data transmitted from the communication terminal 3.

Further, the memory 5000 includes the person image management DB 5001. A person image management table, which is described below, constitutes the person image management DB 5001. Hereinafter, a detailed description is given of the person image management table.

Figures 37, 38:
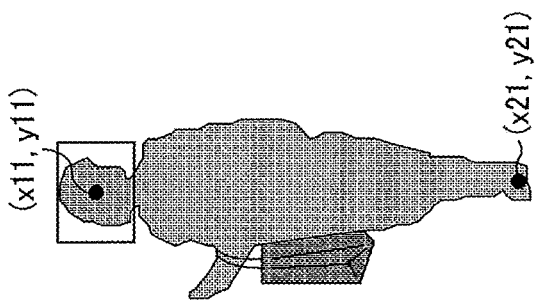
FIG. 37 is an example of a person image management table according to a third embodiment of the present invention.
FIG. 38 is an illustration for explaining a position and area of a person image according to a third embodiment of the present invention.

FIG. 37 is an example of the person image management table according to the third embodiment. The person image management table stores a file name of captured image data, a capturing date and time, a face ID, and foot position information in association with each captured-image ID.

The captured image ID is an example of captured-image identification information for identifying captured image data. The file name of captured image data indicates a file name of the captured image data identified by the associated captured-image ID. The capturing date and time of captured image indicates a date and time at which the associated captured image data is captured by the image capturing device 1 identified by a device ID. The captured-image data are stored in the memory 5000.

The face ID is an example of face identification information for identifying a person's head including a face detected from the captured-image data by the head detection unit 53. The foot position information indicates a position of foot in the captured-image data calculated by the calculation unit 55. In this case, the position of foot indicates a two-dimensional position of foot in the Mercator image as the captured image (see FIG. 3C). It should be noted that the position of foot may be indicated by (x, y)=(latitude, longitude).

Hereinafter, a detailed description is given of each of the functional blocks 51 to 55 and 59 of the image management system 5 with reference to FIG. 36.

It should be noted that functions implemented by the data exchange unit 51 and the data storage/read unit 59 are the same or substantially the same as those of the first embodiment. Therefore, redundant descriptions thereof are omitted below.

The detection unit 52 is implement by the CPU 501 illustrated in FIG. 11, when executing according to the program loaded onto the RAM 503. The detection unit 52 according to the third embodiment detects a zenith direction based on the orientation and tilt information of the related information received at S2.

The head detection unit 53 is implement by the CPU 501 illustrated in FIG. 11, when executing according to the program loaded to the RAM 503. The head detection unit 53 detects an arbitrary person's head including a face in the captured-image data. This detection of head is performed, for example, using a person detection model such as the support vector machine (SVM). More specifically, the head detection unit 53 detects each person's head including a face based on a feature amount of a two-dimensional face image in the captured-image data. Further, the head detection unit 53 specifies a position of the detected head in the captured image data. For example, as illustrated in FIG. 38, the image of the head including face is detected in the form of a rectangle. A center (x11, y11) of the rectangle indicates the position of the person's head. In addition, in FIG. 38, the position of foot is indicated by coordinates (x21, y21). The coordinates are stored as the foot position information in the person image management table illustrated in FIG. 37.

The determination unit 54 is implement by the CPU 501 illustrated in FIG. 11, when executing according to the program loaded to the RAM 503. The determination unit 54 determines whether an arbitrary person's head is detected by the head detection unit 53.

The calculation unit 55 is implement by the CPU 501 illustrated in FIG. 11, when executing according to the program loaded to the RAM 503. The calculation unit 55 calculates a size ("2R" described later) of the head detected by the head detection unit 53. Further, the calculation unit 55 calculates a distance ("h" described later) between the center of the head and the foot based on the calculated head's size and an average person's body size that is determined in advance. Furthermore, the calculation unit 55 calculates a position that is away from the center position of the head by the distance (h) between the center of the head and the foot as the position of foot in the captured-image data. A detailed description is given later of this operation performed by the calculation unit 55.

Hereinafter, a description is given of a functional configuration of the communication terminal 7 with reference to FIGS. 11 and 36. The communication terminal 7 according to the third embodiment includes the data exchange unit 71, the reception unit 72, the display control unit 73, the heat map generation unit 74, and the data storage/read unit 79. These functional blocks 71 to 74, and 79 are implemented by one or more hardware components illustrated in FIG. 11, when operating in accordance with instructions from the CPU 501 executing according to the programs for the communication terminal 7, loaded onto the RAM 503 from the HD 504.

The communication terminal 7 further includes the memory 7000, which is implemented by the RAM 503 and the HD 504 illustrated in FIG. 11.

Hereinafter, a detailed description is given of these functional blocks 71 to 74 and 79 with reference to FIG. 36.

It should be noted that functions implemented by the data exchange unit 71, the reception unit 72, the data storage/read unit 79 are the same or substantially the same as those of the first embodiment. Therefore, redundant descriptions thereof are omitted below.

The display control unit 73 is implemented by the CPU 501 illustrated in FIG. 11, when executing according to the program loaded onto the RAM 503, to control the display 508 of the communication terminal 7 to display images. For example, the display control unit 73 maps the heat map image on an image (the predetermined-area image or the captured image) corresponding to the captured-image data. Further, the display control unit 73 controls the display 508 of the communication terminal 7 to display the image on which the heat map image is mapped.

The heat map generation unit 74 is implement by the CPU 501 illustrated in FIG. 11, when executing according to the program loaded onto the RAM 503. The heat map generation unit 74 according the third embodiment generates the heat map image based on the foot position information. Specifically, the heat map generation unit 74 uses each of the foot positions in the plurality of time-series captured-image data items that are obtained by continuously capturing images by the image capturing device 1 at certain time intervals for weighting of a gradation of color to render the heat map image.

Figure 39:
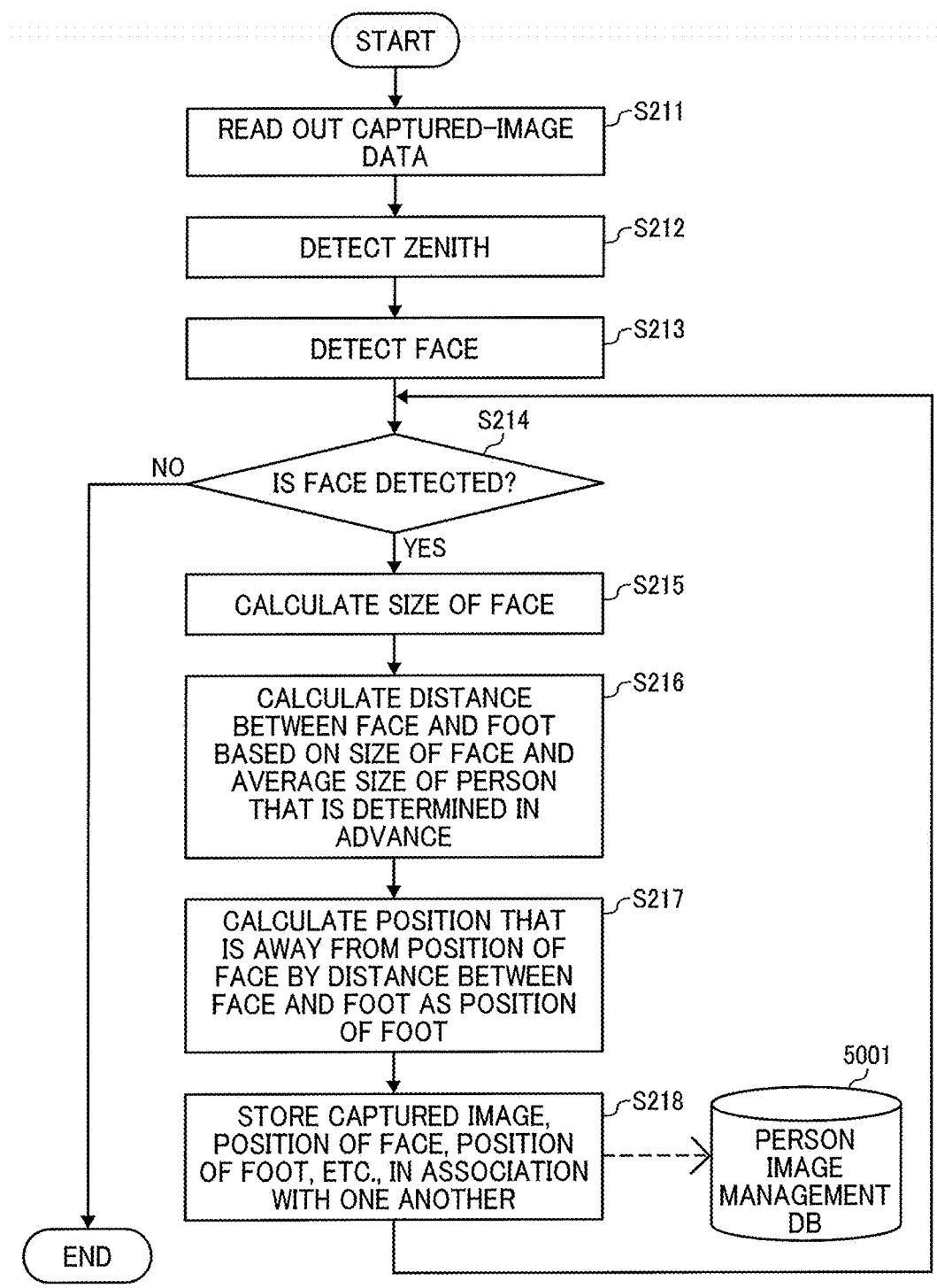
FIG. 39 is a flowchart illustrating an operation of generating person image information according to a third embodiment of the present invention.

Hereinafter, a description is given of an operation or processing steps according to the third embodiment with reference to FIG. 39 to FIGS. 47A and 47B. FIG. 39 is a flowchart illustrating an operation of specifying a position of a person's foot.

First, the data storage/read unit 59 reads out, from the memory 5000, the captured-image data in which a person's face is to be detected (S211). The detection unit 52 detects a zenith direction based on the related information transmitted from the communication terminal 3 at S102 (S212).

The head detection unit 53 detects an arbitrary person's head including a face in the captured-image data (S213). The determination unit 54 determines whether an arbitrary person's head is detected by the head detection unit 53 (S214). When the determination unit 54 determines that the arbitrary person's head is detected (S214: YES), the calculation unit 55 calculates a size ("2R" described later) of the detected head (S215).

Next, the calculation unit 55 calculates a distance ("h" described later) between the center of the head and the foot based on the calculated size of head and an average person's body size that is determined in advance (S216). Furthermore, the calculation unit 55 calculates a position that is away from the center position of the head by the distance (h) between the center of the head and the foot as a position of foot in the captured-image data (S217).

Next, the data storage/read unit 59 stores, in the person image management table, person image information including the captured image ID, the file name of the captured image data, the capturing date and time, the face ID, the foot position information (S218).

Next, the operation returns to S213, and the head detection unit 53 detects another person's face in the same captured-image data as the captured-image data on which the head detection unit 53 first performed the detection of person's head. Thus, the processing from S213 to S218 is repeated until all person's faces are detected. When no person's face is detected (S214: NO), it is determined that all persons' faces are detected, and the operation of specifying the position of person's foot ends.

Figure 40:
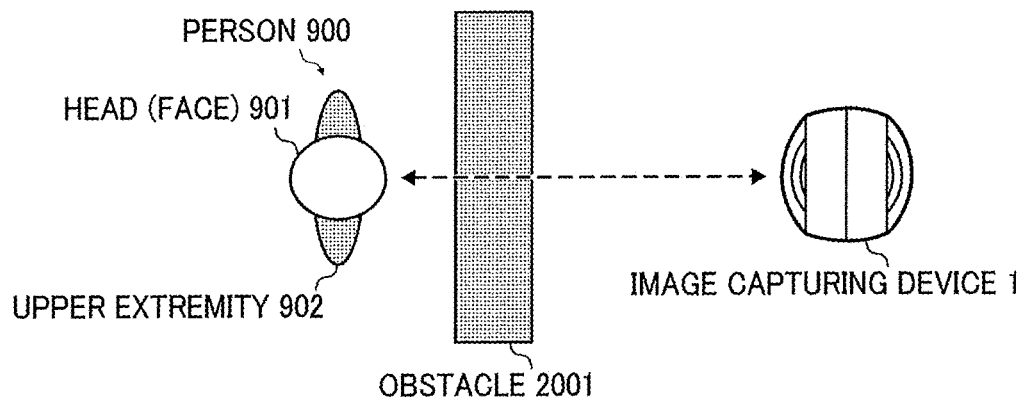
FIG. 40 is a plan view illustrating an example situation where the full spherical panoramic image is captured by the image capturing device according to a third embodiment of the present invention.
Figure 41:
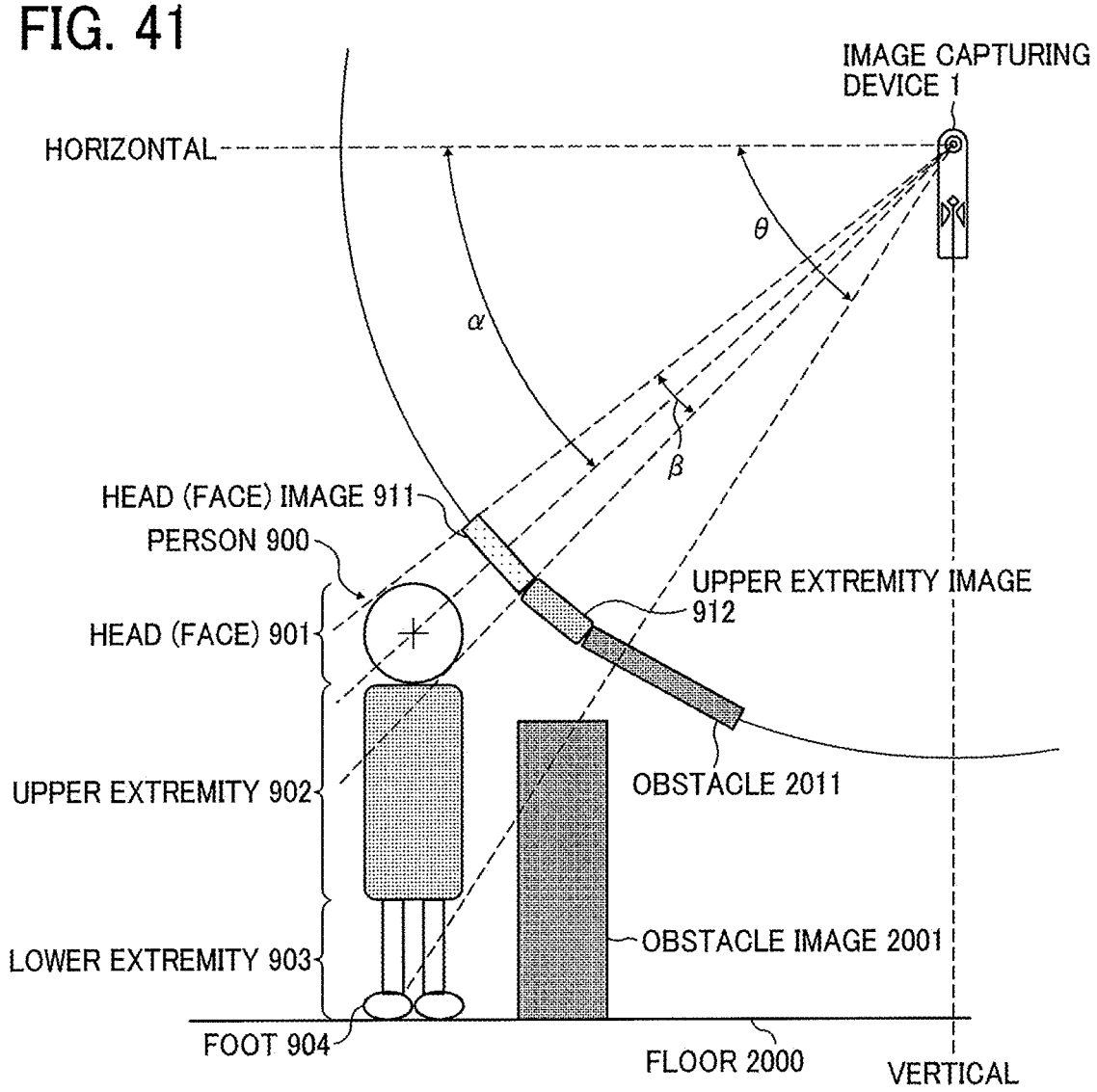
FIG. 41 is a side view illustrating an example situation where the full spherical panoramic image is captured by the image capturing device according to a third embodiment of the present invention.

Hereinafter, a detailed description is given of the processing from S215 to S217 with reference to FIG. 40 to FIGS. 46A and 46B. FIG. 40 is a plan view illustrating an example situation where a full spherical panoramic image is captured by the image capturing device 1. FIG. 41 is a side view illustrating an example situation where a full spherical panoramic image is captured by the image capturing device 1.

FIGS. 40 and 41 illustrate an example in which there is an obstacle 2001 on a floor 2000 between a person 900 and the image capturing device 1, and therefore a space around a foot 904 of the person is not captured by image capturing device 1. Even in this case, the image management system 5 detects a head (face) 901 of the person 900 using a recent high-level face detection (recognition) technique, and specifies a position of the foot 904 of the person 900 based on the position of head 901. Accordingly, the position of the foot 904 is specified even when there is the obstacle 2001. It should be noted that a foot detection (recognition) technique is less accurate than a face detection technique, and therefore the position of the foot 904 is specified using a face detection (recognition) technique also when there is no obstacle 2001.

Hereinafter, a further detailed description is given of specifying the position of the foot 904. In FIGS. 40 and 41, assuming that the imaging element 103a (103b) of the image capturing device 1 is a center of a circle, an angle "α" represents an angle between a horizontal line drawn from the imaging element 103a (103b) and a virtual line drawn from the imaging element 103a (103b) through a center of the head (face) 901 of the person 900. Further, assuming that the imaging element 103a (103b) of the image capturing device 1 is the center of a circle, an angle "β" represents an angle between a virtual line drawn from the imaging element 103a (103b) through a top of the head 901 of the person 900 and a virtual line drawn from the imaging element 103a (103b) through a bottom of the head (face) 901 of the person 900. The image management system 5 according to the third embodiment obtains an angle "θ" between the horizontal line drawn from the imaging element 103a (103b) and a virtual line drawn from the imaging element 103a (103b) through the foot 904 of the person 900 to specify the position of the foot 904.

In addition, in a case in which the image capturing device 1 captures the person 900 and the obstacle 2001, the full spherical panoramic image, which is represented as an image facing toward a center of the sphere as illustrated in FIG. 4A, includes a head (face) image 911 as an image of the head (face) 901, an upper extremity image 912 as an image of an upper portion of an upper extremity 902, and an obstacle image 2011 as an image of the obstacle 2001. In other words, in a situation as illustrated in FIGS. 40 and 41, the image capturing device 1 cannot capture a lower portion of the upper extremity 902 and a lower extremity 903 (including the foot 904).

It should be noted that, in this case, the head 901 approximates a sphere. The angle β representing a longitudinal length of the head 901 can be calculated as an actual measured value using a face detection (recognition) technique. Further, in the present embodiment, it is not the actual size and length but the relative size and length that matters. Accordingly, when specifying the position of the foot 904, the calculation of the position of foot is calculated assuming that the distance between the head 901 of the person 900 and the imaging element 103a (103) is 1 (circle unit).

Taking a usual human figure (head: height=1: n, an average of the Japanese is 7.3) into consideration, the angle θ is expressed by the following equation (2).

$$\theta = \arctan\left\{\frac{\sin(\alpha) + (2n-1)\cdot\sin\left(\frac{1}{2}\beta\right)}{\cos(\alpha)}\right\} \quad \text{(Equation 2)}$$

Hereinafter, a description is given of how the equation (2) is obtained.

Figure 42:
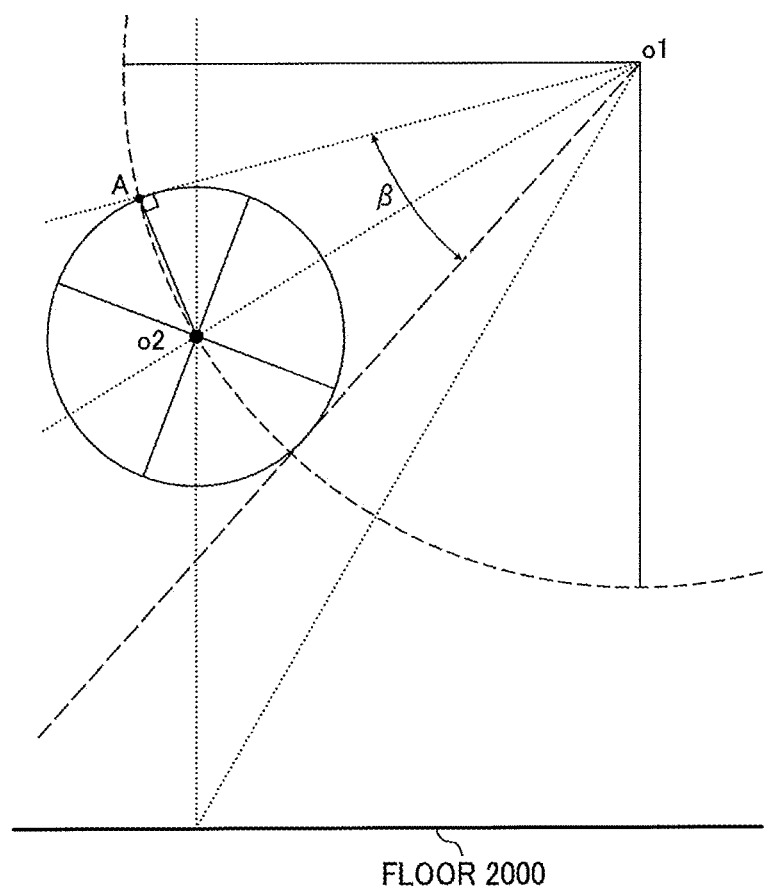
FIG. 42 is an illustration for explaining calculation of a diameter of a head (face) according to a third embodiment of the present invention.

(1) Calculation of Size of Head 901 (S215, FIG. 42)

Referring to FIG. 42, assuming that a position of the imaging element 103a (103b) is "o1" (circle unit), a center of the head 901 of the person 900 is "o2", a point of contact where a virtual line drawn from o1 through a top of the head 901 contacts a circumference of a circle whose center point is at o2 is "A", a distance R between o2 and A is expressed by the following equation (3).

$$R = \sin(\tfrac{1}{2}\beta) \quad \text{(Equation 3).}$$

Accordingly, 2R, which is a size of the head 901 (a diameter of the head 901), is calculated using the following equation (4).

$$2R = 2\sin(\tfrac{1}{2}\beta) \quad \text{(Equation 4).}$$

Figure 43:
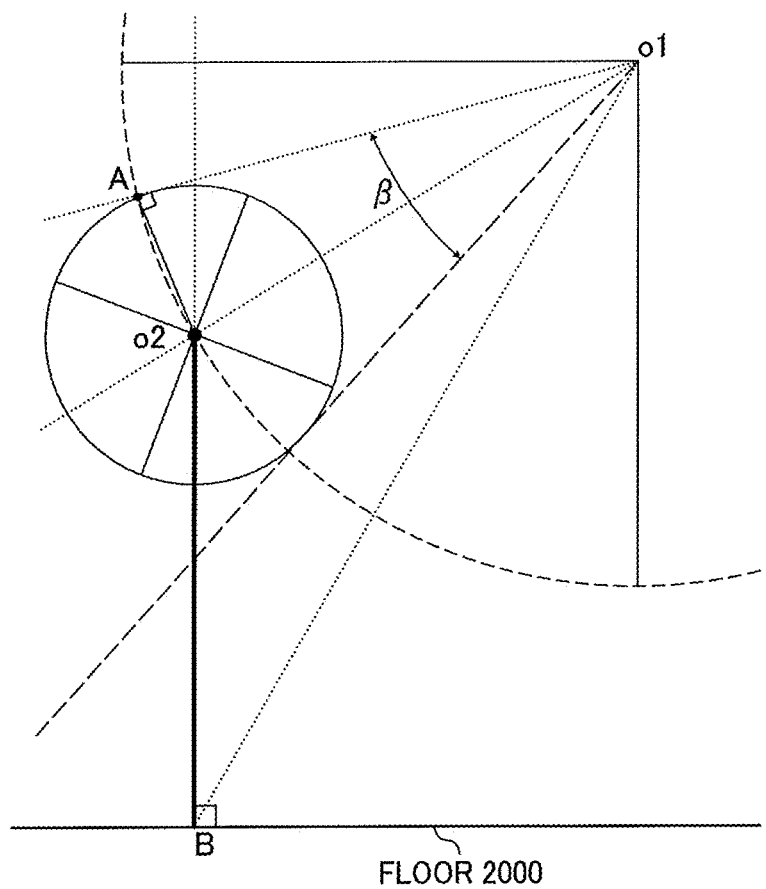
FIG. 43 is an illustration for explaining calculation of a distance between a center of a head (face) and a foot according to a third embodiment of the present invention.

(2) Calculation of the Distance Between the Center of the Head 901 and the Foot 904 (S216, FIG. 43)

Next, referring to FIG. 43, a person's height H is expressed by the following equation (5).

$$H = 2\sin(\tfrac{1}{2}\beta)\cdot n \quad \text{(Equation 5).}$$

Accordingly, a distance h from the center o2 of the head 901 to a position B of the foot 904 is calculated by subtracting a half of the size of the head 901 from the height using the following equation (6).

$$h = 2\sin(\tfrac{1}{2}\beta)\cdot n - \sin(\tfrac{1}{2}\beta) = (2n-1)\cdot\sin(\tfrac{1}{2}\beta) \quad \text{(Equation 6).}$$

Figure 44:
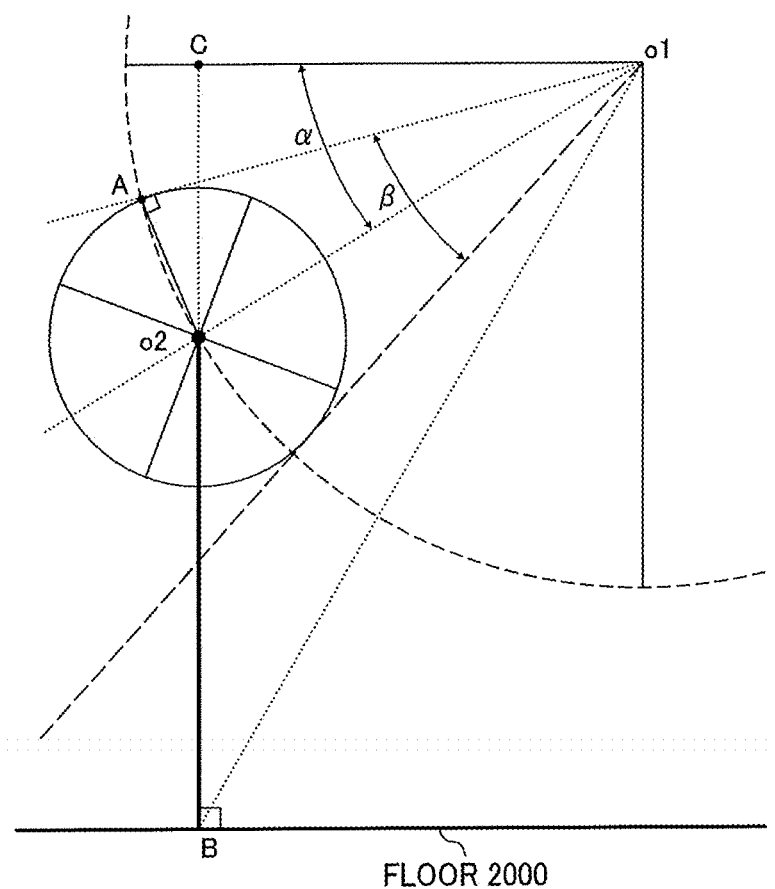
FIG. 44 is an illustration for explaining calculation of an angle between a center of a head and a horizontal line according to a third embodiment of the present invention.
Figure 45:
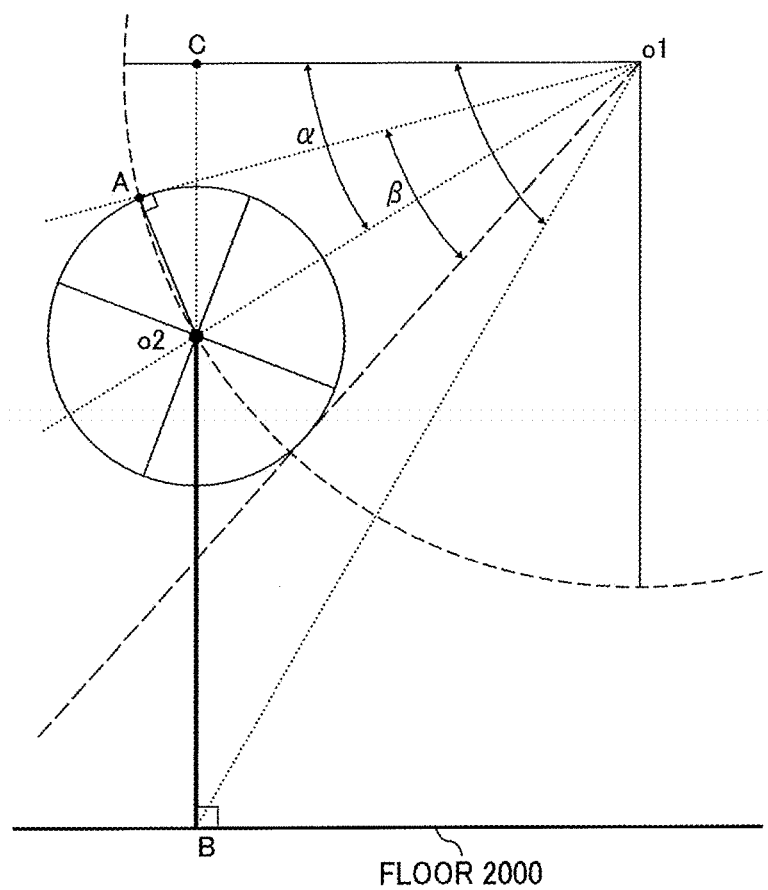
FIG. 45 is an illustration for explaining calculation of an angle between a foot and a horizontal line according to a third embodiment of the present invention.

(3) Specification of the Position of the Foot 904 (S217, FIGS. 44 and 45)

Next, referring to FIG. 44, assuming that an intersection point where an extension drawn from the position B of the foot 904 through the center o2 of the head 901 intersects a horizontal line drawn from the position o1 of the imaging element 103a (103b) is "C", from among three sides of a right triangle defined by o1, C and B, a length of a side defined by o1 and C is $\cos(\alpha)$, and a length of a side defined by C and o2 is $\sin(\alpha)$. Accordingly, a length of a side defined by C and B is calculated by adding the length of the side defined by o1 and C to the length of the side defined by C and o2 using the following equation (7).

$$CB = \sin(\alpha) + (2n-1)\cdot\sin(\tfrac{1}{2}\beta) \qquad \text{(Equation 7).}$$

Further, referring to FIG. 45, the angle $\theta$ between the horizontal line drawn from the position o1 of the imaging element 103a (103b) and a virtual line drawn from the imaging element 103a (103b) through the foot 904 of the person 900 is calculated by arctan (the length of the side defined by C and B/the length of the side defined by o1 and C). Accordingly, the angle $\theta$ is calculated using the above equation (2).

With the operation described heretofore, as illustrated at S105 of FIG. 35, the foot position information indicating the calculated position of the foot 904 is transmitted to the communication terminal 7 together with the captured image ID of the captured-image data from which the foot has been detected. Then, as illustrated at S106 of FIG. 35, the heat map generation unit 74 of the communication terminal 7 generates the heat map image. The display control unit 73 maps the heat map image on the predetermined-area image, and control the display 508 of the communication terminal 7 to display the image on which the heat map image is mapped.

FIG. 46A is an example of the predetermined-area image on which the heat map image is not mapped. FIG. 46B is an example of the predetermined-area image on which the heat map image is mapped. As illustrated in FIG. 46B, the heat map image represents a trajectory of a person's foot. Accordingly, compared with an image on which the heat map image is mapped at or near a barycenter of a person as illustrated in FIG. 47B, a user (viewer Y) viewing the image as illustrated in FIG. 46B can easily recognize the position of a person.

Figure 47A:
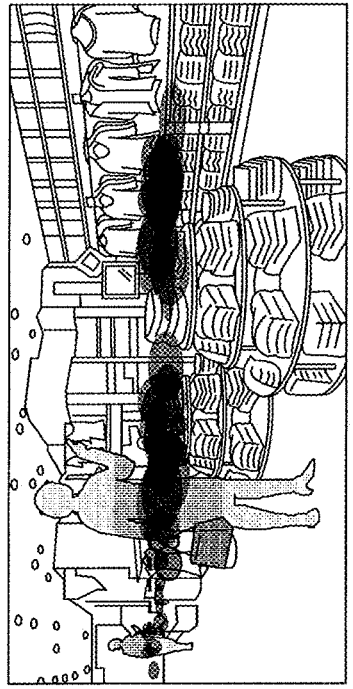
FIG. 47A is a view illustrating the predetermined-area image according to a related art of a third embodiment of the present invention.
Figure 47B:
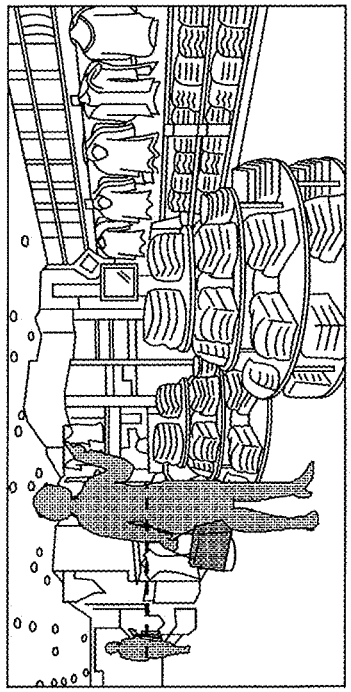
FIG. 47B is a view illustrating the predetermined-area image on which the heat map is superimposed according to a related art of a third embodiment of the present invention.

In the images illustrated in FIGS. 46B and 47B, the heat map is actually expressed depending on the number of the detected heads (feet) such that red, orange, yellow, yellow-green, and blue spots are rendered in a descending order of the number of the detected heads (feet). However, in the example illustrated in FIGS. 46B and 47B, the number of the person detection areas is expressed by the gradation of gray color, such that the larger the number of the person detection areas, the darker the color.

As described heretofore, according to the third embodiment of the present invention, when specifying a person's foot position in the captured-image data, not a person's foot but a person's face is detected using a face detection technique that is relatively advanced, and thereafter the position of foot is calculated based on the position of head including a face. This enables the heat map image to express a depth as illustrated in FIG. 46B. Accordingly, a viewer can easily recognize a track of a person based on the heat map image.

Further, in a place such as a store where sales items are placed, a foot may not be projected on the captured image because the foot is hidden by an obstacle. Even in such case, because the position of foot is calculated based on the detection of face, the heat map image according to the third embodiment can effectively express a track of person in a store or the like. Especially in a shoes store, a shoe is likely to be detected (recognized) as a person's foot in error even if a foot detection (recognition) technique advance. Even in such case, because the position of foot is calculated based on the detection of face, the heat map image according to the third embodiment can effectively express a track of person in a shoe store.

The image management system 5 is implemented by either a single computer or a plurality of computers, each including or performing at least a part of the functional blocks, operations, or memories of the image management system 5 as described above.

A recording medium such as a CD-ROM storing the programs in the above embodiment and the HD 504 storing those programs may be distributed domestically or internationally as a program product.

Further, in alternative to the laptop computer, the communication terminal 7 may be implemented by a personal computer such as a desktop computer, tablet, a smartphone, a tablet, or a smartwatch.

Fourth Embodiment

Hereinafter, a description is given of a fourth embodiment of the present invention. An operation of generating a full spherical panoramic image, an overview of a configuration of the image communication system 10, the hardware configurations of the image capturing device 1, the communication terminals 3 and 7, and the image management system 5 according to the fourth embodiment are the same as those of the first embodiment. Therefore, redundant descriptions thereof are omitted below.

Figure 48:
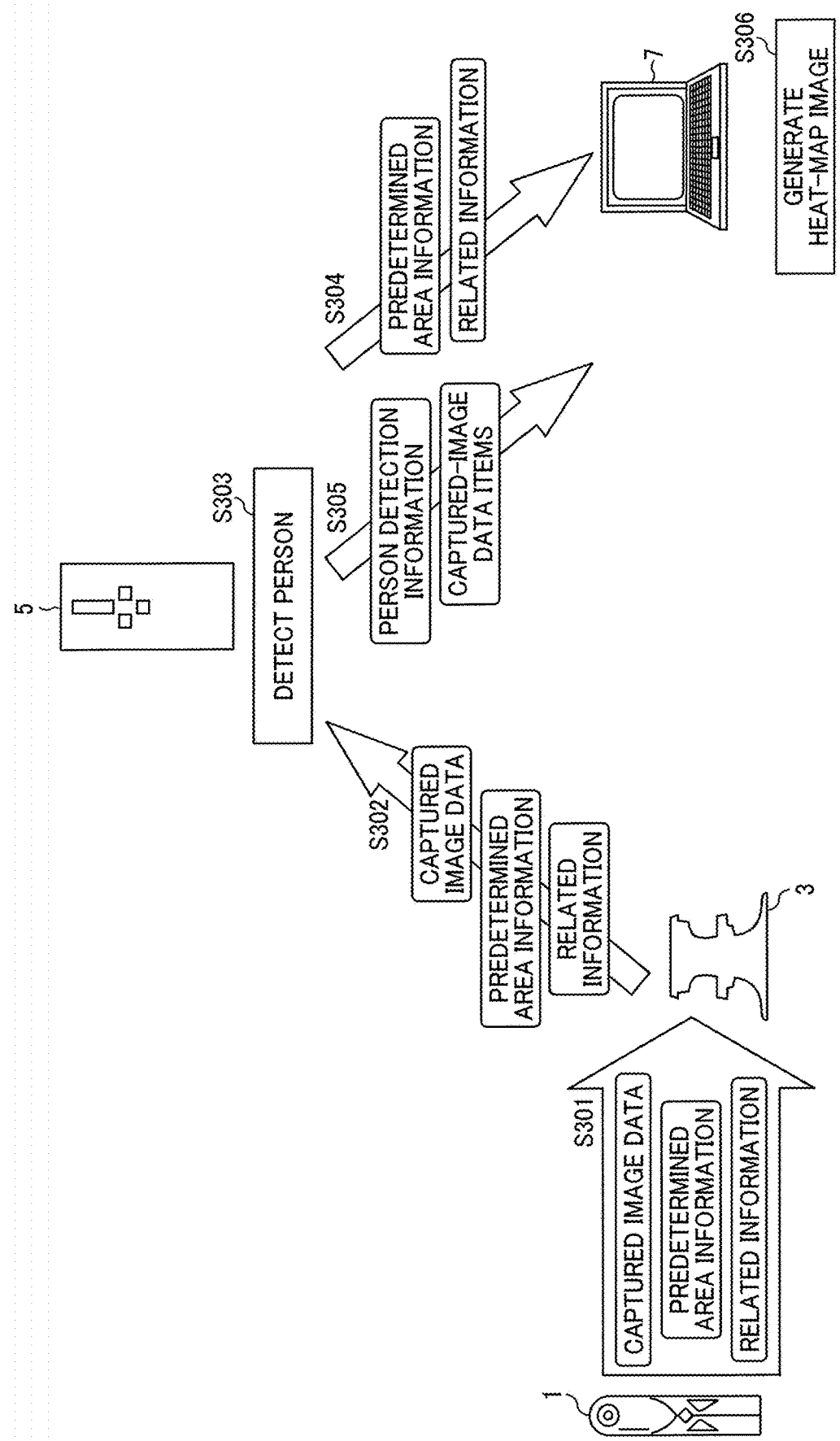
FIG. 48 is a schematic diagram illustrating operation performed by the image communication system according to a fourth embodiment of the present invention.

Hereinafter, a description is given of an overview of processing performed by the image communication system 10 according to the fourth embodiment with reference to FIG. 48. FIG. 48 is a schematic diagram illustrating operation performed by the image communication system 10 according to the fourth embodiment.

First, the communication terminal 3 acquires the captured-image data, the predetermined-area information, and the related information from the image capturing device 1 (S301). The communication terminal 3 transmits the captured-image data, the predetermined-area image, and the related information to the image management system 5 (S302). The communication terminal 3 repeats the processing of S301 and S302. The processing of S301 and S302 is repeated at irregular intervals in time. For example, the processing is first repeated 5 seconds after a first processing and thereafter again repeated 6 seconds after the second processing. Alternatively, the processing of S301 and S302 may be repeated at regular intervals in time such as every 5 seconds.

Next, the image management system 5 detects an area of a person image, which is an image of a person to generate person detection information (S303). The area of the person image may be referred to as "person detection area" hereinafter. The image management system 5 transmits the predetermined-area image and the related information (S304). Next, in response to a request from the communication terminal 7, the image management system 5 transmits the person detection information and a group of captured-image data items (S305). Thus, the communication terminal 7 stores, in the memory 7000 (described later), the person detection information and the group of captured-image data items.

Figure 56:
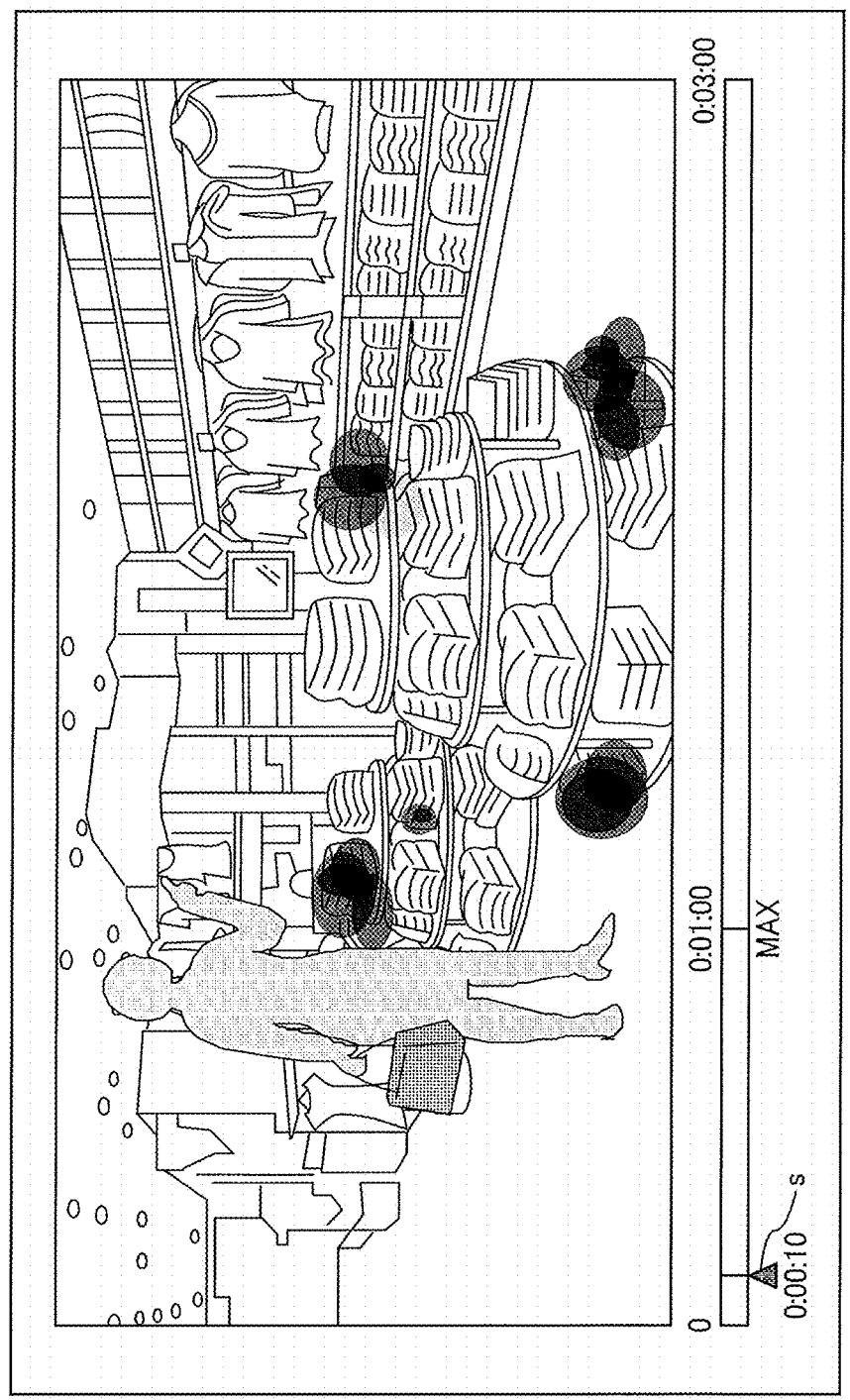
FIG. 56 is a view illustrating an example of the heat map image according to a fourth embodiment of the present invention.

Next, the communication terminal 7 generates a heat map image as illustrated in FIG. 56 (S306). This enables a viewer Y viewing the heat map image to recognize how each person stays in a certain place without viewing a plurality of full spherical panoramic images (or predetermined-area images) captured for a certain period of time.

Figure 49:
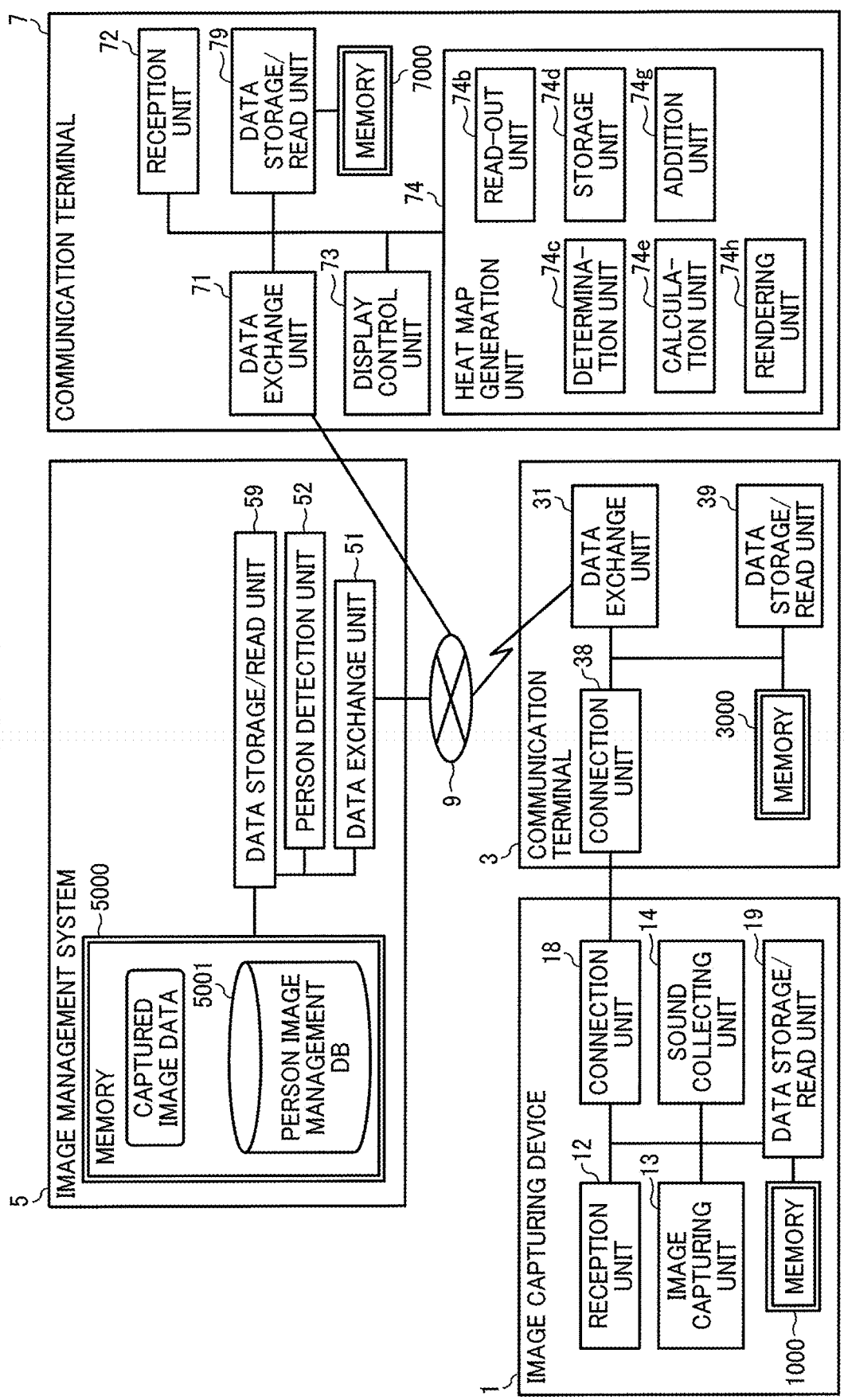
FIG. 49 is a functional block diagram of the image communication system according to a fourth embodiment of the present invention.

Hereinafter, a description is given of a functional configuration of the image communication system 10 according to the fourth embodiment with reference to FIGS. 9 to 11 and 49. FIG. 49 is a block diagram illustrating functional configurations of the image capturing device 1, the communication terminal 3, the image management system 5, and the communication terminal 7, which constitute a part of the image communication system 10 according the fourth embodiment. In the image communication system 10 illustrated in FIG. 49, the image management system 5 performs data communication with the communication terminal 3 and communication terminal 7 via the communication network 9.

The functional configurations of the image capturing device 1 and the communication terminal 3 according to the fourth embodiment are the same or substantially the same as those of the first embodiment described with reference to FIG. 13. Therefore, redundant descriptions thereof are omitted below.

Hereinafter, a description is given of a functional configuration of the image management system 5 according to the fourth embodiment with reference to FIGS. 11 and 49. The image management system 5 includes the data exchange unit 51, the detection unit 52, and the data storage/read unit 59. These functional blocks 51, 52 and 59 are implemented by one or more hardware components illustrated in FIG. 11, when operating in accordance with instructions from the CPU 501 executing according to the programs for the image management system 5, loaded to the RAM 503 from the HD 504.

The image management system 5 further includes the memory 5000, which is implemented by the RAM 503 and the HD 504 illustrated in FIG. 11. The memory 5000 stores the captured-image data transmitted from the communication terminal 3.

Further, the memory 5000 includes the person image management DB 5001. The person image management table illustrated in FIG. 14 constitutes the person image management DB 5001. The person image management table according this fourth embodiment is the same or substantially the same as that of the first embodiment. Therefore, a redundant description thereof is omitted below.

Further it should be noted that the functions implemented by the data exchange unit 51, the detection unit 52 and the data storage/read unit 59 are the same or substantially the same as those of the first embodiment. Therefore, redundant descriptions thereof are omitted below.

Hereinafter, a description is given of a functional configuration of the communication terminal 7 according to the fourth embodiment with reference to FIGS. 11 and 49. The communication terminal 7 according to the fourth embodiment includes the data exchange unit 71, the reception unit 72, the display control unit 73, the heat map generation unit 74, and the data storage/read unit 79. These functional blocks 71 to 74, and 79 are implemented by one or more hardware components illustrated in FIG. 11, when operating in accordance with instructions from the CPU 501 executing according to the programs for the communication terminal 7, loaded onto the RAM 503 from the HD 504.

The communication terminal 7 further includes the memory 7000, which is implemented by the RAM 503 and the HD 504 illustrated in FIG. 11.

Hereinafter, a detailed description is given of these functional blocks 71 to 74 and 79 with reference to FIG. 49.

It should be noted that functions implemented by the data exchange unit 71, the reception unit 72, the display control unit 73, and the data storage/read unit 79 are the same or substantially the same as those of the first embodiment. Therefore, redundant descriptions thereof are omitted below.

The heat map generation unit 74 is implement by the CPU 501 illustrated in FIG. 11, when executing according to the program loaded onto the RAM 503, to generate the heat map image.

Hereinafter, a detailed description is given of the heat map generation unit 74 according to the fourth embodiment. The heat map generation unit 74 includes the read-out unit 74b, the determination unit 74c, the storage unit 74d, the calculation unit 74e, an addition unit 74g, and the rendering unit 74h.

The read-out unit 74b reads out various types of data from the memory 7000, for example.

The determination unit 74c according to the forth embodiment determines whether a first position and a first size of a first detection area where a first person is detected in a first captured-image data item from among the plurality of captured-image data items is within a predetermined range when compared with a second position and a second size of a second detection area where a second person is detected in a second captured-image data item that is captured after the capturing of the first captured-image data item. The determination unit 74c thereby determines whether the first person and the second person are a same object based on the determination result.

The storage unit 74d stores various types of data in the memory 7000, for example.

The calculation unit 74e according to the fourth embodiment calculates, for example, a position of a center point of the person detection area and a size of the person detection area based on the position and area of person from among the person detection information.

Figures 53A, 53B, 53C, 53D:
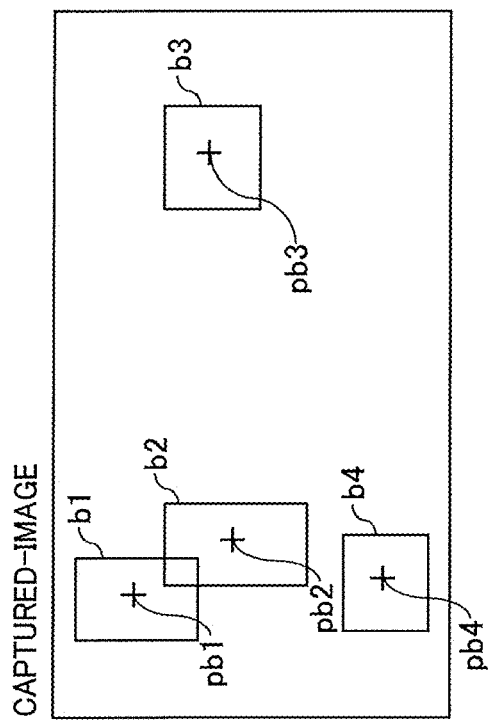
FIGS. 53A to 53D are illustrations for explaining calculation of a stay point according to a fourth embodiment of the present invention.

The addition unit 74g stores a time difference in a column for a stay point in an intermediate table (described below) as illustrated in FIG. 53C.

The rendering unit 74h renders the heat map image using a final table illustrated in FIG. 55 for weighting of a gradation of color.

Figure 50:
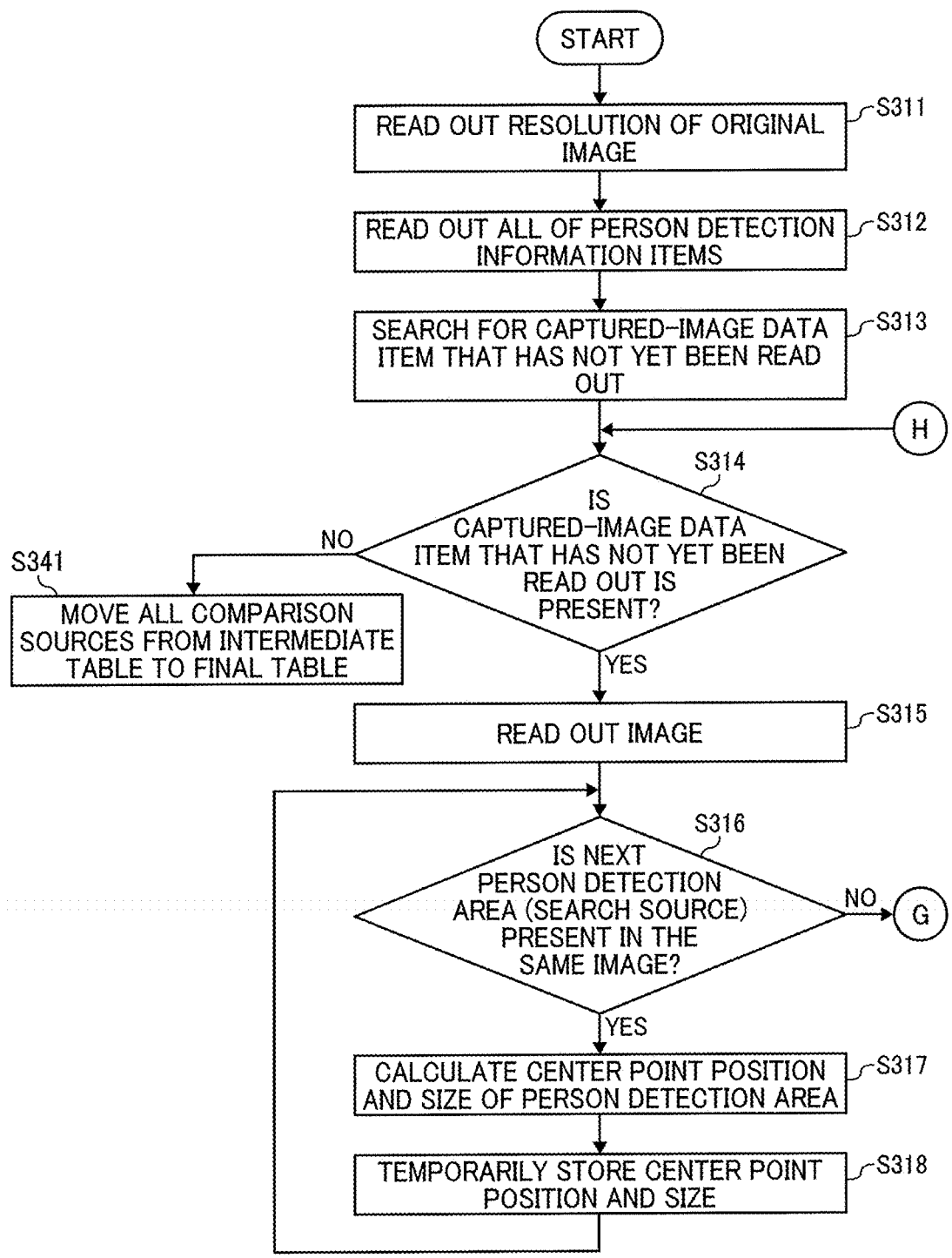
FIG. 50 is a flowchart illustrating an operation of generating the heat map image according to a fourth embodiment of the present invention.
Figure 51:
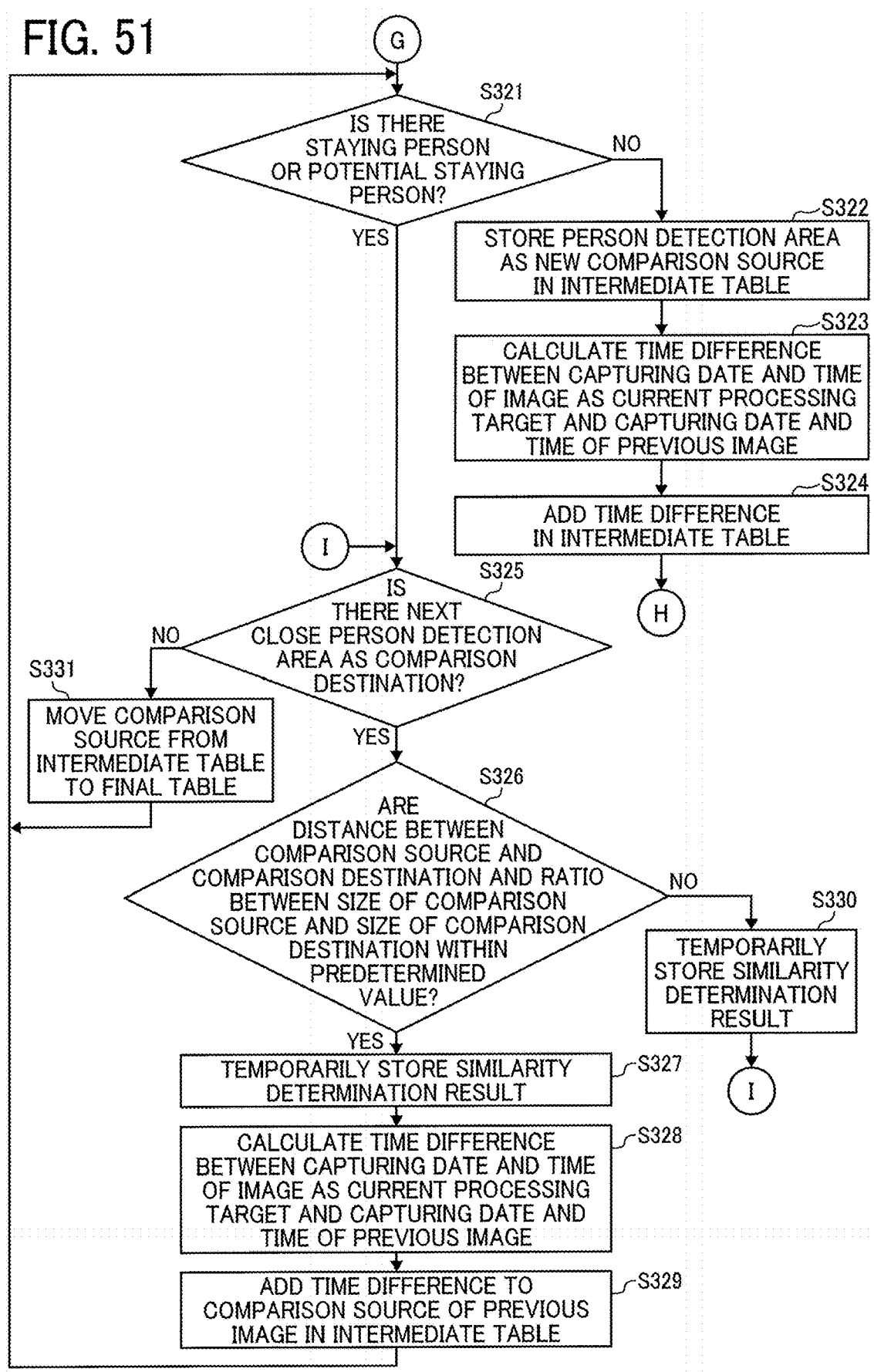
FIG. 51 is a flowchart illustrating an operation of generating the heat map image according to a fourth embodiment of the present invention.
Figures 52A, 52B, 52C, 52D:
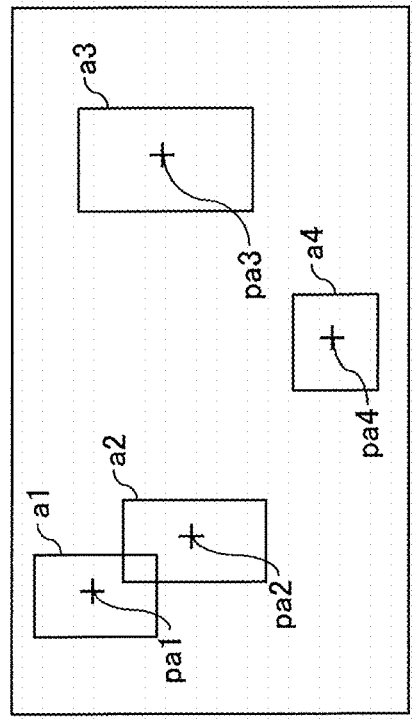
FIGS. 52A to 52D are illustrations for explaining calculation of a stay point according to a fourth embodiment of the present invention.
Figures 54A, 54B, 54C, 54D:
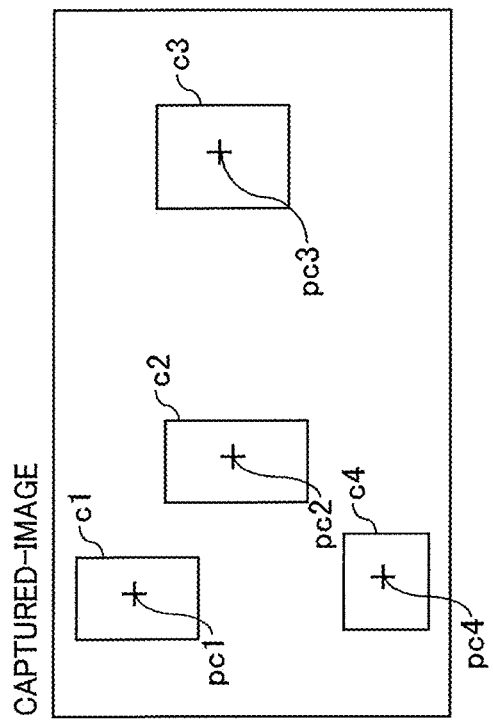
FIGS. 54A to 54D are illustrations for explaining calculation of a stay point according to a fourth embodiment of the present invention.

Hereinafter, a description is given of an operation or processing steps according to the fourth embodiment with reference to FIGS. 50 to 54. FIGS. 50 and 51 is a flowchart illustrating an operation of generating the heat map image according the fourth embodiment. FIGS. 52A to 52D, 53A to 53D, 54A to 54D and 55 are illustrations for explaining how a stay point is calculated. Specifically, FIGS. 52A, 53A and 54A are schematic views each illustrating a captured image including the person detection areas. Further, FIGS. 52B, 53B and 54B are example tables each indicating person specification information. Furthermore, FIGS. 52C, 53C and 54C are each an example of the intermediate table. Still further, FIGS. 52D, 53D and 54D and FIG. 55 are each an example of the final table.

First, the read-out unit 74b reads out a resolution of the original captured-image data from the memory 7000 (S311). Further, the read-out unit 74b reads out all of the person detection information items from the memory 7000 (S312).

Then, the read-out unit 74b searches the memory 7000 for a captured-image data item that has not yet been read out (S313).

Next, the determination unit 74c determines whether there is a captured-image data item that has not yet been read out by the search at S313 in the memory 7000 (S314). When the determination unit 74c determines that there is a captured-image data item that has not yet been read out (S314: YES) in the memory 7000, the read-out unit 74b reads out the captured-image data item that has not yet been read out from the memory 7000 (S315). By contrast, when the determination unit 74c determines that there is no captured-image data item that has not yet been read out (S314: NO), the operation proceeds to S341.

Next, the determination unit 74c determines whether the person detection information items that are read out at S312 contain a person detection information item specified by the same captured image ID as the captured image ID indicating the newly read-out captured-image data item. Based on a result of this determination, the determination unit 74c determines whether a next person detection area is present in the same captured-image data item that is read out at S315 (S316). The processing of S316 is processing of searching for the person detection area as a comparison source, which is described below. It should be noted that when the determination at S316 is performed for the first time, the determination unit 74c determines whether there is a "first" person detection area instead of the next person detection area. Assuming that all of the person detection information items that are read out at S312 are as illustrated in FIG. 14, in the determination that is performed for the first time, the determination unit 74c determines that there is a person detection information item indicated by a person detection area ID "a0011" as the person detection information specified by the captured image ID "p001". In the next determination, the determination unit 74c determines that there is the next person detection information item indicated by a person detection area ID "a0012" as the person detection information specified by the same captured image ID "p001".

When the determination unit 74c determines that the next (or first) person detection area is present in the same captured-image data item that is read out at S315 (S316: YES), the calculation unit 74e calculates the position of center point of the person detection area and a size of the person detection area based on the position and area of person from among the person detection information (S317). Specifically, the calculation unit 74e specifies the person detection area based on a position of an arbitrary corner of a rectangle area containing a person and an area indicating a width and a height of the rectangle area with reference to the position of corner. It should be noted that when calculating the size of the person detection area, the calculation unit 74e uses information indicating the resolution that is read out at S311.

For example, as illustrated in FIG. 52A, when four person detection areas are present in a captured-image data item of a first capturing date and time, the calculation unit 74e first calculates a position (x1, y1) of a center point pa1 of a person detection area a1 and a size α1 of the person detection area a1 based on information of a person's area (x11, y11, w11, h11) of the person detection information identified by the person detection area ID "a0011". Next, the storage unit 74d assigns an identifier to the center point position and the size calculated at S317, and temporarily stores the position of the center point and the size in association with the identifier as person specification information in the memory 7000 as illustrated in FIG. 52B (S318). In the person specification information illustrated in FIG. 52B, the center point position (x1, y1) and the size α1 are associated with an identifier "a01". The person specification information illustrated in FIG. 52B includes no similarity determination result. This is because no person detection area to be compared with the person detection area in the first captured-image data is present, because there is no previous captured-image data item that is captured before the first captured-image data item.

It should be noted that the person detection areas a1, a2, a3, and a4 contain the center points pa1, pa2, pa3, and pa4, respectively. Further, the person detection areas a1, a2, a3, and a4 are identified by the identifiers a01, a02, a03, and a04, respectively.

Subsequently, the operation returns to S316, and the determination unit 74c determines whether there is a next person detection area in the same captured-image data item that is read out at S315. Assuming that all of the person detection information items that is read out at S312 are as illustrated in FIG. 14, the determination unit 74c determines there is a person detection information item indicated by a person detection area ID "a0012" as a next person detection information item specified by the same captured image ID "p001". Then, at S317, the calculation unit 74e calculates a position (x2, y2) of a center point pa2 of a person detection area a2 and a size α2 of the person detection area a2 based on information of a person's area (x12, y12, w12, h12) of the person detection information identified by the person detection area ID "a0012". Next, at S318, the storage unit 74d assigns an identifier to the center point position and the size calculated at S317, and temporarily stores the position of the center point and the size in association with the identifier in the memory 7000 as illustrated in FIG. 52B. In FIG. 52B, the center point position (x2, y2) and the size α2 are stored in association with an identifier "a02".

The processing of S316 to S318 as above is repeated until the determination unit 74c determines that there is no next person detection area in the same captured-image data item that is read out at S315 (S316: NO), and the operation proceeds to S321 of FIG. 51.

Next, the determination unit 74c determines whether there is a person who is staying in one place for more than a certain period of time (referred to as a "staying person" hereinafter) or a potential staying person (S321). Specifically, when determining whether there is a potential staying person, the determination unit 74c determines whether the identifier that is temporarily stored at S318 has been already managed in the intermediate table. When the identifier that is temporarily stored at S318 is not managed in the intermediate table, the determination unit 74c determines that there is no potential staying person.

Further, when determining whether there is a staying person, the determination unit 74c determines whether the identifier that is temporarily stored as the similarity determination result at S318 is managed in the intermediate table. In other words, when determining whether there is a staying person, the determination unit 74c determines whether the intermediate table already manages an identifier indicating the person detection area that is the same as or similar to the person detection area indicated by the identifier that is temporarily stored at S318. When such identifier is not managed in the intermediate table, the determination unit 74c determines that there is no staying person.

For example, the intermediate table initially manages no information, the determination unit 74c determines each person corresponding to each of the all person specification information items illustrated in FIG. 52B as a potential staying person.

When the determination unit 74c determines that there is no staying person or potential staying person (S321: NO), the data storage/read unit 79 stores, in the intermediate table stored in the memory 7000, each identifier of the person detection areas as new comparison sources in association with a stay point. In the first processing, because there is no captured-image data item that is captured at a previous capturing date and time, the identifiers indicating all of the person detection areas are initially stored in the intermediate table in association with zero stay point as illustrated in FIG. 52C. It should be noted that the intermediate table stores intermediate data associating each identifier of the person detection area with the stay point.

Next, the calculation unit 74e calculates a time difference between the capturing date and time of the captured-image data item that is currently being processed and the previous capturing date and time of the captured-image data (S323). In this example, the time difference between the two capturing date and times is zero (second), because no captured-image data item is present that is captured at the previous capturing date and time. The addition unit 74g adds the time difference to a stay point column in the intermediate table (S324). Because the captured-image data item that is captured at the first capturing date and time is a current processing target, each stay point associated with all of the identifiers is zero. Subsequently, the operation proceeds to S314, and the processing is repeated from S314. It should be noted that, at this point of time, no data is managed in the final table illustrated in FIG. 18D.

Then, at S314, the determination unit 74c determines whether the memory 7000 stores a captured-image data item that has not yet been read out. When the determination unit 74c determines that there is a captured-image data item that has not yet been read out in the memory 7000 (S314: YES), the read-out unit 74b reads out a captured-image data item captured at a second capturing date and time that has not yet been read out from the memory 7000 (S315).

Next, at S316, the determination unit 74c determines whether there is a next person detection area in the same captured-image data item of the second capturing date and time that is read out at S315. It should be noted that when the determination at S316 is performed for the first time on the captured-image data of the second capturing date and time, the determination unit 74c determines whether there is a "first" person detection area instead of the next person detection area.

Assuming that all of the person detection information items that are read out at S312 are as illustrated in FIG. 14, for the captured-image data item captured at the second capturing date and time, the determination unit 74c determines that there is a person detection information item indicated by a person detection area ID "a0021" as a first person detection information item specified by the captured image ID "p0012" at S316. For example, when four person detection areas are present as illustrated FIG. 53A, the calculation unit 74e calculates the position (x1, y1) of a center point pb1 of a person detection area b1 and the size α1 of the person detection area b1 based on information of a person's area (x21, y21, w21, h21) of the person detection information identified by the person detection area ID "a0021" at S317. Next, at S318, the storage unit 74d assigns an identifier to the center point position and the size calculated at S317, and temporarily stores the position of the center point and the size in association with the identifier as person specification information in the memory 7000 as illustrated in FIG. 53B. In FIG. 53B, the center point position (x1, y1) and the size α1 are stored in association with an identifier "b01".

It should be noted that the person detection areas b1, b2, b3, and b4 contain the center points pb1, pb2, pb3, and pb4, respectively. Further, the person detection areas b1, b2, b3, and b4 are identified by the identifiers b01, b02, b03, and b04, respectively.

Next, the operation returns to S316, and the determination unit 74c determines whether a next person detection area is present in the same captured-image data item (see FIG. 53A) that is read out at S315. In this example, assuming that all of the person detection information items that are read out at S312 are as illustrated in FIG. 14, in the determination that is performed for the second time, the determination unit 74c determines that there is a person detection information item indicated by a person detection area ID "a0022" as the person detection information specified by the same captured image ID "p002". Then, at S317, the calculation unit 74e calculates the position (x2, y2) of the center point pb2 of the person detection area b2 and a size α2 of the person detection area b2 based on information of a person's area (x22, y22, w22, h22) of the person detection information identified by the person detection area ID "a0022" as illustrated in FIG. 53A. Next, at S318, the storage unit 74d assigns an identifier to the center point position and the size calculated at S317, and temporarily stores the position of the center point and the size in association with the identifier as person specification information in the memory 7000 as illustrated in FIG. 53B. In FIG. 53B, the center point position (x2, y2) and the size α2 are stored in association with an identifier "b02".

The processing of S316 to S318 as above is repeated until the determination unit 74c determines that there is no next person detection area in the same captured-image data item of the second capturing date and time that is read out at S315 (S316: NO), and the operation proceeds to S321 of FIG. 51.

Subsequently, when the determination unit 74c determines that there is a staying person or a potential staying person (S321: YES), the determination unit 74c determines whether the captured-image data item of the previous capturing date and time illustrated in FIG. 52B contains a next person detection area that is close to the person detection area as a comparison source indicated by each of the identifiers in the person specification information illustrated in FIG. 53B (S325). It should be noted that when the determination at S325 is performed for the first time, the determination unit 74c determines whether there is a "first" person detection area close to the person detection area as a comparison source instead of the next person detection area. In this example, the determination unit 74c determines that, in FIG. 52B, there is the person detection area a1 indicated by the identifier 01 as a comparison destination.

Next, the determination unit 74c determines a degree of similarity between the person detection area as a comparison source in the captured-image data item of the currently-processed capturing time and an arbitrary person detection area as a comparison destination in the captured-image data item of the previous capturing time (S326). More specifically, the determination unit 74c determines whether a distance between the center point of the person detection area as the comparison source and the center point of the person detection area as the comparison destination is within a predetermined value, such as 10 pixels. Further, the determination unit 74c determines whether a ratio between the size of the person detection area as the comparison source and the size of the person detection area as the comparison destination is within a predetermined value such as 80% to 120%. When the determination unit 74c determines that the distance and the ratio of size are within the predetermined values (S326: YES), the storage unit 74d temporarily stores a similarity determination result as illustrated in FIG. 53B (S327). For example, when the person detection area a1 (see FIG. 52A) as a first comparison destination is the same as or similar to the person detection area b1 (see FIG. 53A) as the comparison source indicated by the identifier b01, the storage unit 74d stores the identifier 01 of the person detection area a1 in association with the identifier b01 as the similarity determination result.

Next, the calculation unit 74e calculates a time difference between the capturing date and time of the captured-image data item that is currently being processed and the previous capturing date and time of the captured-image data (S328). The addition unit 74g adds the time difference calculated at S328 to a stay point associated with the identifier a01 indicated as the similarity determination result in the intermediate table as illustrated in FIG. 53C (S329). In this example, as illustrated in FIG. 14, a time difference between the currently-processed captured-image data item (captured image ID "p001") and the previous captured-image data item (captured image ID "p001") is five seconds. In addition, a value of the stay point associated with the identifier a01 in a previous intermediate table illustrated in FIG. 52C is 0 (zero). Accordingly, a value of the stay point associated with the identifier a01 in the intermediate table illustrated in FIG. 53C is 5 (=0+5). It should be noted that the storage unit 74d does not store the identifier b01 of the person detection area b1 as the comparison source of the currently-processed captured-image data in the intermediate table illustrated in FIG. 53C. Instead, the storage unit 74d keeps storing the identifier a01 of the person detection area a1 as the comparison destination, which is determined to be similar to the comparison source. When comparing FIG. 52A with FIG. 53A, the person detection area a1 indicated the identifier a01 is determined to be the same as or similar to the person detection area b1 indicated by the identifier b01. Then, the operation returns to S321.

The processing of S321 to S329 is repeated as above, and thereby the addition of the stay points of the identifiers 01 and a02 ends in the intermediate table as illustrated in FIG. 52C.

By contrast, when the determination unit 74c determines that the distance and the ratio of size are not within (outside of) the predetermined values (S326: NO), the storage unit 74d temporarily stores a similarity determination result as illustrated in FIG. 53B. For example, when no person detection area as the comparison destination is not the same as or similar to the person detection area b3 (see FIG. 53A) as the comparison source indicated by the identifier b03, the storage unit 74d stores "NO" in the similarity determination result for the identifier b03. It should be noted that any information other than "NO" may be stored, provided that the information indicates that no person detection area that is the same or similar is present. With the operation described heretofore, in FIGS. 52A and 53A, the person detection area b1 is determined to be the same as or similar to the person detection area a1, and, the person detection area b2 is the same or similar to the person detection area a2. By contrast, the person detection area b3 and the person detection area b4 are determined not to be the same or similar to any person detection area. In this case, in the intermediate table illustrated in FIG. 53C, the new identifiers b03 and b04 are managed in association with zero as the stay point.

By contrast, when the determination unit 74c determines that the captured-image data item of the previous capturing date and time illustrated in FIG. 52B contains no next person detection area that is close to the person detection area as the comparison source (S325: NO), the storage unit 74d moves the identifier indicating the person detection area as the comparison source from the intermediate table to the final table as illustrated in FIG. 53B. For example, the person detection areas a3 and a4 respectively indicated by the identifiers a03 and a04 in the intermediate table illustrated in FIG. 52C are not the same as or the similar to each of the person detection areas in the captured-image data item of the next capturing time, the storage unit 74d moves the identifiers a03 and a04 to the final table as illustrated in FIG. 53D. Specifically, the storage unit 74d moves, to the final table illustrated in FIG. 53D, the identifiers and the stay points in the intermediate table (see FIG. 52C), and information indicating the position of the center point and the size associated with the same identifiers in the person specification information (see FIG. 52B).

The processing of S314 to S331 is repeated as above, and in a case in which four person detection areas are present in a captured-image data item of a third capturing time as illustrated in FIG. 54A, for example, the person specification information is as illustrated in FIG. 54B. Further, in this case, the intermediate table and the final table manage data as illustrated in FIG. 54C and FIG. 54D, respectively. In this case, a person detection area pc1 indicated by an identifier c01 is determined to be the same as or the similar to the person detection area pa1 indicated by the identifier a01 in the captured-image data item of the second previous capturing time. Accordingly, in the intermediate table illustrated in FIG. 54C, the stay point of the identifier a01 is 11, which is obtained by adding 6 to 5.

It should be noted that the person detection areas c1, c2, c3, and c4 contain the center points pc1, pc2, pc3, and pc4, respectively. Further, the person detection areas c1, c2, c3, and c4 are identified by the identifiers c01, c02, c03, and c04, respectively.

By contrast, when the determination unit 74c determines that there is no captured-image data item that has not yet been read out in the memory 7000 (S314: NO), the storage unit 74d moves the identifiers indicating all of the person detection areas as the comparison sources in the intermediate table illustrated in FIG. 54C to the final table as illustrated in FIG. 55. In this case, the storage unit 74d moves, to the final table illustrated in FIG. 55, the identifiers and the stay points in the intermediate table (see FIG. 54C), and information indicating the position of the center point and the size associated with the same identifiers in the person specification information (see FIG. 54B).

With the processing steps as described heretofore, when the calculation of the stay point is performed on the person detection areas in all of the captured-image data items, the rendering unit 74h renders the heat map image based on the final table illustrated in FIG. 55. FIG. 56 is a view illustrating the predetermined-area image to which the heat map image generated based on the stay points is attached. FIG. 56 illustrates an example image obtained by capturing the interior of an apparel store. This captured-image data including the predetermined-area image is the captured-image data item that is first read out at S314. The display control unit 73 maps the heat map image on the predetermined-area image and displays the predetermined-area image on which the heat map image is mapped on the display 508 of the communication terminal 7. In the image illustrated in FIG. 56, the heat map is actually expressed depending on the duration of stay such that red, orange, yellow, yellow-green, and blue spots are rendered in a descending order of the duration of stay. However, in the example illustrated in FIG. 58, the heat map image is expressed by the gradation of gray color, such that the longer the duration of stay, the darker the color. This enables the viewer Y to recognize in which sales item a visitor is interested.

In a case in which a first person is present in a captured-image data item of a capturing time that is precedent to a capturing time of a captured-image data item as a current processing target, and a second person is present in the captured-image data item as the current processing target, when the determination unit 74c determines that the first person and the second person are a same object, the rendering unit 74h may render a spot in light color. By contrast, when the determination unit 74c determines that the first person and the second person are not the same object, the rendering unit 74h may render a spot in dark color. Further, the longer a time difference between the capturing time of the second person and the capturing time of the first person, the darker the color that the rendering unit 74h may render.

Furthermore, in FIG. 56, the display control unit 73 displays a slider s below the captured image on which the heat map image is superimposed. The slider s specifies a threshold of the duration of stay such that a person who stays in a place for equal to or more than the threshold is expressed as the heat map image. FIG. 56 illustrates an example in which a setting is configured such that a person who stays in a place for 10 seconds or more is displayed by the heat map image. In other words, a person corresponding to the identifier of which stay point is 10 or more is displayed by the heat map image.

Still further, in FIG. 56, the display control unit 73 displays an upper limit value (MAX) indicating a setting of an upper limit of the threshold (duration). FIG. 56 illustrates an example in which the upper limit value is set to 1 minute. The setting of the upper limit value prevents a person such as a sales clerk who often stays in a same place for a long period in order to fix sales items, etc., from being displayed, and thereby only visitors are displayed by the heat map image.

As described heretofore, according to the fourth embodiment, the heat map image is rendered using a specific position in each area where a person is detected and a size of each area for the weighting of gradation of color. Accordingly, an analysis is performed more accurately on how an object such a person stays in one place.

In the fourth embodiment described heretofore, although a description is made of the detection are of a person, an object to be detected may be an animal or a pack, provided that it is a moving object. A person, an animal and pack are examples of an object.

A recording medium such as a CD-ROM storing the programs in the above embodiment and the HD 504 storing those programs may be distributed domestically or internationally as a program product.

Further, in alternative to the laptop computer, the communication terminal 7 may be implemented by a personal computer such as a desktop computer, tablet, a smartphone, a tablet, or a smartwatch.

Fifth Embodiment

Hereinafter, a description is given of a fifth embodiment of the present invention. An operation of generating a full spherical panoramic image, an overview of a configuration of the image communication system 10, the hardware configurations of the image capturing device 1, the communication terminals 3 and 7, and the image management system 5 according to the fifth embodiment are the same as those of the first embodiment. Therefore, redundant descriptions thereof are omitted below.

Figure 57:
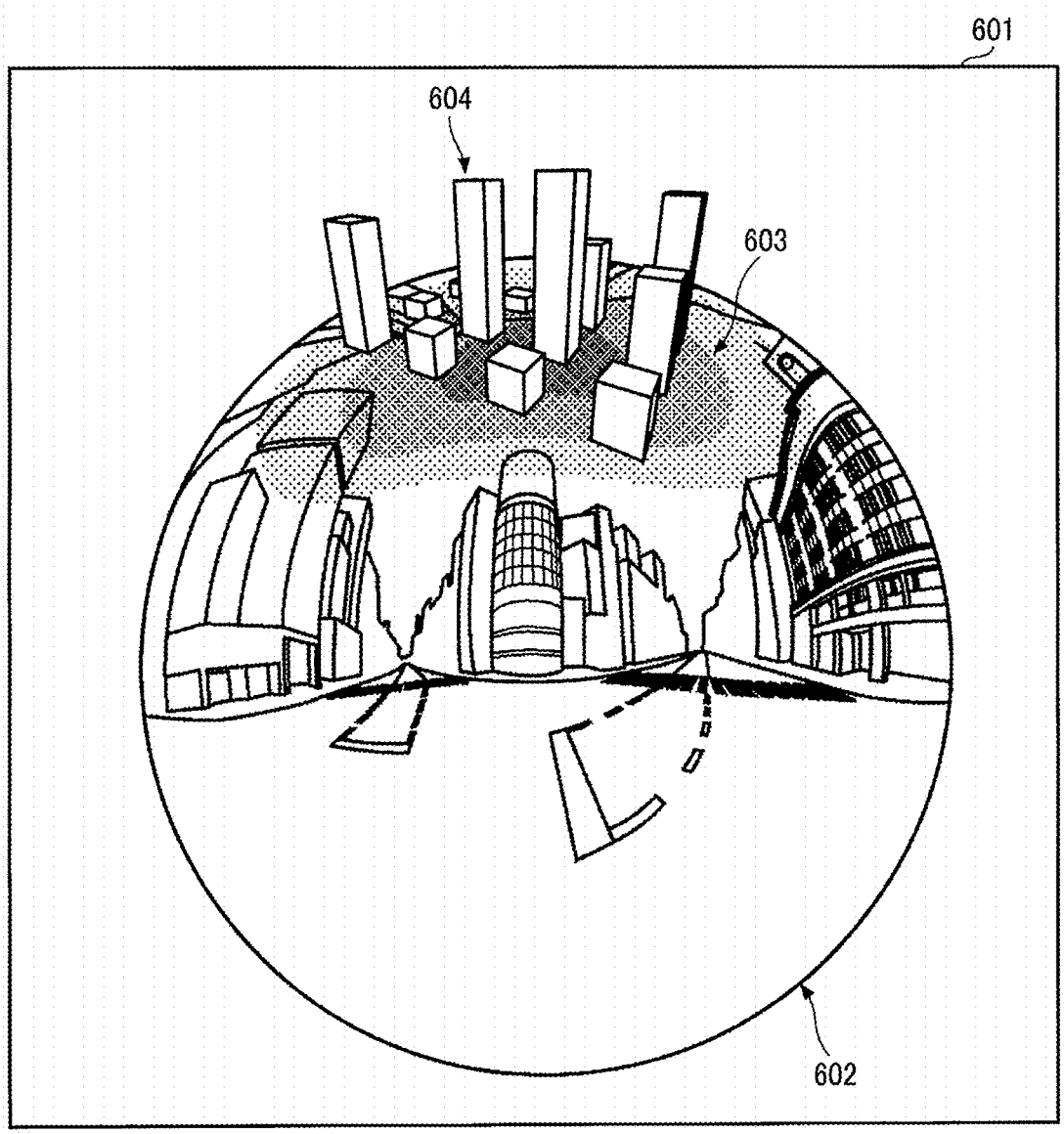
FIG. 57 is a view illustrating an example of an analysis information screen displayed by the communication terminal according to a fifth embodiment of the present invention.

FIG. 57 is a view illustrating an example of an analysis information screen 601 displayed by the communication terminal 7 according to the fifth embodiment. The analysis information screen 601 includes a full spherical image 602. A plurality of types of analysis information are visually displayed on the full spherical image 602. One example of the plurality of types of analysis information is a total number of persons. The total number of persons is indicated in different colors depending on its number. The total number of persons indicates a number of persons detected in a plurality of the full spherical images captured at different times. A portion where the total number of persons is indicated in different colors is referred to as a "color-coded indication 603".

The other example of the plurality of analysis information is a number of individual persons. The number of individual persons indicates a number obtained by counting a same person as one person even when the same person is detected multiple times. In the analysis information screen 601, the number of individual persons is indicated by a height of a bar chart 604. The bar chart 604 is counted on an area-by-area basis. A detailed description is given later of this area. Further, the full spherical image 602 has coordinates in a three-dimensional space. The bar chart also has three-dimensional information. In other words, the bar chart 604 is represented in a three-dimensional space. Because the bar chart 604 is represented in a three-dimensional space, when a viewer rotates the full spherical image 602 as described later, the viewer can view the bar chart 604 from different angles. Accordingly, the viewer can recognize in which area the bar chart 604 is present as well as the relation between the bar chart 604 and the color-coded indication 603.

Thus, the communication terminal 7 according to the fifth embodiment is able to not only display the analysis information in a color-coded indication but also display the analysis information in a stereoscopic indication as the full spherical image 602 is displayed in a three-dimensional space. Accordingly, the viewer can easily recognize the relation between the two types of analysis information. Further, because the color-coded indication and the stereoscopic indication are distinguishable against each other, both can be displayed together. Accordingly, it is not necessary to display the analysis information in the color-coded indication and the analysis information in the stereoscopic indication separately with each other.

Figure 58:
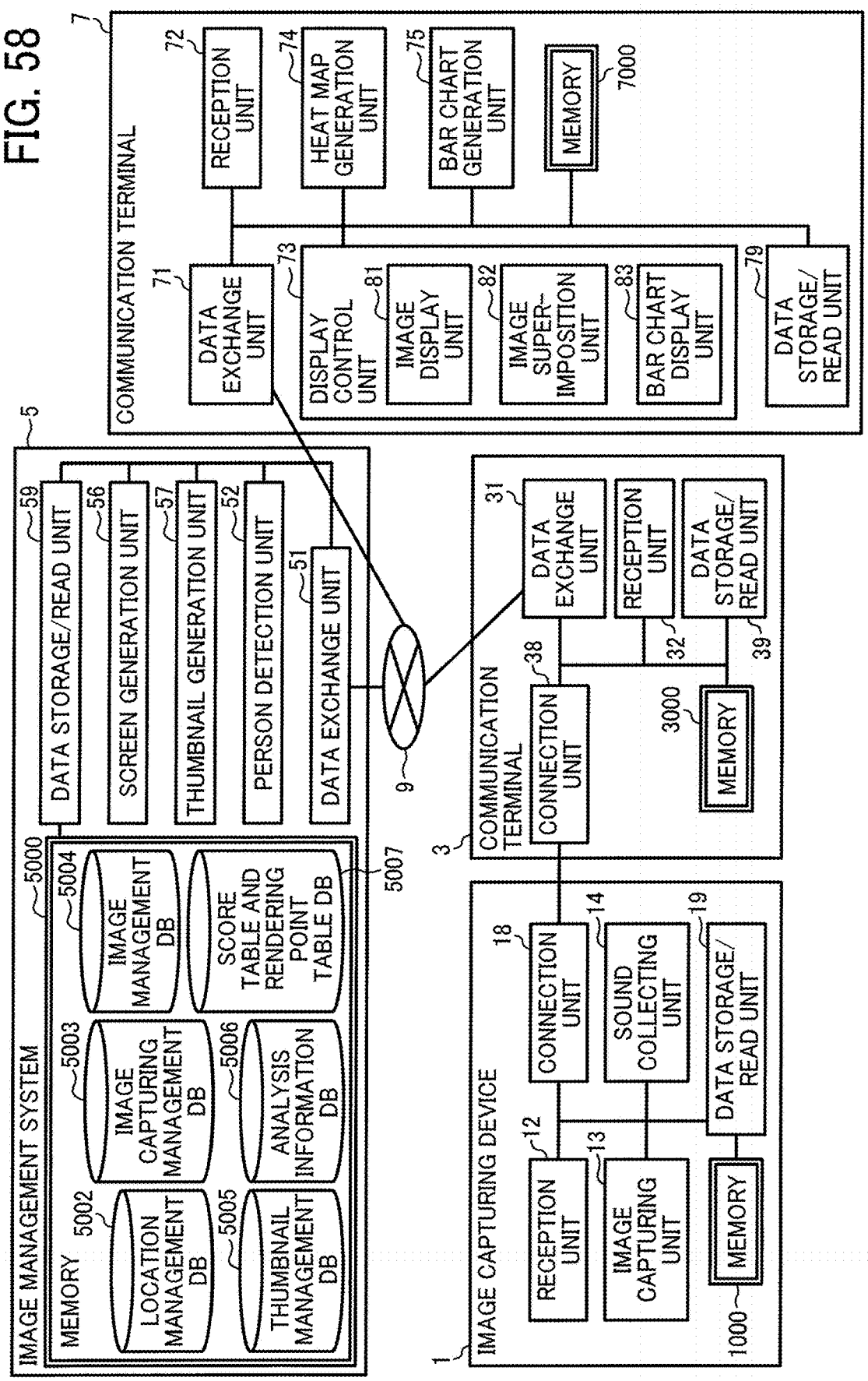
FIG. 58 is a block diagram illustrating a functional configuration of the image communication system according to a fifth embodiment of the present invention.

FIG. 58 is a block diagram illustrating functional configurations of the image capturing device 1, the communication terminal 3, the image management system 5, and the communication terminal 7, which constitute a part of the image communication system 10 according the fifth embodiment.

The functional configuration of the image capturing device 1 is the same or substantially the same as that of the first embodiment described with reference to FIG. 13. Therefore, a redundant description thereof is omitted below.

The communication terminal 3 according to the fifth embodiment includes the data exchange unit 31, an acceptance unit 32, the connection unit 38, and the data storage/read unit 39. These functional blocks 31, 32, 38 and 39 are implemented by one or more hardware components illustrated in FIG. 10, when operating in accordance with instructions from the CPU 301 executing according to the programs for the communication terminal 3, loaded to the RAM 303 from the EEPROM 304.

The communication terminal 3 further includes the memory 3000, which is implemented by the ROM 302 and the RAM 303 illustrated in FIG. 10. The memory 3000 stores the programs for the communication terminal 3.

It should be noted that functions implemented by the data exchange unit 31, the connection unit 38, and the data storage/read unit 39 are the same or substantially the same as those of the first embodiment. Therefore, redundant descriptions thereof are omitted below.

The acceptance unit 32 of the communication terminal 3 is implemented by the CPU 301 illustrated in FIG. 10, when executing according to the program loaded to the RAM 303, to accept an instruction input according to a user (an installer X in FIG. 8) operation.

The image management system 5 according to the fifth embodiment includes the data exchange unit 51, the detection unit 52, a screen generation unit 56, a thumbnail generation unit 57, and the data storage/read unit 59. These units are functions that are implemented by or that are caused to function by operating any of the hardware elements illustrated in FIG. 11 in cooperation with the instructions of the CPU 501 according to the program for the image management system 5 expanded from the HD 504 to the RAM 503.

The image management system 5 further includes the memory 5000, which is implemented by the RAM 503 and the HD 504 illustrated in FIG. 11. Further, the memory 5000 includes a location management database (DB) 5002, an image capturing management DB 5003, an image management DB 5004, a thumbnail management DB 5005, an analysis information management DB 5006, and a score table and drawing point table DB 5007. Hereinafter, a description is given of each of the databases 5002 to 5007.

The location ID is an example of identification information for identifying a location. The different location IDs are assigned to the different location names. The location ID may refer to information specific to a location. The location ID is, for example, a combination of an alphabet and numbers that do not overlap with one another. The location means a place where the image capturing device 1 is placed to capture objects surrounding the image capturing device 1. Examples of the location include a store.

The location name is a name of the location. Examples of the location name include a store name such as Shibuya store, or a venue name such as Shibuya venue. In the location layout map, a file name of image data, for example, indicating a layout of each location and a map is registered. A position of the image capturing device 1 or a sales item in the location is specified by a two-dimensional coordinate using the location layout map.

The device ID is identification information for identifying the image capturing device 1. The device ID may refer to information specific to the image capturing device 1. Examples of the device ID include a serial number, a production serial number, a numerical value that does not overlap with a model number, an IP address and a MAC address. These are just examples, and the device ID is not limited thereto. As indicated in Table 1, more than one image capturing device 1 are placed in one location. The position of each of the image capturing devices 1 is registered in the location layout map.

The installer X or the viewer Y may register the location management table. Alternatively, a supplier of the image communication system 10 may register the location management table.

TABLE 1

| AREA ID | AREA NAME | LOCATION ID | LOCATION NAME | LOCATION LAYOUT MAP | TERMINAL ID |
|---|---|---|---|---|---|
| a001 | Tokyo | s001 | Shibuya-store | 100008ifauy.jpg | t0001, t0002, t0003, t0005, t0006 |
| a001 | Tokyo | s002 | Yurakucho-venue | 100009ifauy.jpg | t0021, t00022, t0023, t0024 |
| ... | ... | ... | ... | ... | ... |

Table 1 is an example of a location management table that indicates information stored in the location management DB 5002 in the form of a table. The location management table stores an area ID, an area name, a location ID, a location name, a location layout map, and a device ID in association with one another. A line in the location management table may be referred to as a record hereinafter. The same applies to the other tables described hereafter. The area ID is identification information for identifying an area. The area ID is, for example, a combination of an alphabet and numbers that do not overlap with one another.

The area name indicates a certain domain such as Tokyo, Shibuya-ku, New York State, and New York City. The area name may be a region name. It should be noted that the identification information is a name, a symbol, a character string, a numerical value, or a combination of at least two of these items for identifying a specific object from among a plurality of objects. The same applies to the IDs or identification information described hereinafter.

TABLE 2

| LOCATION ID | CAPTURING TITLE | CAPTURING START DATE AND TIME | CAPTURING END DATE AND TIME |
|---|---|---|---|
| s001 | Weekend sale | 2015.7.4.10:00 | 2015.7.4.12:00 |
| s002 | Foundation anniversary | 2015.7.4.18:00 | 2015.7.4.09:00 |
| ... | ... | ... | ... |

Table 2 is an example of an image capturing management table that indicates information stored in the image capturing management DB 5003 in the form of a table. The image capturing management table store a capturing title, a capturing start date and time, a capturing end date and time in association with each location ID. The capturing title is a title of an event. The capturing title is input by the viewer Y. In other words, the capturing title is named after a name of a certain event that is held in a store, for which the viewer Y wants to monitor the behavior of consumers. However, the capturing title may not be the name of the event, because the viewer Y can assign (input) a desired title. For example, the capturing title may be just a character string indicating a capturing date and time. The viewer Y refers to the capturing title to extract a desired captured image item from among a plurality of captured image data items. It should be noted that a plurality of image data items are obtained during a single event by continuously (periodically) capturing images. The capturing start date and time is input by the viewer Y. The capturing start date and time indicates a date and time at which the image capturing device 1 is to start (or started) image capturing. The capturing end date and time is input by the viewer Y. The capturing end date and time indicates a date and time at which the image capturing device 1 is to stop (or stopped) image capturing. The viewer Y may register the capturing start date and time and the capturing end date and time in advance such that the image capturing device 1 starts and ends image capturing according to a schedule registered in advance. The image management system 5 mainly registers the image capturing management table.

TABLE 3

| TERMINAL ID | IMAGE ID | FILE NAME OF IMAGE DATA | CAPTURING DATE AND TIME |
|---|---|---|---|
| t0001 | P0001 | P0001.jpeg | 2015.7.4.10:00 |
| t0001 | P0002 | P0002.jpeg | 2015.7.4.10:10 |
| ... | ... | ... | ... |

Table 3 is an example of an image management table that indicates information stored in the image management DB 5004 in the form of a table. The image management table stores an image ID, a file name of image data, and a capturing date and time in association with each device ID. The image ID is an example of identification information for identifying image data. The image ID may refer to information specific to an image data item. The file name of image data indicates a file name of the image data identified by the image ID. The capturing date and time indicates a date and time at which the image data is captured by the image capturing device 1 identified by the device ID. The image data are also stored in the memory 5000.

For example, a user (the viewer Y) operating the communication terminal 7 accesses the communication terminal 7 to select a desired location name and a desired capturing title from the image capturing management table of Table 2. The image management system 5 reads out the device ID that is associated with the selected location ID from the location management table of Table 1. The image management system 5 specifies image data items whose capturing date and time are within the period from the capturing start date and time to the capturing end date and time from among image data items associated with the device ID in the image management table.

The viewer Y may directly select a desired device ID or a desired location ID. In the fifth embodiment, a description is given of a case in which the viewer Y selects a desired device ID and views, in order to simplify the description. It should be note that the image management system 5 mainly registers the image management table.

TABLE 4

| IMAGE ID | THUMBNAIL ID | FILE NAME OF THUMBNAIL IMAGE DATA | PREDETERMINED-AREA INFORMATION |
|---|---|---|---|
| P0001 | th123456 | P0001.jpeg | rH234, rV450, angle 32 |
| P0002 | th123457 | P0002.jpeg | rH134, rV350, angle 35 |
| ... | ... | ... | ... |

Table 4 is an example of a thumbnail management table that indicates information stored in the thumbnail management DB 5005 in the form of a table. Thumbnails owe their name to a human thumb, and a thumbnail image refers to image data that is reduced in size or number or pixels or image data of multiple images to be viewed on a screen simultaneously.

The thumbnail management table stores a thumbnail ID, a file name of thumbnail image, and the predetermined-area information in association with each device ID. The thumbnail ID is an example of identification information for identifying a thumbnail image generated based on the image data identified by the image ID. The thumbnail ID may refer to information specific to a thumbnail image. The file name of thumbnail image is a file name of the thumbnail image identified by the thumbnail ID. The image management system 5 assigns the file name of thumbnail image. The predetermined-area information indicates a predetermined area for which the thumbnail image is generated in the image data identified by the image ID. The image management system 5 mainly registers the thumbnail management table.

TABLE 5

| IMAGE ID | AREA ID | AREA RANGE |
|---|---|---|
| P0001 | area1 | x1, y1, width1, height1 |
|  | area2 | x2, y2, width2, height2 |
|  | ... | ... |
| P0002 | area1 | x1, y1, width1, height1 |
|  | ... | ... |
| ... | ... | ... |
| P000n | area1 | x1, y1, width1, height1 |

Table 5 is an example of an analysis information table that indicates information stored in the analysis information management DB 5006 in the form of a table. The analysis information table stores an area ID and an area range in association with each image ID. The image ID is the same or substantially the same as that of Table 3, and therefore a redundant description thereof is omitted below. The area range is information for specifying a person detection area in image data. The person detection area is a rectangle that passes through some points of the contour of a visitor (person) that is detected by analyzing the image data. The area ID is an example of identification information for identifying the person detection area. The area ID may refer to an area number or information specific to an area. For example, the area ID is indicated by "area N", where N is serial numbers assigned to each image.

The person detection area is specified based on the area range. Assuming that the person detection area where the visitor is detected has a shape of rectangle, for example, the area range is indicated by a coordinate (x, y) of an upper-left corner, a width and a height of the rectangle. The person detection area may be specified based on the coordinates of two points of diagonal corners. It should be noted that the area range is determined based on coordinates in the image data in a state of plane before the image is attached to a full sphere. In other words, the image capturing device 1 outputs a planer image at first. The planer image is attached to the full sphere for viewing, and thereby the full spherical image is generated.

The score table and drawing point table DB 5007 stores the score table and the rendering point table. The score table and the drawing point table according to the fifth embodiment are the same or substantially the same as those of the first embodiment, described above with reference to FIGS. 16A and 16B. Accordingly, the redundant descriptions thereof are omitted below.

The data exchange unit 51 of the image management system 5 is implemented by the network I/F 509 illustrated in FIG. 11, when operating under control of the CPU 501. The data exchange unit 51 exchanges data with the communication terminal 3 or the communication terminal 7 via the communication network 9. Hereinafter, a phrase "via the data exchange unit 51" may be omitted even when the image management system 5 communicates data with the communication terminal 7.

The detection unit 52 is implement by the CPU 501 illustrated in FIG. 11, when executing according to the program loaded to the RAM 503. The detection unit 52 detects a person from the image data. This detection of person is performed based on a suitable setting of a feature amount and a setting of a learning identification machine. Examples of the feature amount include Haar-like features, local binary patterns (LBP) features, and histogram of oriented gradients (HOG) features. Examples of the learning identification machine include deep learning, SVM, and a cascade classifier using adaptive boosting (AdaBoost). However, any other suitable feature amounts or learning identification machine may be used, provided that they can detect a person.

The thumbnail generation unit 57 is implement by the CPU 501 illustrated in FIG. 11, when executing according to the program loaded to the RAM 503. The thumbnail generation unit 57 generates a thumbnail image of a predetermined-area image.

The screen generation unit 56 generates screen information based on which the communication terminal 7 displays image data when the image data is transmitted to the communication terminal 7. The screen information is described in HyperText Markup Language data, JavaScript (registered trademark), or cascading style sheets (CSS), for example. Any other suitable format may be used for generating the screen information, provided that the communication terminal 7 can interpret information.

The data storage/read unit 59 is implement by the HDD 505, when operating under control of the CPU 501, to store data in the memory 5000 and read out data from the memory 5000. Hereinafter, a phrase "via the data storage/read unit 59" may be omitted even when the image management system 5 performs reading or writing of data from or to the memory 5000.

The communication terminal 7 includes the data exchange unit 71, the reception unit 72, the display control unit 73, the heat map generation unit 74, a bar chart generation unit 75, and the data storage/read unit 79. These functional blocks 71 to 75, and 79 are implemented by one or more hardware components illustrated in FIG. 11, when operating in accordance with instructions from the CPU 501 executing according to the programs for the communication terminal 7, loaded onto the RAM 503 from the HD 504.

The communication terminal 7 further includes the memory 7000, which is implemented by the RAM 503 and the HD 504 illustrated in FIG. 11. The memory 7000 stores the programs for the communication terminal 7. Examples of the programs for the communication terminal 7 include browser software and application software having communication capability such as browser software. Further, information described in HTML or a script language that is sent from the image management system 5 to the communication terminal 7 is also the program for the communication terminal 7.

It should be noted that functions implemented by the data exchange unit 71, the reception unit 72, the heat map generation unit 74, and the data storage/read unit 79 are the same or substantially the same as those of the first embodiment. Therefore, redundant descriptions thereof are omitted below.

The display control unit 73 is implemented by the CPU 501 illustrated in FIG. 11, when executing according to the program loaded onto the RAM 503. The display control unit 73 interprets the screen information transmitted from the image management system 5 to display various screens on the display 508 of the communication terminal 7. The display control unit 73 further includes an image display controller 81, an image superimposition unit 82, and a bar chart display controller 83. The image display controller 81 attaches the planer image data to the full sphere to place the image data a three-dimensional space. The image superimposition unit 82 superimposes the heat map image generated by the heat map generation unit 74 on the planer image data. The bar chart display controller 83 places the bar chart 604 outside of the full sphere to place the bar chart 604 in a three-dimensional space.

The bar chart generation unit 75 is implemented by the CPU 501, when executing according to the program loaded to the RAM 503, to generate the bar chart 604 as the analysis information. The bar chart generation unit 75 determines whether a first person who is detected in a certain area in a first spherical image item and a second person who is detected in the same certain area in a second full spherical image item that is captured at a different time from the first spherical image is the same person. The bar chart generation unit 75 determines whether the first person and the second person is the same person based on a combination of at least two of a face, a dress and a size of the person. When the determination is performed based on a person's face, the bar chart generation unit 75 performs face recognition to specify the position of a face an eyebrow, an eye, a nostril, a lip, etc. The bar chart generation unit 75 determines whether the two persons are the same person based on a distance between any two of these parts or an angle of a straight line connecting any two of these parts. When the determination is performed based on a dress that the person is wearing, the bar chart generation unit 75 generates a histogram of pixel value. The bar chart generation unit 75 uses the histogram to determine whether the two persons are the same person based on a ratio of the number of pixels of each pixel value. When the determination is performed based on a person's size, the bar chart generation unit 75 determines whether a height of a rectangle that passes through some points of the contour of the first person is the same as that of the second person to determine whether the two persons are the same person.

The bar chart generation unit 75 counts the number of individual persons on an area-by-area basis. In other words, the bar chart generation unit 75 distinguishes one person from another person, and counts the number for each of the same persons. When a different person is detected, the bar chart generation unit 75 counts the number of persons for each person. Accordingly, the number of individual persons is counted on an area-by-area basis for each of the individual persons. Even when the number of the individual persons counted for the same person is two or more, it is regarded as one person. Further, the bar chart generation unit 75 calculates a duration of stay in an area for the individual person. For example, in a case in which the same person is detected in three images that are captured continuously, the duration of stay is 3. The duration of stay may be converted to a time period based on an interval of image capturing or a capturing time as metadata of the full spherical image.

An operation of generating the heat map image according to the fifth embodiment is the same or substantially the same as that of the first embodiment described above with reference to FIG. 17 to FIGS. 27A and 27B. Therefore, a redundant description thereof is omitted below.

The heat map image as illustrated in FIG. 28 indicates a place where a person is likely to be detected in an intense color such as red. Accordingly, the viewer Y can recognize a place where a person is likely to be detected at a glance. However, it is difficult for the viewer Y viewing the heat map image to tell whether one person is detected multiple times at a same place or each of plural persons is detected once.

To address this issue, in the fifth embodiment, the communication terminal 7 determines a person detected in a certain image data item captured at a certain time and a person detected in a different image data item captured at a different time are the same person to count the number of individual persons. Further, the communication terminal 7 indicates the number of individual persons by the bar chart 604.

Figure 59:
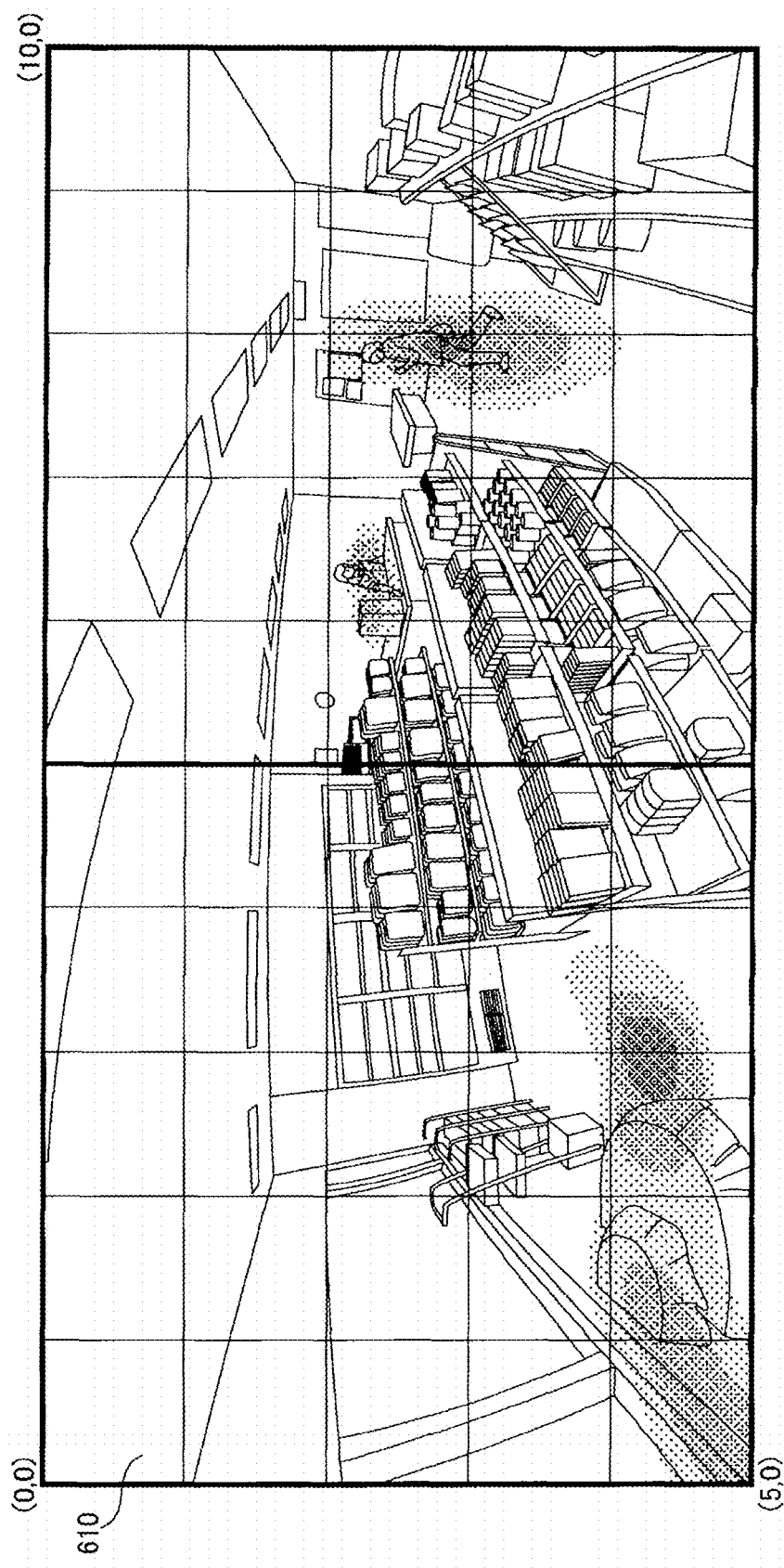
FIG. 59 is an illustration for explaining drawing of a bar chart according to a fifth embodiment of the present invention.

FIG. 59 is an illustration for explaining drawing of the bar chart 604. In order to draw the bar chart 604, the bar chart generation unit 75 divides the planer image data into a plurality of areas 610. The area 610 has a square or a rectangular shape. The size of the area 610 is not particularly limited, and the viewer Y may set the size as desired, for example. In a case in which the viewer Y does not set the size, the bar chart generation unit 75 divides the image into the areas 610b at a default size.

The bar chart generation unit 75 calculates how many different persons are detected for each of the areas 610 in the full spherical images that are captured within a period of time that is specified by the viewer Y, for example. For example, it is assumed that a person A is detected for three times and a person B is detected once in a certain area 610 (it is not necessary to perform personal identification, because it is sufficient to tell whether the two person are the same person). In this case, the number of detections is 3 for the person A, and the number of detections is 1 for the person B. However, the number of individual persons is 1 for the person A, and the number of individual persons is 1 for the person B. By contrast, in the heat map image, the color-coded indication 603 indicates that the four persons are detected. Accordingly, in a case in which a same person is detected multiple, a viewer Y viewing the bar chart 604 in comparison with the heat map image can recognize that the color is red because the same person is detected multiple times. By contrast, in a case in which the bar chart 604 is long, the viewer Y recognizes that the color of the heat map image is red because many different persons are detected.

Figure 60:
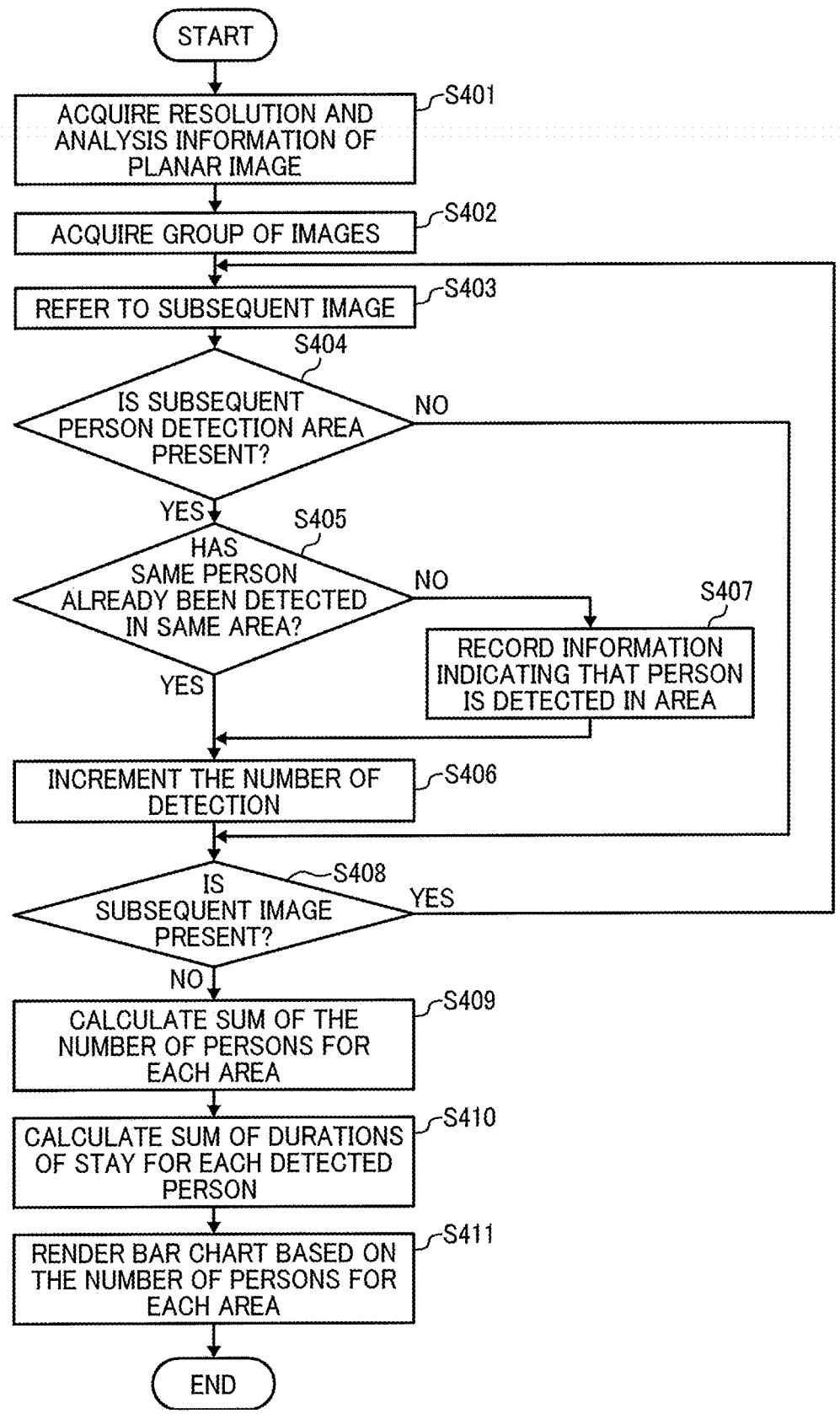
FIG. 60 is a flowchart illustrating an operation of generating the bar chart according to a fifth embodiment of the present invention.

FIG. 60 is a flowchart illustrating an operation of generating the bar chart 604 by the bar chart generation unit 75. The operation of FIG. 60 starts in response to an instruction for displaying the bar chart 604 by the viewer Y.

The bar chart generation unit 75 acquires a resolution of the planer image data and the analysis information stored in the analysis information management DB 5006 (S401).

Next, the bar chart generation unit 75 acquires a group of images (a series of image data) (S402). The series of images data are a plurality of image data items that are captured by one image capturing device 1 during a period of time that is designated by the viewer Y as described later with reference to FIG. 62. Alternatively, the series of image data are all of image data items captured by a certain image capturing device 1.

The bar chart generation unit 75 refers to the image data items one by one (S403).

The bar chart generation unit 75 determines whether a next person detection area is present based on the analysis information stored in the analysis information management DB 5006 (S404).

When the bar chart generation unit 75 determines that the next person detection area is not present (S404: NO), the operation proceeds to S408. By contrast, when the bar chart generation unit 75 determines that the next person detection area is present (S404: YES), the bar chart generation unit 75 determines whether a person in this person detection area was previously detected in a same area 610 (S405). Specifically, the bar chart generation unit 75 first determines the area 610 containing a barycenter (or a center) of the person detection area. Next, the bar chart generation unit 75 determines whether there is a person detected in the same area 610 in an image data item captured at a previous capturing time. When the bar chart generation unit 75 determines that there is a person detected in the same area 610, the bar chart generation unit 75 determines whether a person in the area range in the currently-processed image data item and a person in the area range in the captured image item that is captured at the previous capturing time (two persons in the person detection areas whose barycenter or center are contained in the same area 610) are the same person. The determination at S405 is performed as above. When the two person is the same person, the determination result at S405 is YES.

When the determination result of S405 is YES, the bar chart generation unit 75 increments the number of detections of the individual person for the area 610 containing the barycenter or center of the person detection area (S406). For example, the person A is detected in the same area 610, the number of detections in this area 610 for the person A is incremented by one. The number of detections of the person A is incremented as above in order to measure a duration of stay of the person A. Accordingly, it is not necessary to increment the number of detections when just measuring the number of the individual persons for the person A.

When the determination result at S405 is NO, the bar chart generation unit 75 records information indicating that a person is detected in the area A containing the barycenter or center of the person detection area (S407). For example, when the person B is first detected in the area 610 containing the barycenter or center of the person detection area, the bar chart generation unit 75 records information indicating that a person is detected in this area 610. The information may not include information for identifying the person B.

Next, the bar chart generation unit 75 determines whether a next image data item is present (S408). When there is a next image data item (S408: YES), the operation returns to S403 to repeat S403 to S407.

When there is no next image data item (S408: NO), the bar chart generation unit 75 calculates a sum of the numbers of individual persons for on an area-by-area basis (S409). In other words, even when the person A is detected multiple times in the same area 610, the number of individual persons is counted as 1. Further, when the person B is detected even once in the area 610, the number of individual persons is counted as 1. Accordingly, the number of individual persons for this area 610 is 2 in total. It should be noted that the total number may not be necessarily calculated. In this case, the number of individual persons is stored on a person-by-person basis.

Next, the bar chart generation unit 75 calculates a duration of stay for each of the detected persons (S410). In other words, the bar chart generation unit 75 calculates how long a same person stayed in the area 610. For example, in a case in which the person A is detected for three times in a same area 610, the duration of stay is 3. Further, for example, in a case in which the person B is detected once in the area 610, the duration of stay is 1. These numerical values 3 and 1 as the duration of stay may be converted to a period of time such as minutes. The duration of stay may be summed on a person-by-person basis. Alternatively, the duration of stay may be summed on an area-by-area basis.

A description is given heretofore of a case in which the bar chart generation unit 75 determines whether the same person was detected in the image data item that is captured at the previous period of time. However, the bar chart generation unit 75 may determine that the same person was detected in all of the image data items that are captured before the capturing date and time of the image data item as a current processing target. The bar chart generation unit 75 counts the number of individual persons for each same person. Accordingly, a person who once left a certain sales place and come back later to the sales place can be identified. Further, the bar chart generation unit 75 is able to count the number of persons who come back to the place. For example, assuming that the person A is detected for three times in total, in a case in which the person A is detected once after he/she comes back to a sales place from among the three detected times, a number of times that the person A comes back is one. The number of times that a person comes back may be counted for other visitors such as the person B in substantially the same manner.

Next, the bar chart display controller 83 renders the number of individual persons on an area-by-area basis (S411). A detailed description is given later of the rendering performed at S411 with reference to FIGS. 61A and 61B. It should be noted that in the fifth embodiment, the rendering means displaying a three-dimensional bar chart on the two-dimensional display 508.

The operation of FIG. 60 may be performed by the image management system 5 instead of the communication terminal 7. In this case, settings input by the viewer Y on a setting screen illustrated in FIG. 62 is transmitted to the image management system 5. The image management system 5 generates the heat map image and superimposes the heat map image on image data. Further, the image management system 5 counts the number of the individual persons to generate the bar chart 604, and arranges the bar chart 604 on the full spherical image 602. Furthermore, the image management system 5 renders this image on a two-dimensional screen and transmits the screen to the communication terminal 7.

Figure 61B:
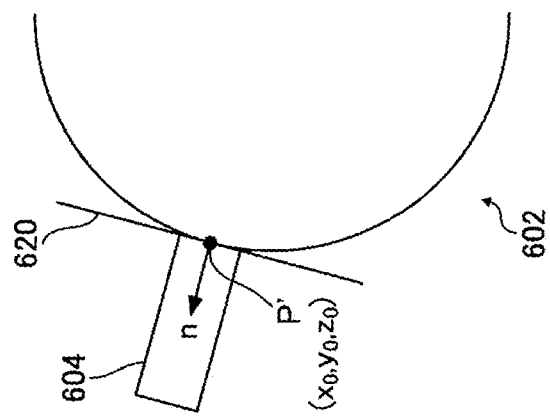
FIGS. 61A and 61B are illustrations for explaining rendering of the bar chart according to a fifth embodiment of the present invention.

Hereinafter, a description is given of the rendering of the bar chart 604 with reference to FIGS. 61A and 61B. The bar chart display controller 83 displays the bar chart 604 illustrated in FIG. 61A indicating the total number of the individual persons for each area 610 on the full spherical image 602 as illustrated in FIG. 61B. The bar chart 604 may indicate the total duration of stay for each area 610.

To simplify the description, the bar chart display controller 83 arranges the planar image data in a three-dimensional local coordinate system, and generates the bar chart 604 in the area 610. First, because a center P of each area 610 is known, a position P' ($x_0$, $y_0$, $z_0$) in FIG. 61B is calculated in substantially the same manner as the conversion from the planar image data to the full spherical image.

An equation of a tangent plane 620 that contact the full sphere at the position P' is given as below. a, b, c, are coordinates of the center of the full spherical image 602. The coefficients of x, y, and z are a normal vector n of the tangent plane 620.

$$(x0-a)(x-a)+(y0-b)(y-b)+(z0-c)(z-c)=R^2$$

Figure 61A:
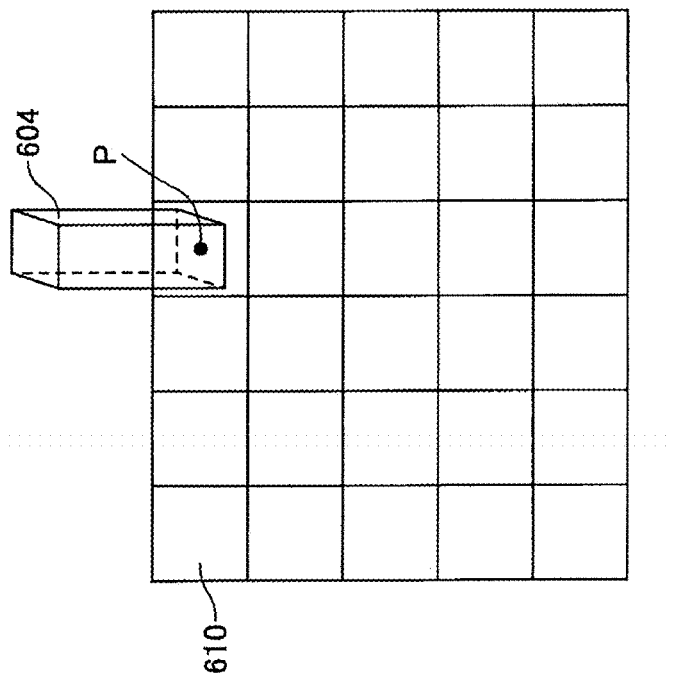

As illustrated FIG. 61A, the bar chart display controller 83 generates the bar chart 604 whose height is proportional to the number of the number of individual persons in each area 610 in the local coordinate system. To simplify the description, it is assumed that the directions of x, y, and z axes of the local coordinate system is the same as those of the world coordinate system. When arranging the bar chart 604 of the local coordinate system in the world coordinate system, the bar chart display controller 83 rotates the bar chart 604 of the local coordinate system by an angle defined by ($x_0$–a) and the x-axis, an angle defined by ($y_0$–b) and the y-axis, and an angle defined by ($z_0$–c) and the z-axis. Further, the bar chart display controller 83 moves the center point P to the position P' by parallel displacement.

Thus, the three-dimensional bar chart 604 is attached to the outer surface of the full spherical image 602. Because the bar chart 604 is arranged in the world coordinate system, the display control unit 73 displays the bar chart 604 on the display 508. It should be noted that the duration of stay can be also displayed by the bar chart 604 in substantially the same manner as the number of individual persons.

As described heretofore, because the communication terminal 7 according to the fifth embodiment displays the number of individual persons three-dimensionally on the full spherical image, it is able to display the analysis information in a color-coded indication together with the analysis information in a stereoscopic indication. This makes it easier for a viewer to grasp the relation among the plurality types of analysis information.

As described heretofore, a size of analysis information is indicated by a shape (height) of the bar chart 604. However, the height is just an example, and the thickness of the bar chart 604 may be used to indicate the size of analysis information. Further, any other suitable three-dimensional object than the bar chart 604 may be used for indicating the analysis information, provided that it can indicate the analysis information three-dimensionally. For example, a polygonal column such as a cylinder and a triangular prism or a polygonal pyramid such as a cone and a triangular pyramid may be used for indicating the analysis information.

A description is given heretofore of an example in which the analysis information include the total number of persons, the number of individual persons, and the duration of stay, and the total number of persons is indicated by the color-coded indication 603 while the number of individual persons or the duration of stay is indicated by the bar chart 604. However, these are just examples of the analysis information. Other examples of the analysis information are described below.

TABLE 6

| COLOR-CODED INDICATION | BAR CHART INDICATION |
|---|---|
| Total number of person | Number of individual persons |
| Number of individual persons | Number of persons who bought a sales item in an area |
| Number of individual persons | Sales amount in an area |
| Number of persons who pick up a sales item | Number of persons who bought a sales item in an area |

Table 6 represents examples of a combination of the analysis information indicated by the gradation of color (color-coded indication 603) and the analysis information indicated by the bar chart 604. The analysis information indicated by the gradation of color is an example of first analysis information. The analysis information indicated by the bar chart 604 is an example of second analysis information.

First, in a combination of the number of individual persons and the number of persons who bought an item in an area, the number of individual persons is displayed by the gradation of color. In this case, the heat map generation unit 74 displays the number of individual persons by the gradation of color (generate the heat map image) by performing substantially the similar operation described above with reference to FIG. 59 to FIGS. 61A and 61B because the difference is just the replacement of the total number of individual persons to the number of individual persons. In this case, the number of individual persons is a sum of a plurality of the numbers of individual persons on an area-by-area basis. Alternatively, the areas 610 may be colored in different colors depending on the sum of the plurality of the numbers of individual persons. The number of persons who bought an item in an area is a number of persons who bought a sales item in each area 610. For example, the Point of Sales (POS) manages the amount of sales for each sales item in real time, it has data indicating when and which items is sold. Further, it is assumed that the bar chart generation unit 75 associates a sales item ID with each area 610. The POS may have data associating the area 610 with the sales item ID. The bar chart generation unit 75 counts the number of sales items on a sales record that match the sales item ID associated with the area 610 during a period of time designated by the viewer Y. The number of sales items sold in the area 610 may be regarded as the number of persons who bought a sales item. Alternatively, the number of persons may be counted instead of the number of sales items sold.

In a combination of the number of individual persons and an amount of sale in an area, the number of individual persons is displayed by the gradation of color. The heat map image indicating the number of individual persons may be the same or substantially the same as that of the combination of the number of individual persons and the number of persons who bought an item in an area. Further, the POS is used for determining the amount of sales in the area 610. The bar chart generation unit 75 calculates a sum of amounts of sales for the sales item on a sales record that matches the sales item ID associated with the area 610 during a period of time designated by the viewer Y.

In a combination of a number of persons who pick up a sales item and a number of persons who bought an item in an area, the number of persons who pick up a sales item is displayed by the gradation of color. In this case, the image management system 5 stores in advance, in the analysis information management DB 5006, the area range of a person who picks up a sales item, which is obtained by image analysis. An action of picking up a sales item is detected using machine learning or pattern matching. Further, the communication terminal 7 may analyze a person who picks up a sales item. Because the area range of the person is acquired for each image data, the heat map generation unit 74 is able to display the number of persons who pick up a sales item by the gradation of color in substantially the same manner as that of the total number of persons.

As described heretofore, according to the fifth embodiment, various types of analysis information can be visually displayed in a combination of the color-coded indication 603 and the bar chart 604.

Hereinafter, a description is given of a user interface of the communication terminal 7 with reference to FIG. 62. FIG. 62 is a view illustrating an example of a setting screen 701 displayed on the display 508 of the communication terminal 7. The setting screen 701 includes an image display area 702, a heat map drop-down list 703, a bar chart drop-down list 704, a setting box 706 for setting an upper limit and a lower limit of duration of stay, a display radio button 705, a date and time range setting box 707, and a camera ID drop-down list 708.

The full spherical image 602 is displayed in the image display area 702. The full spherical image 602 that is selected from a plurality of full spherical images as analysis targets is displayed in the image display area 702. The heat map drop-down list 703 enables the viewer Y to select a desired type of analysis information to be indicated by the gradation of color. The bar chart drop-down list 704 enables the viewer Y to select a desired type of analysis information to be indicated by the bar chart 604. The setting box 706 for setting an upper threshold and a lower threshold of duration of stay enables the viewer Y to designate a lower limit and an upper limit of the duration of stay. The display radio button 705 enables the viewer Y to designate whether the heat map image and the bar chart 604 are to be displayed. The date and time range setting box 707 enables the viewer Y to designate a range of date and time during which image data items as analysis targets are captured. The camera ID drop-down list 708 enables the viewer Y to designate a desired image capturing device 1 by which image data items as analysis targets are captured Because various conditions for display are displayed on the setting screen 701, the viewer Y can switch the display condition interactively. For example, the communication terminal 7 does not display the number of individual persons of a person whose duration of stay is short depending on the setting of the lower limit of the duration of stay. By contrast, the communication terminal 7 does not display the number of individual persons of a person whose duration of stay is extremely long depending on the setting of the upper limit of the duration of stay. Thus, the setting box 706 for setting an upper threshold and a lower threshold of duration of stay enables filtering of the number of individual persons, etc., indicated by the bar chart 604.

This filtering depending on the duration of time is implemented by performing the process of S410 before the process of S409 to count the number of persons whose duration of stay is within a range between the upper limit and the lower limit.

It should be noted that the setting screen 701 may further include a menu for setting a size of the area 610 or the number of areas 610.

The setting screen 701 further includes a storing data key 709, an import key 710, and an export key 711. In response to a user selection of the storing data key 709, the reception unit 72 accepts the user selection, and the heat map generation unit 74 stores analysis-information display data in the memory 7000. Table 7 is an illustration for explaining the analysis-information display data.

TABLE 7

| DATA ID | IMAGE ID | HEAT MAP IMAGE | DATA OF HEIGHT | DURATION OF STAY | TARGET RANGE |
|---|---|---|---|---|---|
| Q001 | au12345 | Total number of persons (heat001.jpg) | Number of individual persons Area1: N one person Area 1: N two persons | Lower limit: 0 Upper limit: 25 | 2016.04.03.12:00-2016.04.03.16:00 |

In the analysis-information display data of Table 7, a data ID, the image ID, the heat map image, data of height, the duration of stay, and a target range are stored in association with one another. The data ID is an example of identification information for identifying the analysis-information display data to be stored. The image ID is the same or substantially the same as that described above. More specifically, the image ID in Table 7 is an image ID of an image item that is being displayed on the display 508 from among the plurality of image data items used for the analysis. The type of analysis information indicated by the gradation of color and data of the heat map image are stored as the heat map image. The type of analysis information indicated by the bar chart 604 and the number of persons (e.g., the number of individual persons in Table 7) in each area are stored as the data of height. The upper limit and the lower limit, each being designated in the setting box 706 are stored as the duration of time. The value that is designated in the date and time range setting box 707 is stored as the target range.

Because the analysis-information display data obtained by aggregating the data set via the setting screen 701 is stored in the memory as described above, it takes less time to display the image than it takes to aggregate the data when the viewer Y later instruct the display. In addition, it is not necessary to download the image data again, the cost required for data communication and calculation is reduced.

In response to a user selection of the export key 711, the reception unit 72 accepts the user selection, and the data storage/read unit 79 stores the analysis-information display data in a predetermined file format in the memory 7000 or a storage medium. Examples of the predetermined file format include an Excel format. In Excel format, the image data, the heat map image, and the data of height are stored on a sheet, and other information contained in the analysis-information display data are stored on a sheet. Accordingly, the viewer Y is able to manipulate the analysis-information display data edited in the predetermined file format, or edit the data of height.

In response to a user selection of the import key 710, the reception unit 72 accepts the user selection, and the data storage/read unit 79 reads out the analysis-information display data in the predetermined file format from the memory 7000 or a storage medium. In addition, the data storage/read unit 79 converts the predetermined file format to a data format that the communication terminal 7 can process. For example, in a case in which the analysis-information display data is stored in Excel format, the data storage/read unit 79 has information specifying a sheet and a cell in which the analysis-information display data is stored. This enables the communication terminal 7 to convert the exported analysis-information display data in the predetermined file format to the file format that the communication terminal 7 can process. Accordingly, in response to an instruction given by the viewer Y, the communication terminal 7 is able to display the data of height edited in the predetermined file format.

The image data is attached to the inner surface of the full sphere as described above. However, the image data may be attached to the outer surface of the full sphere. The communication terminal 7 switches the side to which the image data is attached based on the switching condition as indicated in the following Table 8, for example.

TABLE 8

| POSITION OF VIRTUAL CAMERA | DRAWING POSITION OF IMAGE | ANALYSIS INFORMATION |
|---|---|---|
| Full sphere is not within an angle of view | Draw an image on an inner surface of the sphere | Heat map image |
| Full sphere is within an angle of view | Draw an image on an outer surface of the sphere | Heat map image Bar chart |

According to the switching condition of Table 8, when the virtual camera is placed such that the entire full spherical image 602 is not included within a range defined by an angle of view, the image data is attached to the inner surface of the full sphere, and the heat map image is displayed as the analysis information. By contrast, when the virtual camera is placed such that the entire full spherical image 602 is included within a range defined by an angle of view, the image data is attached to the outer surface of the full sphere, and the heat map image and bar chart 604 is displayed as the analysis information.

Figure 63A:
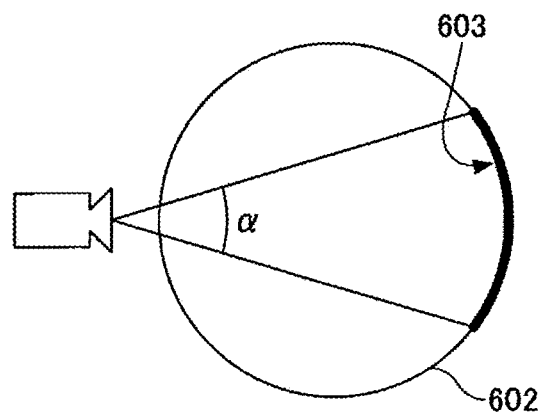
FIGS. 63A and 63B are example illustrations for explaining the relation between a full sphere and the position and angle of view of the virtual camera according to a fifth embodiment of the present invention.
Figure 63B:
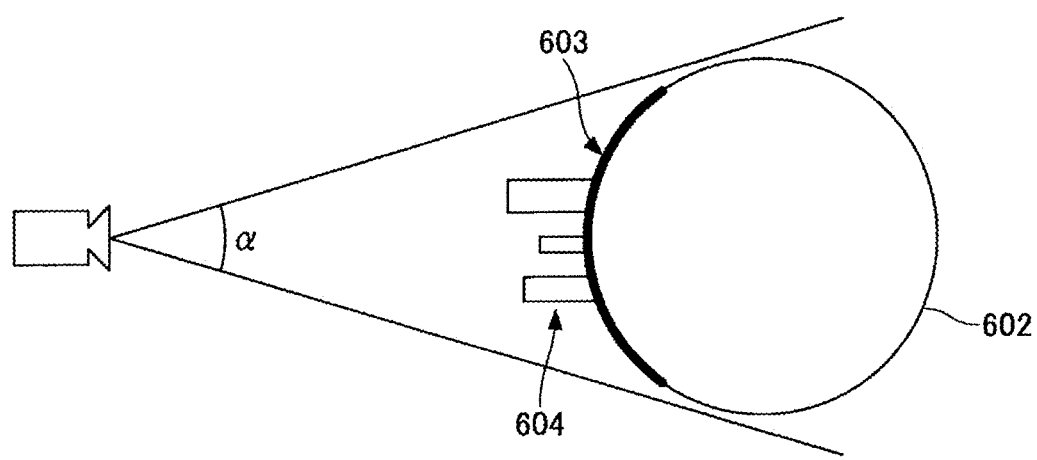

Hereinafter, a detailed description is given of the switching of the side to which the image data is attached with reference to FIGS. 63A and 63B. FIGS. 63A and 63B are example illustrations for explaining the relation between the full sphere and the position and angle of view of the virtual camera IC. In FIG. 63A, the entire full spherical image 602 is not included in the range defined by the angle of view α of the virtual camera IC. Accordingly, the image data is attached to the inner surface of the full sphere, and only the heat map image (color-coded indication 603) is displayed. By contrast, in FIG. 63B, the entire full spherical image 602 is included in the range defined by the angle of view α of the virtual camera IC. Accordingly, the image data is attached to the outer surface of the full sphere, and both the heat map image (the color-coded indication 603) and the bar chart 604 are displayed.

This enables the viewer Y to switch the display as desired. For example, when the viewer Y wants to view a plurality types of analysis information together with the image, the full spherical image 602 is viewed from the outside of the sphere. By contrast, when the viewer Y wants to view the image itself enlarged, the full spherical image 602 is viewed from the inside of the sphere.

Figure 64A:
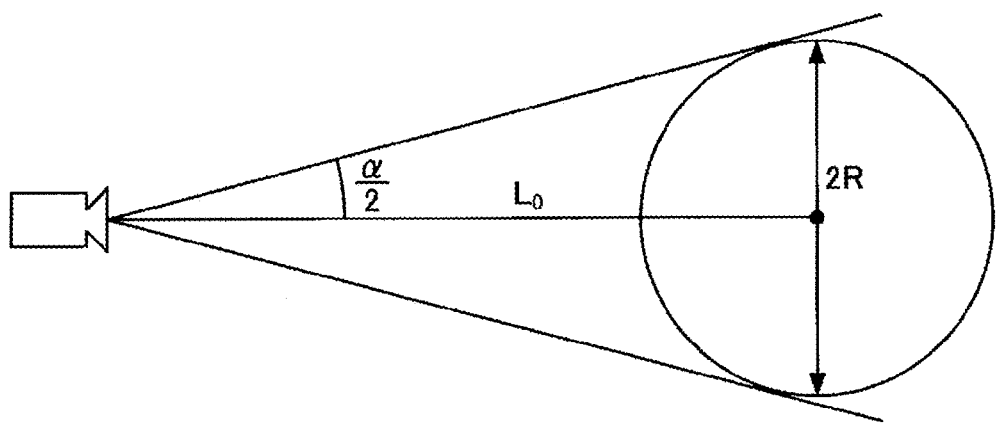

Hereinafter, a description is given of how the switching is determined with reference to FIG. 64A. In FIG. 64A, 2R denotes a diameter of the full sphere, and a denotes the angle of view of the virtual camera IC. When the virtual camera IC is placed at a position away from the center of the full sphere by a distance $L_0$, the entire sphere is just included in the range defined by the angle of view α of the virtual camera IC. Distance $L_0 = R/(\tan(\alpha/2))$ The distance L between the coordinate of the virtual camera IC in the world coordinate system and the center of the full sphere is periodically calculated. The image superimposition unit 82 and the bar chart display controller 83 determines whether Distance L>Distance $L_0$ to determine the drawing position (inside or outside) of the image and the presence of display of the bar chart 604.

Figure 64B:
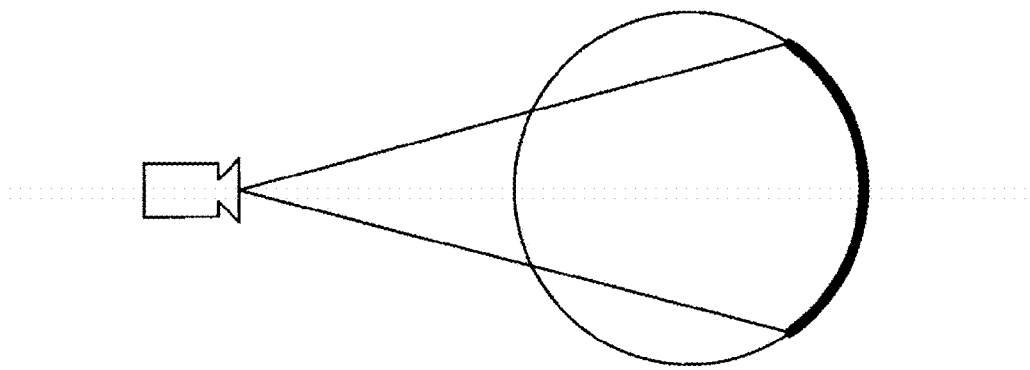
Figure 64C:
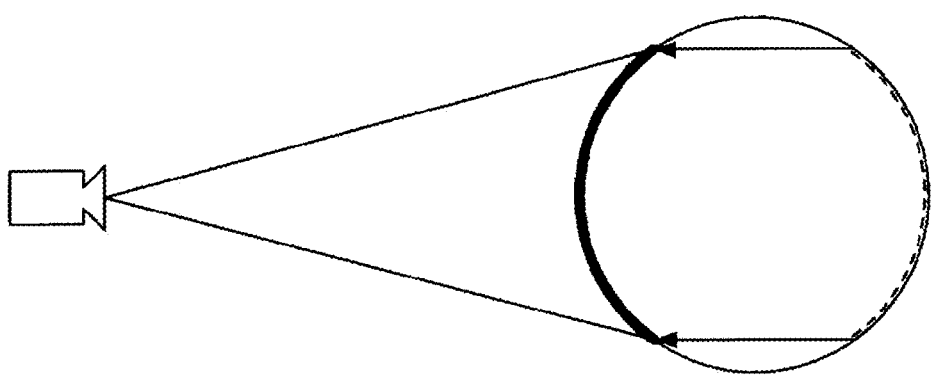

Hereinafter, a description is given of drawing the image in the inside of the full sphere and drawing the image in the outside of the full sphere with reference to FIGS. 64B to 64E. The image superimposition unit 82 draws the image that is drawn inside the full sphere as illustrated in FIG. 64B to the outside of the full sphere as illustrated in FIG. 64C. Alternatively, the image superimposition unit 82 performs the drawing the other way around. Accordingly, the image is moved from the inside to the outside or from the outside to the inside by parallel displacement.

FIG. 64D is a view illustrating the full sphere viewed from top. FIG. 64E is a view illustrating the full sphere viewed from side. First, it is assumed that a range from the longitude θ1 to θ2 is displayed on the display 508. The longitude θ1 to θ2 can be obtained by an inverse conversion of the conversion performed when a three-dimensional object is projected to a two-dimensional screen. In this case, a degree of the displayed longitude range is A degree. Although the A degree varies depending on a latitude, the A degree is calculated based on a coordinate on the display 508. Alternatively, because the distance $L_0$ is constant, the A degree with respect to the distance $L_0$ is obtained in advance for each latitude.

When the inner image is moved to the outside by parallel displacement, θ1 moves to θ1' and θ2 moves to θ2'. Accordingly, θ1' and θ2' are obtained by the following equations.

$$\theta 1' = \theta 1 - (180 - A)$$

$$\theta 2' = \theta 2 + (180 - A)$$

Next, it is assumed that a range from the latitude φ1 to φ2 is displayed on the display 508. The latitude φ1 to φ2 can be obtained by an inverse conversion of the conversion performed when a three-dimensional object is projected to a two-dimensional screen. In this case, a degree of the displayed latitude range is B degree. Although the B degree varies depending on a longitude, the B degree is calculated based on a coordinate on the display 508. Alternatively, because the distance $L_0$ is constant, the B degree with respect to the distance $L_0$ is obtained in advance for each longitude.

When the inner image is moved to the outside by parallel displacement, φ1 moves to φ1' and φ2 moves to φ2'. However, in parallel displacement, the latitude may be constant. Accordingly, the relation expressed by the following equations is satisfied.

$$\varphi 1' = \varphi 1$$

$$\varphi 2' = \varphi 2$$

As described above, an image of a rectangular area defined by θ1, φ1, θ2 and φ2 is moved to a rectangular area defined by θ1', φ1', θ2' and φ2'. Because the latitude is invariant, only the longitude is changed. An image of a range from θ1' to θ1 and an image of a range from θ2' to θ2 also can be drawn on the outer surface of the sphere in consideration of the direction.

It should be noted that the bar chart 604 is displayed in substantially the same manner as described above by specifying the center (barycenter) of the area 610 and obtaining the normal vector. The center (barycenter) of the area 610 can be obtained by changing the longitude of the center (barycenter) of the area in substantially the same manner.

Figure 65B:
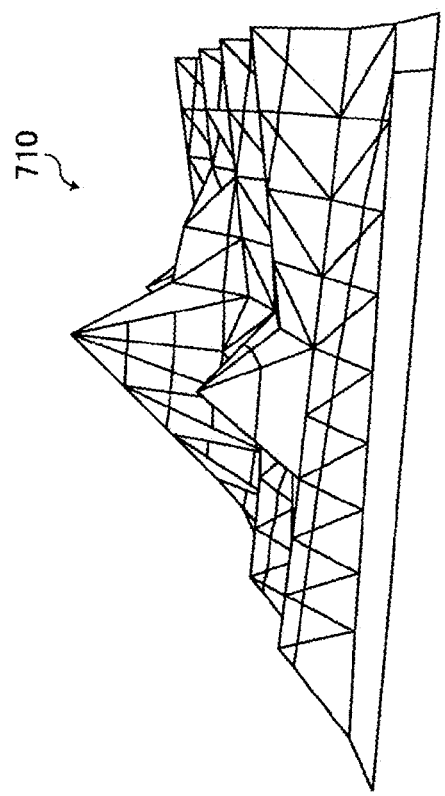
FIGS. 65A and 65B are views illustrating the full spherical image which is smoothed based on a height of the bar chart according to a fifth embodiment of the present invention.
Figure 65A:
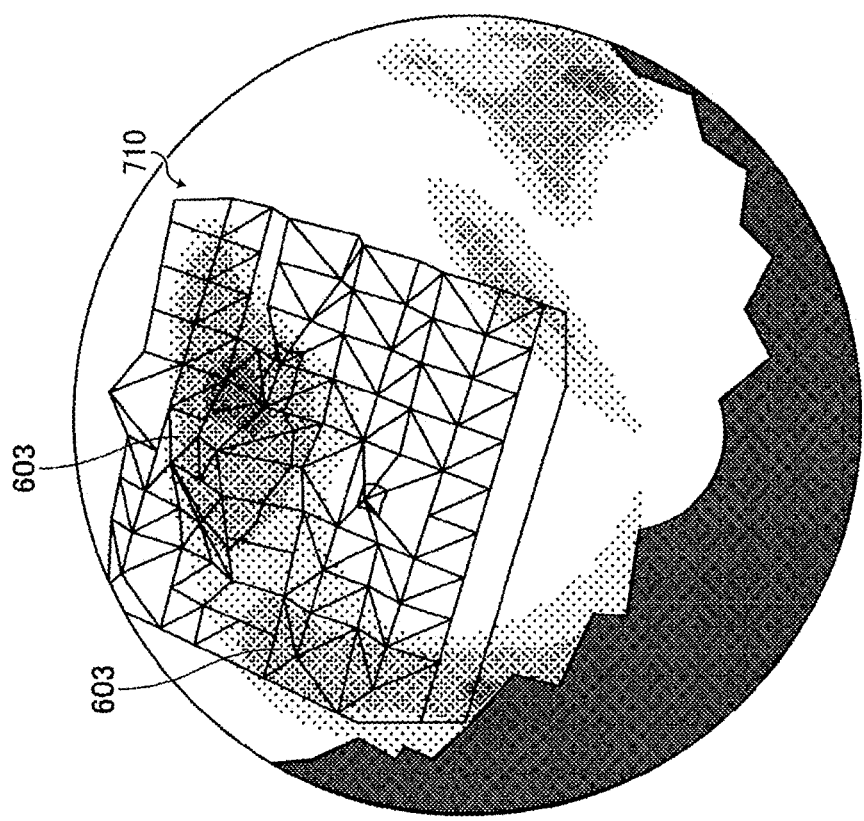

The bar charts 604 of the areas 610 may be smoothed based on the height of each bar chart 604. FIG. 65A is a view illustrating the full spherical image 602 including a smoothed graph 720 that is obtained by smoothing the height of the bar charts 604. FIG. 65B is a view illustrating just the smoothed graph 720. Even when there is an area 610 in which the bar chart 604 is not present, the smoothed graph 720 gives a height to a space where the bar chart 604 is not present.

Figure 66:
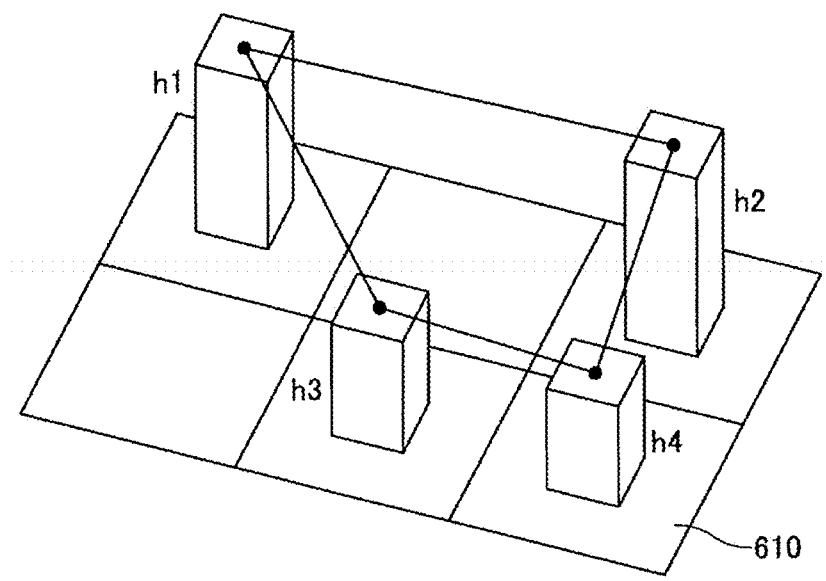
FIG. 66 is an illustration for explaining smoothing of the height of bar chart in each area based on the height of the bar chart according to a fifth embodiment of the present invention.

FIG. 66 is an illustration for explaining a smoothing processing. As the simplest way, the bar chart display controller 83 processes the bar charts 604 in the image data arranged in the local coordinate system to connect the centers of top surfaces of the bar charts 604 that are adjacent to one another by a predetermined distance or below by a straight line. One plane is formed by connecting the center points of top surfaces of three or four bar charts 604. A polygon constituted by this plane is arranged in a three-dimensional space to smooth the areas 610. Thus, the smoothed graph 720 is displayed on the full spherical image 602.

Further, a smoothing filter may be used. For example, in a case in which a filter is applied to each of 3×3 areas 610, a 3×3 square operator (kernel) is prepared in which each element is ⅑. Using the operator, a height of an area of interest is obtained by multiplying the height of the area of interest by the height of each of the neighboring areas. This processing is performed on each of the areas 610 to smooth the entire height. The smoothed height is obtained in each of the areas 610, a polygon that is obtained by connecting the smoothed heights may be used for indication. Alternatively, the bar chart 604 having the smoothed height may be used for indication. It should be noted that the smoothing processing may be performed using a Gaussian filter in which the operator is determined that the closer to the area of the element, the larger the element.

The present invention is not limited to the details of the example embodiments described above, and various modifications and improvements are possible.

For example, although in the fifth embodiment, one type of the analysis information is indicated by the color-coded indication 603 and another type of the analysis information is indicted by the bar chart 604, a plurality of types of the analysis information may be indicated together by the color-coded indication 603, or a plurality of types of the analysis information may be indicated together by the bar chart 604.

Further, although in the fifth embodiment, the bar chart 604 is arranged on the outer surface of the full sphere, the bar chart 604 may be arranged inside the full sphere.

Furthermore, an information processing apparatus including the communication terminal 7 and the image management system 5 may perform the processing described above in the fifth embodiment. Still further, the communication terminal 7 may implement at least one of the functions implemented by the image management system 5. The communication terminal 7 may implement at least one of the functions implemented by the image management system 5. In other words, in the fifth embodiment, the image management system 5 may perform the operation that is performed by the communication terminal 7 in the above description, and vice versa.

The functional configurations of the image capturing device 1, the communication terminal 3, the image management system 5, and the communication terminal 7 are divided into the functional blocks as illustrated in FIG. 58, for example, based on main functions to make it easy to understand the processing. However, the present invention should not be limited by these divided processing units or the names. The processing implemented by the image capturing device 1, the communication terminal 3, the image management system 5, and the communication terminal 7 may be divided to a plurality of processing units depending on the content of processing. Further, one processing unit may include further processing units. Furthermore, the image communication system 10 may include two or more image management systems 5.

Still further, although a description has been given of an example in which the memory 5000 of the image management system 5 stores the databases 5002 to 5007, the databases 5002 to 5007 may be stored on the communication network 9 such that the image management system 5 reads out or write data from or to the databases.

It should be noted that the image superimposition unit 82 is an example of an information associating processor (or circuitry), the image display controller 81 is an example of a placing processor (or circuitry), the bar chart display controller 83 is an example of an analysis information placing processor (or circuitry), the display control unit 73 is an example of a display processor (or circuitry), the display 58 is an example of a display device, and the bar chart display controller 83 is an example of a generating processor (or circuitry). The reception unit 72 is an example of an acceptance processor (or circuitry), and the memory 7000 is an example of a storage device.

According to an aspect of the present invention, an image management system for managing image data to be transmitted to a communication terminal includes: a detection unit to detect a head including a face of a person in the image data; a calculation unit to, in a case in which the detection unit detects the face of person, calculate a position of a foot of the person from the position of the head in the image data based on a size of the head including the detected face and an average person's body size; and a transmission unit to transmit foot position information indicating the calculated position of foot.

The calculation unit may calculate the size of the head based on a top of the head and a bottom of the head.

The calculation unit may calculate a distance between a center of the head and the foot based on the calculated size of the head and the average person's body size, and calculate a position that is away from a position of the head by the distance between the center of the head and the foot as the position of the foot in the image data.

The image management system may further include a person image management unit to manage the position information of the foot calculated by the calculation unit with image identification information for identifying image data containing an image of the foot, wherein the transmission unit transmits, to the communication terminal, the image data, and the position information of the foot associated with image identification information of the image data and the image identification information.

The image data may be full-spherical panoramic image data.

According to another aspect of the invention, an image communication system includes the image management system according to the above aspect and the communication terminal, wherein the transmission unit of the image management system transmits, to the communication terminal, respective foot position information indicating a position of a foot of a person in a plurality of image data items that are obtained by continuous image capturing, wherein the communication terminal includes: a heat map generation unit to generate a heat map image indicating a track of the person based on the respective foot position information; and a display control unit to map the generated heat map image on specific image data from among respective image data indicated by respective image identification information associated with the respective foot position information and control a display unit to display the specific image data on which the heat map is mapped.

The communication terminal may be one of a personal computer, a smartphone, a tablet terminal, and a smartwatch.

According to still another aspect of the present invention, an image transmission method performed by an image management system that manages image data to be transmitted to a communication terminal, includes: a detection step of detecting a head including a face of a person from the image data; a calculation step of, in a case in which the face of the person is detected at the detection step, calculating a position of a foot of the person from the position of the head in the image data based on a size of the head including the detected face and an average person's body size; and a transmission step of transmitting foot position information indicating the calculated position of foot.

According to still another aspect of the present invention, an image displaying method performed by an image communication system that manages image data is provided, includes: a detection step of detecting a head including a face of a person from the image data; a calculation step of, in a case in which the face of the person is detected at the detection step, calculating a position of a foot of the person from the position of the head in the image data based on a size of the head including the detected face and an average person's body size; and a heat map generation step of generating a heat map based on the position of the foot calculated at the calculation step; and a display control step of mapping the generated heat map image on the image data and controlling a display means to display the image data on which the heat map image is mapped.

According to still another aspect of the present invention, a program is provided, that causes a computer to perform the above image transmission method.

According to still another aspect of the present invention, a communication terminal that maps a heat map image on a captured image represented by captured-image data obtained by image capturing and displays the captured image on which the heat map image is mapped, includes a calculation unit to calculate a specific position in a detection area of each of objects in a plurality of captured-image data items that are obtained by image capturing with a lapse of time and a size of the detection area; a rendering unit to render a heat map image by using the specific position and the size calculated by the calculation unit for weighting of gradation of color; and a display control unit to map the heat map image on the captured image and display the captured image on which the heat map is mapped.

The communication terminal may further include a determination unit to determine whether a first position in a detection area of a first object in first captured-image data from among the plurality of captured image data items and a first size of the detection area is within a predetermined range when compared with a second position of a detection area of a second object in second captured-image data that is captured after capturing of the first captured-image data to determine the first object and the second object are a same object, wherein the rendering unit changes the weighting of gradation of color depending on whether the determination unit determines that the first object and the second object is the same object or the determination unit determines that the first object ant the second object are not the same object.

In a case in which the determination unit determines that the first object and the second object are the same object, the rendering unit may render in a light color. In a case in which the determination unit determines that the first object and the second object are not the same object, the rendering unit may render in a dark color.

The longer a time difference between a capturing time of the second object and a capturing time of the first object, the darker color the rendering unit may render.

The calculation unit may define the detection area by a position of an arbitrary corner of a rectangle area containing the object and a range indicating a width and a height of the rectangle area with respect to the position of the arbitrary corner.

The communication terminal may be one of a personal computer, a smartphone, a tablet terminal, and a smartwatch.

According to still another aspect of the present invention, an image communication system includes the communication terminal according to the above aspect and an image management system that manages the plurality of captured-image data items, wherein the communication terminal includes a reception unit to receive the plurality of captured-image data items from the image management system.

According to still another aspect of the present invention, a display method is provided, performed by a communication terminal that maps a heat map image on a captured image represented by captured-image data obtained by image capturing and displays the captured image on which the heat map image is mapped. The method includes a calculation step of calculating a specific position in a detection area of each of objects in a plurality of captured-image data items that are obtained by image capturing with a lapse of time and a size of the detection area; a rendering step of rendering a heat map image by using the specific position and the size calculated by the calculation unit for weighting of gradation of color; and a display controlling step of to mapping the heat map image on the captured image and displaying the captured image on which the heat map is mapped.

According to still another aspect of the present invention, a program is provided that causes a computer to perform the display method according to the above aspect.

According to still another aspect of the present invention, an image processing system is provided, that displays image data whose angle is wider than a predetermined angle and analysis information of the image data.

The image processing system includes an information associating unit to associate first analysis information obtained by analyzing the image data with the image data; a placing unit to place, in a three-dimensional space, the image data with which the first analysis information is associated; an analysis information placing unit to place second analysis information obtained by analyzing the image data as an object in a three-dimensional space in association with the image data in the three-dimensional space; and a display unit to display the first analysis information, the second analysis information and the image data on a display.

The information associating unit may indicate the first analysis information with gradation of color. The analysis information placing unit may indicate a size of the second analysis information with a shape of the object.

The image processing system may further include a generation unit to analyze the image data for each of a plurality of areas that are obtained by dividing the image data to generate the second analysis information for each of the plurality of areas, wherein the analysis information placing unit may place the object having the shape representing the size of the second analysis information in the area of the image data in the three-dimensional space.

The placing unit may attach the image data to a sphere to place the image data in the three-dimensional space. The analysis information placing unit may place the object on a surface of the sphere.

The analysis information placing unit may smooth the height of the object in each area based on the height of objects in the area near the each area.

The placing unit may attach the image data to the sphere to place the image data in the three-dimensional space. The display unit may project an image of at least a part of the sphere that is within an angle of view of a viewpoint having a predetermined angle of view on the display. In a case in which an entirety of the sphere is within the angle of view, the placing unit may attach the image data on an outer surface of the sphere. In a case in which an entirety of the sphere is not within the angle of view, the placing unit attaches the image data on an inner surface of the sphere.

In a case in which an entirety of the sphere is within the angle of view, the analysis information placing unit may place the object on the sphere. In a case in which an entirety of the sphere is not within the angle of view, the analysis information placing unit may not place the objet on the sphere.

The display unit may display a setting screen that accepts an input for settings of display of the first analysis information and the second analysis information on the display. The image processing system may further include a reception unit for accepting a selection of the image data on which the first analysis information and the second analysis information.

The reception unit may accept a designation of a range of the second analysis information. The analysis information placing unit may place, in the image data in the three-dimensional space, the second analysis information of the designated range as the object in the three-dimensional space.

The reception unit may accept a selection of one of a plurality of items of the first analysis information and accept a selection of one of a plurality of items of the second analysis information. The display unit may display the selected item of the first analysis information and the selected item of the second analysis information on the display.

The reception unit may accept a selection of presence or absence of the display of the first analysis information and the second analysis information.

The image processing system may further include a storage unit to store the first analysis information and the second analysis information in a storage device. The storage unit may read out the image data, the first analysis information and the second analysis information from the storage device. The display unit may display the image data, the first analysis information and the second analysis information that are read out by the storage unit on the display.

The storage unit may export the image data, the first analysis information and the second analysis information to the storage device in a predetermined file format. The storage unit may import the image data, the first analysis information and the second analysis information that are in the predetermined format from the storage device.

According to still another embodiment, an information processing apparatus is provided, that displays image data whose angle is wider than a predetermined angle and analysis information of the image data. The image processing apparatus includes an information associating unit to associate first analysis information obtained by analyzing the image data with the image data; a placing unit to place, in a three-dimensional space, the image data with which the first analysis information is associated; an analysis information placing unit to place second analysis information obtained by analyzing the image data as an object in a three-dimensional space in association with the image data in the three-dimensional space; and a display unit to display the first analysis information, the second analysis information and the image data on a display.

An image processing apparatus according to still another aspect of the present invention includes an information associating unit to associate first analysis information obtained by analyzing image data whose angle is wider than a predetermined angle with the image data; a placing unit to place, in a three-dimensional space, the image data with which the first analysis information is associated; an analysis information placing unit to place second analysis information obtained by analyzing the image data as an object in a three-dimensional space in association with the image data in the three-dimensional space, wherein the image processing apparatus transmits the first analysis information, the second analysis information, and the image data to another information processing apparatus to cause the another information processing apparatus to display the transmitted information.

A program that causes an information processing apparatus that displays image data whose angle is wider than a predetermined angle and analysis information of the image data to function as: an information associating unit to associate first analysis information obtained by analyzing the image data with the image data; a placing unit to place, in a three-dimensional space, the image data with which the first analysis information is associated; an analysis information placing unit to place second analysis information obtained by analyzing the image data as an object in a three-dimensional space in association with the image data in the three-dimensional space; and a display unit to display the first analysis information, the second analysis information and the image data on a display.

A program that causes an information processing apparatus to execute a method comprising: associating first analysis information obtained by analyzing image data whose angle is wider than a predetermined angle with the image data; a placing unit to place, in a three-dimensional space, the image data with which the first analysis information is associated; an analysis information placing unit to place second analysis information obtained by analyzing the image data as an object in a three-dimensional space in association with the image data in the three-dimensional space, transmitting the first analysis information, the second analysis information, and the image data to another information processing apparatus to cause the another information processing apparatus to display the transmitted information.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. An image management system for managing captured image data to be transmitted to a communication terminal, the image management system comprising:
    circuitry configured to:
        detect a head of a particular person in the captured image data;
        in response to detection of the head of the particular person the captured image data, calculate, based on (1) a size of the head of the person, (2) and predetermined average size, and (3) a position of the detected head of the particular person in the captured image data, a position of a foot of the particular person; and
        transmit, to the communication terminal, foot position information indicating the calculated position of the foot of the particular person.

2. The image management system of claim 1, wherein the circuitry is further configured to calculate the size of the detected head based on a top of the head and a bottom of the detected head in the captured image data.

3. The image management system of claim 2, wherein the circuitry is further configured to:
    calculate a distance between a center of the head and the foot of the particular person, based on the calculated size of the detected head and the predetermined average size of the body; and
    calculate the position of the foot of the predetermined person in the captured image data to be a position that is away from a position of the detected head by the calculated distance.

4. The image management system of claim 1, further comprising:
    a memory to store the foot position information indicating the calculated position of the foot in association with image identification information identifying the captured image data containing an image of the foot, wherein
    the circuitry is further configured to transmit, to the communication terminal, the captured image data, particular image identification information identifying the captured image data, and the foot position information associated with the particular image identification information.

5. The image management system of claim 1, wherein the captured image data is spherical panoramic image data.

6. An image communication system, comprising:
the image management system of claim 1; and
the communication terminal, wherein
- the circuitry of the image management system is further configured to transmit, to the communication terminal, a plurality of foot position information items, each item indicating the position of the foot of the particular person in each corresponding image of a plurality of images that are obtained by continuous image capturing,
- the communication terminal comprises other circuitry configured to:
  - generate a heat map image indicating a track of the particular person based on the plurality of foot position information items;
  - map the generated heat map image onto one image of the plurality of images; and
  - cause a display to display the one image on which the heat map image is mapped.

7. The image communication system of claim 6, wherein the communication terminal is one of a personal computer, a smartphone, a tablet, and a smartwatch.

8. A method for transmitting an image performed by an image management system that manages captured image data to be transmitted to a communication terminal, the method comprising:
- detecting a head of a particular person in the captured image data;
- in response to detection of the head of the particular person in the captured image data, calculating, based on (1) a size of the detected head of the particular person, (2) a predetermined average size of a body, and (3) a position of the detected head of the particular person in the captured image data, a position of a foot of the particular person; and
- transmitting, to the communication terminal, foot position information indicating the cella dated position of the foot of the particular person.

9. A method for controlling display of an image, performed by an image management system that manages captured image data, the method comprising:
- detecting a head of a particular person in the captured image data;
- in response to detection of the head of the particular person in the captured image data, calculating, based on (1) a size of the detected head of the particular person, (2) a size of a body, and (3) a position of the detected head of the particular person in the captured image data, a position of a foot of the particular person;
- generating a head map image based on the calculated position of the foot of the particular person;
- mapping the heat map image onto the captured image data; and
- causing a display to display the captured image data on which the heat map image is mapped.

10. A non-transitory computer-readable medium storing a computer-readable program that causes a computer to execute the method of claim 9.

\* \* \* \* \*